(12) United States Patent       (10) Patent No.:     US 9,158,518 B2
Brown et al.                    (45) Date of Patent:       Oct. 13, 2015

(54) COLLABORATIVE APPLICATION DEVELOPMENT ENVIRONMENT USING A CONNECTED DEVICE

(71) Applicant: BlackBerry Limited, Waterloo (CA)

(72) Inventors: Michael Stephen Brown, Kitchener (CA); Terrill Mark Dent, Waterloo (CA); Kalu Onuka Kalu, Ottawa (CA)

(73) Assignee: BlackBerry Limited, Waterloo (CA)

( * ) Notice: Subject to any disclaimer, the term of this patent is extended or adjusted under 35 U.S.C. 154(b) by 3 days.

(21) Appl. No.: 13/792,873

(22) Filed: Mar. 11, 2013

(65) Prior Publication Data

US 2014/0258970 A1    Sep. 11, 2014

(51) Int. Cl.
*G06F 9/44*     (2006.01)
*G06F 9/445*    (2006.01)
*G06F 9/45*     (2006.01)

(52) U.S. Cl.
CPC ... *G06F 8/47* (2013.01); *G06F 8/68* (2013.01); *G06F 8/71* (2013.01)

(58) Field of Classification Search
CPC ....... G06F 9/44; G06F 15/16; G06F 12/0837; G06F 8/00; G06F 8/51; G06F 8/70; G06F 8/71; G06F 8/65; G06F 8/10; G06F 8/68; G06F 8/41; G06F 8/443; G06F 8/61; G06F 2201/865
See application file for complete search history.

(56) References Cited

U.S. PATENT DOCUMENTS

| | | | |
|---|---|---|---|
| 5,649,200 A | 7/1997 | Leblang et al. | |
| 6,173,445 B1 | 1/2001 | Robins et al. | |
| 6,698,013 B1 | 2/2004 | Bertero et al. | |
| 6,721,696 B1 | 4/2004 | Askins et al. | |
| 7,620,948 B1* | 11/2009 | Rowe et al. | 717/171 |
| 8,584,095 B2 | 11/2013 | Bhandari et al. | |
| 8,605,034 B1 | 12/2013 | Roy | |
| 8,677,315 B1 | 3/2014 | Anderson et al. | |
| 2003/0160779 A1 | 8/2003 | Rabinovich et al. | |
| 2004/0189675 A1 | 9/2004 | Pretlove | |
| 2005/0149922 A1* | 7/2005 | Vincent | 717/172 |
| 2006/0282815 A1* | 12/2006 | Yodaiken et al. | 717/101 |
| 2007/0025342 A1* | 2/2007 | Obata | 370/352 |
| 2007/0271283 A1* | 11/2007 | Maryka et al. | 707/100 |
| 2007/0283323 A1* | 12/2007 | Boden et al. | 717/120 |
| 2008/0016176 A1 | 1/2008 | Leitner | |
| 2008/0250394 A1* | 10/2008 | Jones et al. | 717/123 |
| 2009/0144712 A1 | 6/2009 | Steensgaard et al. | |
| 2009/0150872 A1* | 6/2009 | Russell et al. | 717/140 |

(Continued)

FOREIGN PATENT DOCUMENTS

WO    WO2011130286 A1    10/2011

OTHER PUBLICATIONS

Kang G. Shin et al.; Fault-Tolerant Clock Synchronization in Distributed Systems; 1990 IEEE; pp. 33-42; <http://ieeexplore.ieee.org/stamp/stamp.jsp?tp=&arnumber=58235>.*

(Continued)

*Primary Examiner* — Thuy Dao
*Assistant Examiner* — Cuong V Luu
(74) *Attorney, Agent, or Firm* — Ridout & Maybee LLP

(57) ABSTRACT

The present disclosure provides a Web-based integrated development environment and graphical user interface for real-time collaborative application development which uses a connected device. Changes made to an application within the application development tool are applied to a connected mobile device in real-time or near real-time application.

21 Claims, 39 Drawing Sheets

(56) References Cited

U.S. PATENT DOCUMENTS

| | | | |
|---|---|---|---|
| 2009/0245747 A1 | 10/2009 | Beyabani | |
| 2009/0300578 A1 | 12/2009 | Neil | |
| 2009/0300580 A1 | 12/2009 | Heyhoe et al. | |
| 2010/0037209 A1* | 2/2010 | Sasaki | 717/123 |
| 2010/0070842 A1 | 3/2010 | Aymeloglu | |
| 2010/0185954 A1 | 7/2010 | Simernitski et al. | |
| 2010/0287525 A1 | 11/2010 | Wagner | |
| 2010/0325601 A1* | 12/2010 | Turner et al. | 717/101 |
| 2011/0035740 A1* | 2/2011 | Powell et al. | 717/170 |
| 2011/0055209 A1 | 3/2011 | Novac et al. | |
| 2011/0067004 A1 | 3/2011 | Birsan et al. | |
| 2011/0113348 A1 | 5/2011 | Twiss | |
| 2011/0115612 A1* | 5/2011 | Kulinets et al. | 340/10.42 |
| 2011/0141293 A1* | 6/2011 | Yoneyama et al. | 348/207.1 |
| 2011/0154300 A1 | 6/2011 | Rao et al. | |
| 2011/0314343 A1 | 12/2011 | Hoke et al. | |
| 2012/0047130 A1 | 2/2012 | Perez et al. | |
| 2012/0265742 A1 | 10/2012 | Burckhardt et al. | |
| 2012/0272192 A1 | 10/2012 | Grossman | |
| 2013/0104113 A1* | 4/2013 | Gupta et al. | 717/169 |
| 2013/0110978 A1 | 5/2013 | Gordon et al. | |
| 2013/0212556 A1 | 8/2013 | HeyHoe et al. | |
| 2013/0212568 A1* | 8/2013 | Huang et al. | 717/146 |
| 2014/0047413 A1 | 2/2014 | Sheive et al. | |
| 2014/0258894 A1 | 9/2014 | Brown et al. | |
| 2014/0324779 A1 | 10/2014 | Forbes et al. | |

OTHER PUBLICATIONS

P. Ramanathan et al.; Hardware-Assisted Software Clock Synchronization for Homogeneous Distributed Systems; 1990 IEEE; pp. 514-524; <http://ieeexplore.ieee.org/stamp/stamp.jsp?tp=&arnumber=54844>.*

Aiying Yang et al.; A Chirp-z-Transform-Based Software Synchronization Method for Optical Performance Monitoring; 2011 IEEE; pp. 1739-1741; <http://ieeexplore.ieee.org/stamp/stamp.jsp?tp=&arnumber=6033052>.*

Darryl Veitch et al.; Robust synchronization of software clocks across the internet; 2004 ACM; pp. 219-232; <http://dl.acm.org/citation.cfm?id=1028817>.*

Igor Ivkcovic et al.; Tracing Evolution Changes of Software Artifacts through Model Synchronization; 2004 IEEE: 10 pages; <http://ieeexplore.ieee.org/stamp/stamp.jsp?tp=&arnumber=1357809>.*

Hongliang Duan et al.; A Time Synchronization Mechanism Based on Software Defined Radio of General-Purpose Processor; 2012 ICST; pp. 772-777; <http://ieeexplore.ieee.org/stamp/stamp.jsp?tp=&arnumber=6417588>.*

Website, "Cloud9 IDE—Online IDE", as accessed on or before Feb. 7, 2013, from <https://c9.io/site/code-smarter-code-together>.

Website, "Overview of Google Slides", as accessed on or before Feb. 7, 2013, from <https://support.google.com/docs/bin/answer.py?hl=en&answer=126127&topic=19431&rd=1>.

Website, "TitanPad", as accessed on or before Feb. 7, 2013, from <http://titanpad.com>.

Website, "Devices Organizer Help: Comparing iOS Screenshots", as accessed on or before Feb. 7, 2013, from <http://developer.apple.com/library/mac/#recipes/xcode_help-devices_organizer/articles/compare_screenshots.html>.

Website, "Gundo—Visualize your Vim Undo Tree", as accessed on or before Feb. 7, 2013, from <http://sjl.bitbucket.org/gundo.vim>.

Website, "Undo Architecture: Undo Manager", as accessed on or before Feb. 7, 2013, from <https://developer.apple.com/library/mac/#documentation/Cocoa/Conceptual/UndoArchitecture/Articles/UndoManager.html>.

D'Ambros et al., "Fractal Figures: Visualizing Development Effort for CVS Entities", as accessed on or before Feb. 7, 2013, from <http://www.inf.usi.ch/faculty/lanza/Downloads/DAmb05b.pdf>.

Website, "EMCO Remote Screenshot 2", as accessed on or before Feb. 7, 2013, from <http://www.kirpisoft.com/products/EMCO-Remote-Screenshot-2.html>.

Website, "How to Take Screenshots of Andriod Device", as accessed on or before Feb. 7, 2013, from <http://www.addictivetips.com/mobile/how-to-take-screenshots-of-android-device>.

Website, "Make a Splash", TheAppBuilder Blog, as accessed on or before Feb. 7, 2013, from <http://theappbuilderblog.wordpress.com/tag/splash-screen>.

Website, "Palm debuts GUI builder for WebOS", Dec. 22, 2009, <http://www.linuxfordevices.com/c/a/News/Palm-Ares-and-2Q-earnings-report/>.

Rex Bryan Kline and Ahmed Seffah, Evaluation of integrated software development environments: Challenges and results from three empirical studies, Int. J. Human-Computer Studies, 2005, vol. 63, p. 607-627.

Website, "Drag and Drop Everything With 30 Handy jQuery Plugins", as accessed on or before Aug. 24, 2012, <http://www.1stwebdesigner.com/freebies/drag-drop-jquery-plugins/>.

Website, "Xcode 4 User Guide", as accessed on or before Aug. 24, 2012, <https://developer.apple.com/technologies/tools/>.

Website, "Xcode 4 User Guide: Edit User Interfaces", as accessed on or before Aug. 24, 2012, <https://developer.apple.com/library/ios/#documentation/ToolsLanguages/Conceptual/Xcode4UserGuide/030-Edit_User_Interfaces/edit_user_interface.html#//apple_ref/doc/uid/TP40010215-CH6-SW41>.

Website, "Build your web presence on Wix.com—Websites are just the begining—Wix.com", as accessed on or before Aug. 24, 2012,<http://www.wix.com/about/features>.

Website, "Website builder, website development software—Adobe Dreamweaver CS 6—Features", as accessed on or before Aug. 24, 2012, <http://www.adobe.com/ca/products/dreamweaver/features.html>.

Website, "Phonegap—Home", as accessed on or before Aug. 24, 2012, <http://www.phonegap.com/>.

Website, "Remote Application Debug on Android* OS", Jun. 13, 2012, <http://software.intel.com/en-us/articles/application-debug-android/>.

Website, "How to debug on a real device (using Eclipse/ADT)", at least as early as Mar. 5, 2013, <http://stackoverflow.com/questions/2714400/how-to-debug-on-a-real-device-using-eclipse-adt>.

Website, "Production Debugging for .NET Framework Applications", Nov. 2012, <http://msdn.microsoft.com/en-us/library/ee817659.aspx>.

Website, "Developing a Composite Control", at least as early as Mar. 5, 2013, <http://msdn.microsoft.com/en-us/library/aa719968(v=vs.71).aspx>.

Website, "Developing a Templated Control", at least as early as Mar. 5, 2013, <http://msdn.microsoft.com/en-us/library/aa719862(v=vs.71).aspx>.

Website, "what is composite control in asp.net?How we create composite control?", at least as early as Mar. 5, 2013, <http://stackoverflow.com/questions/1152032/what-is-composite-control-in-asp-nethow-we-create-composite-control>.

Website, "A Crash Course on asp.net Control Development: Building Composite Controls", Feb. 2006, <http://msdn.microsoft.com/en-us/library/aa479016.aspx>.

Andrew J. Ko, Brad A. Myers, Designing the whyline: a debugging interface for asking questions about program behavior, Proceedings of the SIGCHI Conference on Human Factors in Computing Systems, p. 151-158, Apr. 24-29, 2004, Vienna, Austria ("Ko").

Gerald M. Karam, Visualization using timelines, Proceedings of the 1994 ACM SIGSOFT international symposium on Software testing and analysis, p. 125-137, Aug. 17-19, 1994, Seattle, Washington, USA ("Karam").

Rischpater, Ray, and Daniel Zucker. "Introducing Qt Quick." Beginning Nokia Apps Development. Apress, 2010. 139-158, ("Rischpater").

Jonathan's Blog, "My Thoughts on QML and the Desktop" [online] May 2012, [retrieved on Oct. 2, 2015], retrieved from Internet <http://jontheechidna.wordpress.com/2012/05/19/my_thoughts_on_qml_and_the_desktp/>.

* cited by examiner

Star Project
UserA
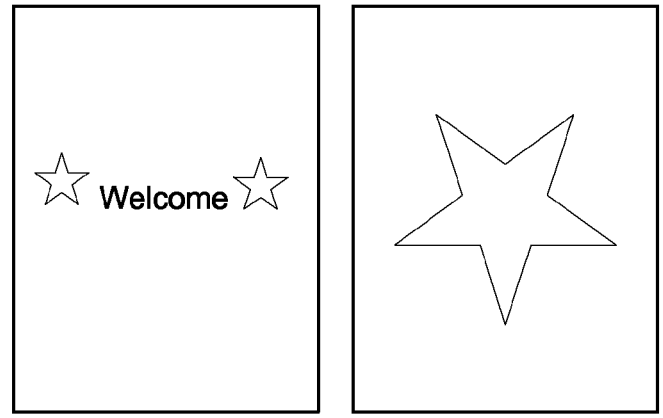
FIG. 17A
Star Project
UserA
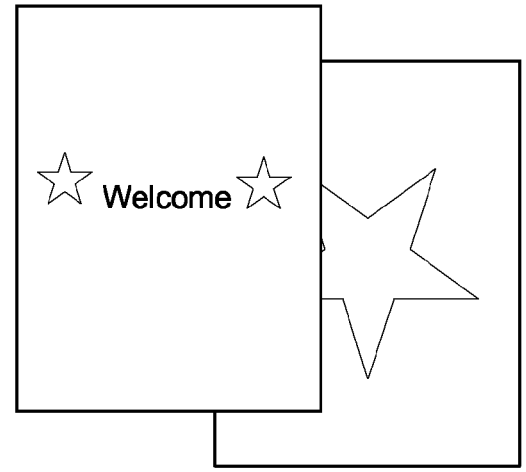
FIG. 17B ically to a Web-based integrated development environment and graphical user interface for real-time collaborative application development which uses a connected device.

COLLABORATIVE APPLICATION DEVELOPMENT ENVIRONMENT USING A CONNECTED DEVICE

RELATED APPLICATION DATA

The present disclosure claims priority to U.S. patent application Ser. No. 13/785,026, filed Mar. 5, 2013, U.S. patent application Ser. No. 13/785,073, filed Mar. 5, 2013, U.S. patent application Ser. No. 13/785,309, filed Mar. 5, 2013, and U.S. patent application Ser. No. 13/785,093, filed Mar. 5, 2013, the contents of which are incorporated herein by reference.

TECHNICAL FIELD

The present disclosure relates to integrated development environments, and more particularly to a Web-based integrated development environment and graphical user interface for real-time collaborative application development which uses a connected device.

BACKGROUND

Integrated development environments (IDEs) provide an interface through which developers can author, modify, compile and deploy software. With the growth of application development for mobile devices, there remains a need for improved methods and devices for developing software in an IDE.

BRIEF DESCRIPTION OF THE DRAWINGS

FIGS. 17A and 17B are example Showcase user interface screens of the application development tool in accordance with an example embodiment of the present disclosure.

DETAILED DESCRIPTION

Figure 1:
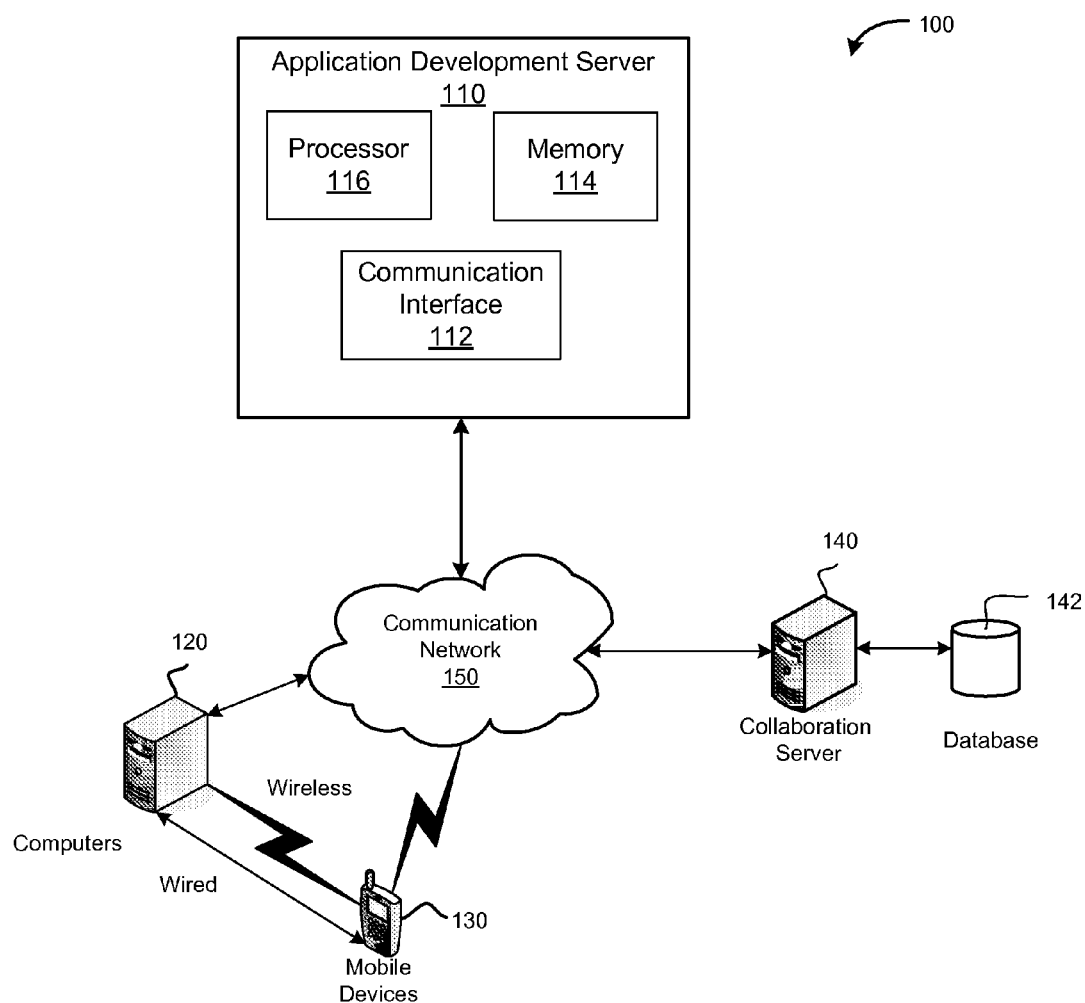
FIG. 1 is a block diagram illustrating a network environment including a computer and a mobile communication device for interacting in accordance with example embodiments of the present disclosure.

Reference will now be made to the accompanying drawings which show example embodiments of the present disclosure. For simplicity and clarity of illustration, reference numerals may be repeated among the Figures to indicate corresponding or analogous elements. Numerous details are set forth to provide an understanding of the example embodiments described herein. The example embodiments may be practised without some of these details. In other instances, well-known methods, procedures, and components have not been described in detail to avoid obscuring the example embodiments described. The description is not to be considered as limited to the scope of the example embodiments described herein.

Any reference to direction or orientation stated herein is for convenience and is not intended to be limiting unless explicitly stated herein. Any directional references in relation to the graphical user interface (GUI) are relative to the screen orientation of the GUI rather than a fixed point or reference on the host electronic device. The term "user interface" is sometimes used herein to refer to the GUI for convenience. For the purpose of the present disclosure, the terms device orientation and device position are treated equivalently. The term "collaborating devices" means client devices, such as computers or mobile devices, which are currently connected to a server and accessing the same application under development unless otherwise indicated either explicitly or implicitly. The terms "client device" and "client" are used interchangeable within the present disclosure.

The present disclosure provides methods and devices for real-time collaboration on an application under development among two or more collaborating devices, which may be at the same or different locations. A server stores the application code for the application. Changes to the application, which may be additions, deletions or modifications, made by the collaborating devices are sent to the server. The server then distributes the changes to other collaborating devices in real-time or near real-time, which update the current state of the application to reflect the changes.

The present disclosure provides a web-based integrated development environment (IDE) tool which may allow multiple users to collaborate on a coding project, such as the development of an application for a mobile device. Typically, collaborative application development involves multiple users making independent changes in a separate copy of the application, and later merging the changes together in some manner. This can be a cumbersome task and some external co-ordination of tasks may be required since the tasks need to be carried out independently before the tasks can be combined. This can be especially problematic if two users want to collaborate on aspects of a user interface which are highly "visual". Code changes made by one user may have a direct and notable effect on another user. For example, if a designer wishes to change the visual assets of an application, a developer may also have to change the positioning or behaviour of certain user interface elements to reflect the changes, but it may not be apparent that such changes are required until the changes of the developer are combined with the changes of the designer.

The web-based IDE tool of the present disclosure allows real-time collaborative application development and optionally "always-save" functionality. An application may be shared between two or more users using the web-based tool. Each user runs the tool in a Web browser on a computer with a persistent connection (e.g., HTTP connection, HTTPS connection, etc.) to a central server. If any user makes a change to the application, the change is sent to the devices of other users in the group which are online and the displayed application is automatically updated to reflect the change. As a result, all of the collaborating users have the current state of the application at all times and there is no need to perform manual synchronization to bring individual changes by the users together. Rather than working independently, the users work truly collaboratively.

The types of changes may include: (1) object creation (i.e., a new user interface control may be dropped onto a page)—this change includes information about the active page, the parent object that received the new object, the index/position within the parent where the new object was placed, etc.; (2) object deletion (i.e., an existing user interface control is dragged from a page)—this change includes information about the active page, and the object that was removed from the page; and (3) object change (i.e., some property of an existing user interface control is modified)—this change includes information about the active page, the object that was modified, the specific property that was modified, and the new property value. Other changes can include, for example, page creation and page deletion, etc.

For every change, enough information is provided to apply the change, and optionally enough information to reverse (i.e., rewind/undo) the change. This information may be used in conjunction with a visual timeline to move back and forth through a series of changes to the application.

Each collaborating device which is connected to the server may receive changes to the application state stored from the server which stores the application code at various states and incremental changes between such states. When the application state is updated in response to a change made by a collaborating device, the server may notify all of the other collaborating devices with the details of the change so that the other collaborating devices can all apply the change in real-time or near real-time. As a result, the displayed application on each collaborating device may be updated to reflect the current state of the application in real-time or near real-time. Thus, for example, if a first user is viewing a page that a second user is editing, the first user can see any changes to that made to the page by the second user in real-time or near real-time, regardless of whether the first user is working on the page being viewed. The first user and second user could even be manipulating different properties of the same user interface element. It is contemplated that the first user and second user could possibly even be manipulating the same properties of the same user interface element. While this could cause conflicts in some instances, one or more conflict resolution techniques could be used to resolve such conflicts. For example, a last change wins rules could be implemented which means whichever change was made last will be implemented. Other approaches could be used.

In one embodiment, the server also saves the entire list of incremental changes so that the application can be rebuilt from any previous save point by starting at the save point and then applying all of the subsequent incremental changes. This results in an effect similar to "autosave", thereby providing "always-save" functionality. If a user forgets to save the changes to the application before exiting the Web browser, or if the Web browser terminates unexpectedly, the state of the application can be restored using the list of incremental changes.

In some embodiments, the user never has to explicitly save the application. Rather, the server saves all incremental changes, and the server or one or more of the clients may periodically and automatically select points at which to create a save point without the user being aware that it has happened. For example, after changes that are particularly computationally expensive to apply, the server may automatically save the application so that the expensive change does not have to be applied the next time the application is opened.

Similarly, a visual timeline or "undo history" for the application can actually extend back in time to the beginning of the application even if there have been save points in between. This may allow a user to reverse (i.e., rewind/undo changes) the application to the very beginning, regardless of whether or when the application was last explicitly saved.

The web-based tool of the present disclosure may also facilitate working with image assets by providing automatic propagation of updated images, in an attempt to obviate at least some of the shortcomings conventionally experienced during collaborative application development. When working in code, image assets can be difficult to visualize. In particular, if a user makes a change to an image asset, viewing the updated asset in context in the editor may require a "refresh" of the editor user interface screen. Viewing the image asset in context on a test device may require a compilation and deployment step. This can introduce considerable waiting time each time an image is updated, and if several iterations are required, then this can be a time-consuming process. If multiple users are collaborating on the same application, one user such as a designer may be updating image assets while another user such as a developer may be updating other aspects of the application. In such cases, it is important for the developer to have up to date visual assets in order to work effectively. Avoiding a manual "refresh" is advantageous since it is time consuming and requires the developer to remember to periodically perform the refresh.

The web-based tool of the present disclosure allows image objects in an editor user interface screen to maintain a dynamic link to the image that the image objects. If a user adds replaces an existing image, for example by dragging a new image into the editor user interface screen, all instances of the existing image are automatically and instantly replaced with the new image without requiring a manual refresh. If a test device is connected for live publishing, then the updated image is automatically pushed to the test device as well. The images may be updated immediately without the need to restart the running application on the connected test device, and without a manual refresh or compilation. If multiple users are collaborating on the same application and one user updates an image asset, the client collaborating devices of the other users may be notified that the image has changed and the client collaborating devices all pick up the new image asset automatically. The client collaborating devices may then automatically update all instances of the existing image without a manual refresh or compilation. As a result, the images are kept "in synch" between all live instances of the application, in the local editor, in remote editors, and on any connected test devices.

It will be appreciated that there may be multiple instances of a single image (e.g., multiple controls that share the same background image) and that all instances are updated immediately as soon as the new image asset changes. The web-based tool also cooperates with a "connected device" that is actually executing the code from the editor in real-time. It is also contemplated that the automatic propagation of the web-based tool could be applied to other types of assets such as XML, text, etc.

The web-based tool of the present disclosure may also allow multiple users, such as a community of developers and designers, to collaborate on a number of projects, such as applications for mobile devices. Users can see the active applications and the changes in those applications.

In one embodiment, one or more pages from one or more applications which a user has access to are presented. The pages may show a number of applications at one time, show the changes being made as the changes happen in the same fashion as changes to a particular application the user is working on is shown, and may also show who is working on which applications in real-time or near real-time. A user has access to applications created by the user, applications explicitly shared with the user, and public applications that all users can access.

For each of the applications that a user has access to, the collaborating device may request the current state and render the current state of the application. All or a subset of the pages of the application can be rendered. The rendered applications can be sorted according to most recently created, or most recently edited, or other criteria. When a persistent connection to the server is established, each collaborating device receives changes to the each application a respective user has access to. When a change is made to one of the applications, the server will return the details for the change and it can be applied to the corresponding page of the corresponding application. Optionally, the page of the application may move or "bubble" of the top of the displayed pages of the applications to bring the application in view if it was below the page scroll, or otherwise bring the changed application to the attention of the user. A description or note describing who is working in the application may be displayed in association with the page. Because the server knows the last incremental change for each user, and how long ago the change happened, the collaborating device can accurately place user avatars in association with the applications which users are working on.

Referring first to FIG. 1, a communication system 100 in accordance with example embodiments of the present disclosure is shown. The architecture includes an application development server (ADS) 110, one or more general purpose computers 120 (only one of which is shown in FIG. 1), one or more mobile communication devices 130 (only one of which is shown in FIG. 1) optionally connected to a computer 120 via a wired link (e.g., Universal Serial Bus (USB)) and/or wireless link (e.g., Wi-Fi or possibly Bluetooth™), and one or more collaboration servers 140 (only one of which is shown in FIG. 1) each having an application database 142, each of the devices having access to a communication network 150, e.g., the Internet. The mobile communication devices 130 may also directly connect to the ADS 110 over a wireless network via wireless link.

The communication network 150 may include a number of wired and/or wireless networks. The communication network 150 may include public and/private networks, for example, the communication network 150 may comprise a private local area network (LAN), metropolitan area network (MAN), wide area network (WAN), the public Internet or combinations thereof and may include virtual networks constructed using any of these, alone, or in combination. Computers 120 may be connected to the communication network 150 directly or indirectly via an intermediate communication network such as the Internet. A VPN or other mechanism for securely connecting to the communication network 150 may be required when computers 120 connect to the communication network 150 indirectly, e.g. via the Internet.

The wireless networks may comprise one or more of a Wireless Wide Area Network (WWAN) and a Wireless Local Area Network (WLAN) or other suitable network arrangements. The computers 120 and mobile communication devices 130 may be configured to communicate over both the WWAN and WLAN, and to roam between these networks. The wireless network may comprise multiple WWANs and WLANs.

The mobile communication devices 130 may interface with a computer 120 connected to the communication network 150 via one or both of a physical interface and short-range wireless communication interface to provide a direct connection. The physical interface may comprise one or combinations of an Ethernet connection, USB connection, Firewire™ (also known as an IEEE 1394 interface) connection, or other serial or parallel data connection, via respective ports or interfaces of the connecting devices. The short-range wireless communication interface may be a personal area network (PAN) interface. A personal area network is a wireless point-to-point connection meaning no physical cables are required to connect the two end points. Alternatively, in embodiments, in which the ADS 110 is able to contact the mobile communication device 130 directly, then the direct connection between the computer 120 and the mobile communication device 130 may be omitted.

In the shown example, the communication system 100 includes one or more separate collaboration servers 140 each having an application database 142. The collaboration servers 140 may be located at the same or different locations. The collaboration servers 140 may each be restricted to a set of users/devices, such as those of a particular enterprise (e.g., business or organization), or may be open to all users/devices connected to the ADS 110. The databases 142 are used to store applications and applications under development including application source code, application machine code/compiled source code, application data, user information, change logs, images, libraries, and other application data. A collaboration server 140 could be hosted on a computer 120 in some embodiments. In other embodiments, the functions of the collaboration servers 140 may be performed by the ADS 110 rather than having separate collaboration servers 140, and the contents of the application database 142 may be stored in local or remote storage of the ADS 110.

It will be appreciated that the above-described communication system is provided for the purpose of illustration only, and that the above-described communication system comprises one possible communication network configuration of a multitude of possible configurations. Suitable variations of the communication system will be understood to a person of skill in the art and are intended to fall within the scope of the present disclosure.

Each of the computers 120 has client software which allows the computers to connect to server software on the ADS 110 for operating the IDE application development tool. In the described embodiment, the computers 120 include an Internet browser and connect to a Web server provided by the ADS 110. The majority of the logical of the ADS 110 is located on the ADS 110. The ADS 110 is a Web server and can be any one or more general purpose computing systems providing sufficient processing resources and interfaces to interact with an anticipated number of devices. The application development tool will be described in more detail below.

Figure 2:
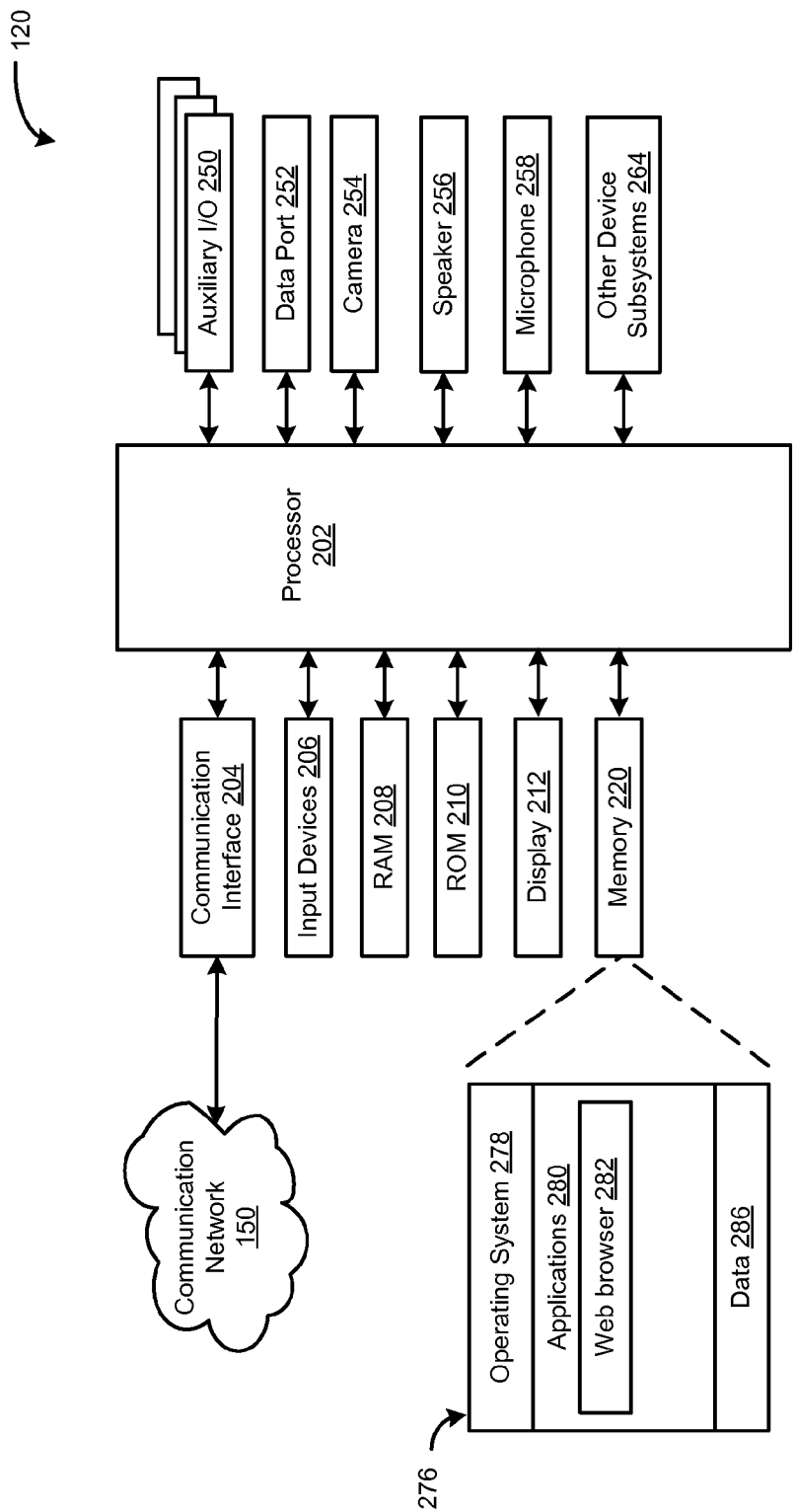
FIG. 2 is a block diagram illustrating a computer or computer suitable for executing an application development tool in accordance with example embodiments of the present disclosure.

Reference is next made to FIG. 2 which shows a computer 120 suitable for executing an IDE application development tool in accordance with example embodiments of the present disclosure. The computer 120 includes a rigid case (not shown) housing the electronic components of the computer 120 computer 120. The electronic components of the computer 120 are mounted on a printed circuit board (not shown). The computer 120 includes a processor 202 which controls the overall operation of the computer 120 and a communication interface 204 for communicating with other devices via the communication network 150.

The processor 202 interacts with other components, such as one or more input devices 206 such as a keyboard and mouse, Random Access Memory (RAM) 208, Read Only Memory (ROM) 210, a display 212, persistent (non-volatile) memory 220 which may be flash erasable programmable read only memory (EPROM) memory ("flash memory") or any other suitable form of memory, auxiliary input/output (I/O) subsystems 250, data port 252 such as a serial data port (e.g., Universal Serial Bus (USB) data port), camera 254 such as video and/or still camera, speaker 256, microphone 258 and other device subsystems generally designated as 264. The components of the computer 120 are coupled via a communications bus (not shown) which provides a communication path between the various components.

The display 212 may be provided as part of a touchscreen which provides an input device 206. The display 212 which together with a touch-sensitive overlay (not shown) operably coupled to an electronic controller (not shown) comprise the touchscreen. User-interaction with the GUI is performed through the input devices 206. Information, such as text, characters, symbols, images, icons, and other items are rendered and displayed on the display 212 via the processor 202.

The processor 202 operates under stored program control and executes software modules 276 stored in memory, for example, in the persistent memory 220. The persistent memory 220 also stores data 386 such as user data. As illustrated in FIG. 2, the software modules 276 comprise operating system software 278 and software applications 280. The software applications 280 include a Web browser 282. The software modules 276 or parts thereof may be temporarily loaded into volatile memory such as the RAM 208. The RAM 208 is used for storing runtime data variables and other types of data or information. Although specific functions are described for various types of memory, this is merely one example, and a different assignment of functions to types of memory could also be used.

Application data associated with an application under development and the IDE is provided by the Web browser 282 such that no application data or IDE software is stored on the computer 120 with the exception of data stored temporarily in cache or the like. Accordingly, the computer 120 provides a thin client with little or no processing logic. The IDE and application data, such as source code and other data associated with applications under development, digital media such as images, and change logs, is stored in a remote database, such as the memory 114 of the ADS 110. In other embodiments, the local storage of the Web browser 282 may be used to save some application data (also referred to as project data).

The communication interface 204 may include a short-range wireless communication subsystem (not shown) which provides a short-range wireless communication interface. The short-range wireless communication interface is typically Bluetooth® interface but may be another type of short-range wireless communication interface including, but not limited to, an infrared (IR) interface such as an Infrared Data Association (IrDA) interface, an IEEE 802.15.3a interface (also referred to as UltraWideband (UWB)), Z-Wave interface, ZigBee interface or other suitable short-range wireless communication interface.

Figure 3:
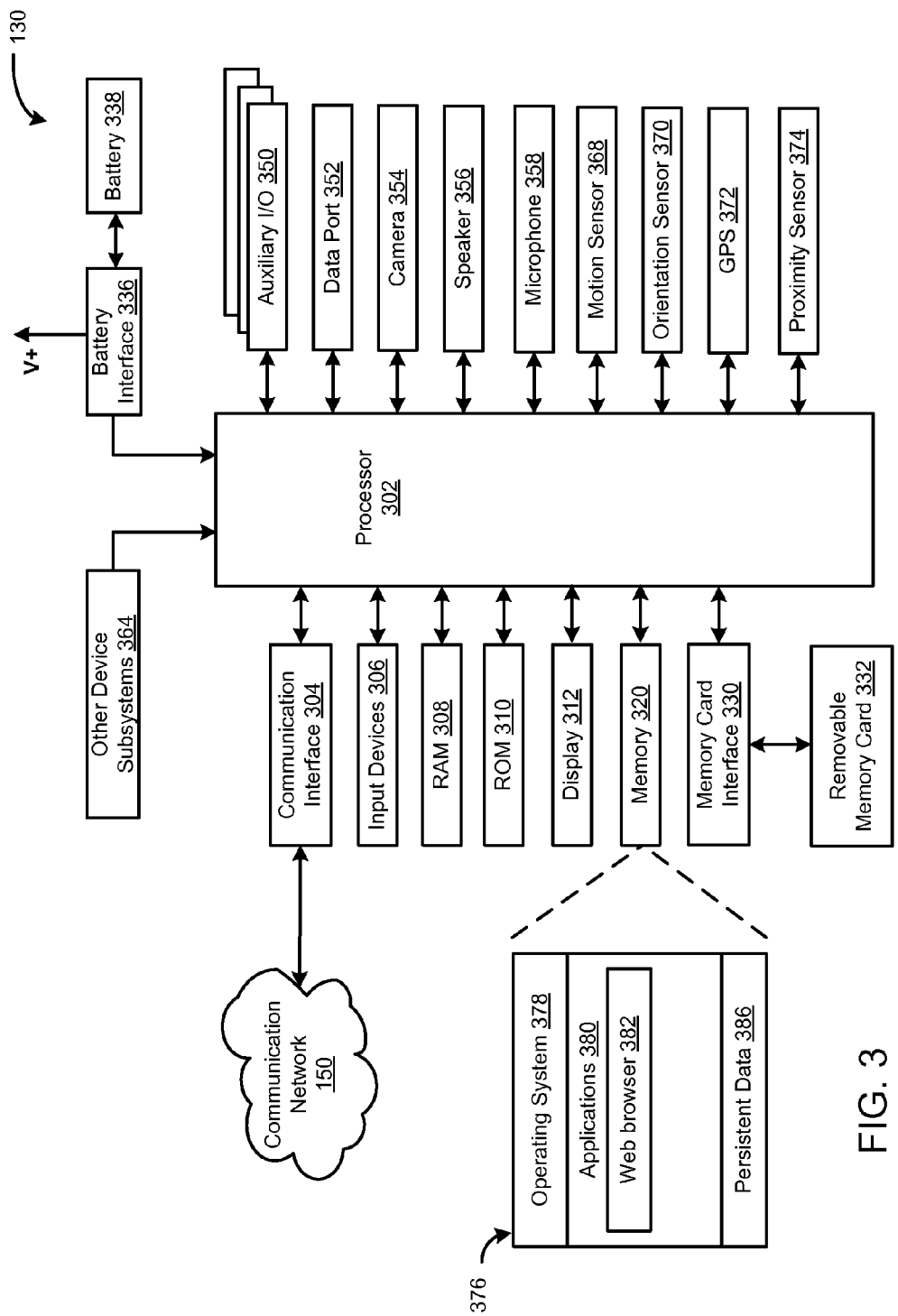
FIG. 3 is a block diagram illustrating a mobile communication device suitable for interacting with a computer operating an application development tool in accordance with example embodiments of the present disclosure and for operating as a device under test.

Reference is next made to FIG. 3 which illustrates a mobile communication device 130 (referred to hereinafter as merely mobile device 130 for convenience) suitable for interacting with a computer operating an IDE application development tool in accordance with example embodiments of the present disclosure and for operating as a device under test. Examples of the mobile device 130 include, but are not limited to, a mobile phone, smartphone or superphone, tablet computer, notebook computer (also known as a laptop, netbook or ultrabook computer depending on the device capabilities), wireless organizer, personal digital assistant (PDA), electronic gaming device, and special purpose digital camera.

The mobile device 130 includes a rigid case (not shown) housing the electronic components of the mobile device 130. The electronic components of the mobile device 130 are mounted on a printed circuit board (not shown). The mobile device 130 includes a processor 302 which controls the overall operation of the mobile device 130. Communication functions, including data and voice communication, are performed through a communication interface 304. The communication interface 304 receives messages from and sends messages via the communication network 150. The communication interface 304 typically includes a WWAN interface for communication over cellular networks and a WLAN interface for communication over Wi-Fi networks.

The processor 302 interacts with other components, such as one or more input devices 306, RAM 308, ROM 310, a display 312, persistent (non-volatile) memory 320 which may be flash memory or any other suitable form of memory, auxiliary I/O subsystems 350, data port 352 such as serial data port (e.g., Universal Serial Bus (USB) data port), camera 354 such as video and/or still camera, speaker 356, microphone 358, a motion sensor 368 which enables to processor 302 to determine whether the mobile device 130 is in motion and the nature of any sensed motion at any appropriate time, an orientation sensor 370 which enables the processor 302 to determine which direction the mobile device 130 is pointed at any appropriate time, a global positioning system (GPS) device 372 which enables the processor 302 to determine GPS coordinates (i.e., location) of the mobile device 130 at any appropriate time, proximity sensor 374 which enables the processor 302 to determine the distance between the mobile device 130 and an object at any appropriate time, and other device subsystems generally designated as 364. The components of the mobile device 130 are coupled via a communications bus (not shown) which provides a communication path between the various components.

The display 312 may be provided as part of a touchscreen which provides an input device 306. The display 312 which together with a touch-sensitive overlay (not shown) operably coupled to an electronic controller (not shown) comprise the touchscreen. User-interaction with the GUI is performed through the input devices 306. Information, such as text, characters, symbols, images, icons, and other items are rendered and displayed on the display 312 via the processor 302. The processor 302 may interact with the orientation sensor 370 to detect direction of gravitational forces or gravity-induced reaction forces so as to determine, for example, the orientation of the mobile device 130 in order to determine a screen orientation for the GUI.

The input devices 306 may include a keyboard, control buttons (not shown) such as a power toggle (on/off) button, volume buttons, camera buttons, general purpose or context specific buttons, 'back' or 'home' buttons, phone function buttons, and/or a navigation device. When the display 312 is provided as part of a touchscreen, the various buttons or controls may be provided by onscreen user interface elements displayed on the display 312 instead of, or in addition to, physical interface components. The keyboard may be provided instead of, or in addition to, a touchscreen depending on the embodiment. At least some of the control buttons may be multi-purpose buttons rather than special purpose or dedicated buttons.

The mobile device 130 also includes a memory card interface 330 for receiving a removable memory card 332 comprising persistent memory, such as flash memory. A removable memory card 332 can be inserted in or coupled to the memory card interface 330 for storing and reading data by the processor 302 including, but not limited to still images and optionally video images captured the image capture assembly 200. Other types of user data may also be stored on the removable memory card 332. Other types of removable digital image storage media, such as magnetic hard drives, magnetic tape, or optical disks, may be used in addition to, or instead of, the removable memory card 332.

The processor 302 operates under stored program control and executes software modules 375 stored in memory, for example, in the persistent memory 320. The persistent memory 320 also stores data 386 such as user data, user information and information regarding the components and technical capabilities of the mobile device 130. As illustrated in FIG. 3, the software modules 376 comprise operating system software 378 and software applications 380. The software applications 380 may include a Web browser 382. The software modules 376 or parts thereof may be temporarily loaded into volatile memory such as the RAM 308. The RAM 308 is used for storing runtime data variables and other types of data or information. Although specific functions are described for various types of memory, this is merely one example, and a different assignment of functions to types of memory could also be used.

One or more mobile devices 130 may be configured as a test device for testing applications under development, hereinafter referred to as test devices. The test devices may have differing device properties, such as technical capabilities, which may include one or any combination of different display sizes, display shapes (e.g., aspect ratio), and display resolutions, as well as different primary input devices 306 (e.g., touchscreen only, touchscreen and keyboard, keyboard and conventional non-touchscreen display 312). The test devices include communication modules for communicating with the ADS 110 and/or computer 120, depending on the embodiment.

The communication interface 304 may include a short-range wireless communication subsystem (not shown) which provides a short-range wireless communication interface. The short-range wireless communication interface is typically Bluetooth® interface but may be another type of short-range wireless communication interface including, but not limited to, an IR interface such as an IrDA interface, an IEEE 802.15.3a interface (also referred to as UWB), Z-Wave interface, ZigBee interface or other suitable short-range wireless communication interface.

The mobile device 130 also includes a battery 338 as a power source, which is typically one or more rechargeable batteries that may be charged, for example, through charging circuitry coupled to a battery interface such as the serial data port 352. The battery 338 provides electrical power to at least some of the electrical circuitry in the mobile device 130, and the battery interface 336 provides a mechanical and electrical connection for the battery 338. The battery interface 336 is coupled to a regulator (not shown) which provides power V+ to the circuitry of the mobile device 130.

A received signal, such as a text message, an e-mail message, or web page download, is processed by the communication subsystem 304 and input to the processor 302. The processor 302 processes the received signal for output to the display 312 and/or to the auxiliary I/O subsystem 350. A subscriber may generate data items, for example e-mail messages, which may be transmitted over the communication network 150 through the communication subsystem 304, for example.

The motion sensor 368 may comprise an accelerometer (such as a three-axis accelerometer) or other suitable motion sensor. The orientation sensor 382 may comprise an accelerometer (such as a three-axis accelerometer), electronic compass, gyroscope, or a combination thereof. Other suitable orientation sensors could be used instead of, or in addition to, the accelerometer, electronic compass and gyroscope. The motion sensor 368 and orientation sensor 382, or parts thereof, may be combined or shared, for example, within an integrated component. The processor 302, or controller (not shown) of a three-axis accelerometer, can convert acceleration measurements into device orientations.

The proximity sensor 374 may comprise a sensor that transmits a field or signals (such as electromagnetic) to detect the presence of nearby objects (i.e. the sensor's target). The maximum distance that the proximity sensor 374 can detect is may be predetermined or adjustable. The processor 302 can utilize this information to determine the distance between the mobile device 130 and the target object to be captured in an image.

The mobile device 130 may connect to a computer 120 via the data port 352, such as a USB connection or Firewire™ connection, or a short-range communication interface, such as a Bluetooth™ connection.

Application Framework

The IDE and application development tool of the present disclosure, in at least some embodiments, may be configured to develop applications for use with, for example, the Cascades™ application framework for the BlackBerry™ 10 operating system. The Cascades™ application framework includes Cascades™ application programming interfaces (APIs), Qt APIs, Cascades™ libraries, Qt libraries for developing applications for mobile devices 130 and optionally native C/C++APIs. In other embodiments, the Cascades™ application framework could support one or more operating systems in addition to, or instead of, the BlackBerry™ 10 operating system. In yet other embodiments, the IDE and application development tool could use a different application framework for developing applications for mobile devices 130 using one or more different operating systems, or could use a cross-platform application framework for developing applications for mobile devices 130 using one of a number of different operating systems.

As will be appreciated to persons skilled in the art, Qt is a cross-platform application framework commonly used for developing applications with a GUI (in which cases Qt is classified as a widget toolkit). Qt is based on C++ but uses a special code generator called the Meta Object Compiler (MOC) together with several macros to extend the language. The Cascades™ application framework leverages the Qt object model, event model and threading model. The slots and signals mechanism in Qt allows for useful and flexible inter-object communication. The Cascades™ application framework incorporates features of fundamental Qt classes (such as QtCore, QtNetwork, QtXml, and QtSql, and others) and builds on these Qt classes.

The Cascades™ application framework separates application logic and user interface elements. Application logic is handled by an interpreter and user interface elements are rendered by a user interface (UI) rendering engine. The type of each UI control in an application, its properties and behavior are declared. When the application is run, the UI rendering engine displays the UI controls and applies any transitions which have been specified. In contrast, in a traditional, window-based UI framework, a simple animation or transition might require hundreds of lines of code. To create a sophisticated UI within a window-based UI framework, a lot of code may be required to locate UI controls where and when the UI controls are needed. Additionally, the graphics code for a UI can be difficult to maintain using a window-based UI framework especially for multiple screen sizes.

The application logic (or business logic) and the UI rendering engine run on separate execution threads that communicate asynchronously. The separation of application and rendering logic means that the UT rendering engine does not need to wait for a long running computation to complete before updating the UT. This makes the Cascades™ application framework both fast and easy to use, and helps applications present a UI at a consistently high frame rate which keeps the UI smooth and responsive.

Within the Cascades™ application framework, each application comprises as a number of interconnected pages in which each page is configured to be displayed on the display of a mobile device 130. Each page is written in Qt Modeling Language (QML) and comprises one or more QML document files. It is contemplated that the QML code in a page could interact with native (C++) code as noted below. The application logic defines how the pages interact with each other and input and output data, whereas the user interface elements define how the appearance of the pages. Typically, each page is configured to be displayed full screen on the display of a mobile device 130. The screen orientation in which each page is displayed is defined by the application and reflected in the orientation of the user interface elements. The page size and aspect ratio of each page is also defined by the application and reflected in the page size and aspect ratio of the user interface elements of each page. It will be appreciated; however, that more than one page size and/or aspect ratio may be supported by an application, in which case the page size and aspect ratio are defined on per device configuration basis. Each page typically has its own unique identifier (ID) such as the file name of the page.

Each QML document includes one or more QML objects each having a number of properties which depend on the type of object. The QML objects within each QML document are linked in a hierarchical relationship. Each QML object has a unique ID. The unique ID, in at least some embodiments, is automatically assigned when the object is created in accordance with a predefined algorithm, and typically consists of a prefix which specifies the object type and a suffix which specifies the object's number in the total number of objects of that type. The unique ID which is assigned may be changed by the user.

The application development tool of the present disclosure utilizes a UI rendering engine for rendering UI elements of an application on client devices, such as computers 120, connected to the ADS 110 via the Internet. The client devices include a QML parser written in JavaScript which parses the QML of the application pages. The QML parser may be downloaded as part of the content downloaded by the Web browser 282 on the computer 120 when accessing the website where the application development server is hosted. When the application is published to a supported mobile device 130, a QML parser is provided as part of the Cascades™ UI rendering engine on the mobile device 130, for example, as part of the operating system 378 or application 380.

The Cascades™ application framework supports applications written in C++, QML, or a combination of C++ and QML. QML is a declarative language that is based on JavaScript which was developed to create user interfaces using a powerful but simple language. QML can be used to describe the structure and behavior of a set of UI controls. QML uses concepts such as objects, properties, and signals and slots to let objects communicate with each other.

The Cascades™ application framework uses a modified form of QML for creating UIs in applications. QML makes it easy to identify the relationships between the various components in an application, as described in more detail below. QML allows developers to more easily see how UI controls are related to each other and how the controls may be laid out visually in an application. One control can belong to another control (that is, being owned by another control) using object ownership, discussed below.

Each Cascades™ UI control is represented by an underlying C++ class. For most properties of QML controls, there are associated C++ functions that can be used to retrieve or set the values of these properties. As noted above, applications can be made using QML, C++ or both. However, even if an application is entirely in QML, C++ code is typically used to load the QML and start the application started. This C++ code is provided by the IDE and application development tool when an application is created.

QML is typically used to define the look and feel of an application. Core UI controls, such as buttons, text fields, labels, sliders, and drop-down menus can be used, or custom controls can be created, and user interaction like button clicks can be responded to. Different layouts can be used to arrange the controls to obtain the desired look. With QML, visual designs can be created and tested quickly and easily.

C++ is typically used to take care of the business logic of the application. C++ classes can be created and used to perform calculations, handle data storage operations, and so on. The full capabilities of C++ can be used to supplement the UI-related features provided by QML.

By using QML for the UI and C++ for business logic, one aspect of an application can be changed without affecting another. For example, the appearance of a list of items can be changed without worrying about how the data for the list is stored or accessed. Or, a new sorting algorithm can be implemented in the application without affecting how the data is shown.

Controls and events are C++ objects that are exposed using QML. An application UI can be declared in QML and events can be processed using JavaScript in line with the QML. If an application has a computationally intensive process or a sophisticated user interaction scenario that cannot process in QML and JavaScript, C++ objects can be used instead.

The Cascades™ application framework includes a set of core UI components designed to have a consistent look and feel which are optimized for touchscreen interaction which can be used when developing an application. The core controls include:

Button—a clickable button that can contain text, an image, or both;
CheckBox—a check box that a user can check or clear;
ToggleButton—an option button with only two states: on or off;
Slider—a slider that lets a user select a value within a specified range of values;
Label—a non-interactive label with a single line of text;
TextField—a text box into which a user can type text;
ImageView—a visual control for displaying an image.

Custom UI controls can be created from any two or more core UI controls by combining and extending core UI controls. For example, in an address book application, a custom control component for a contact may include an ImageView control for the contact's picture and a Label control for the contact's name. When a contact is displayed in the application, an instance of the custom control component is displayed instead of creating each control separately.

The Cascades™ application framework can also be used to add functionality to UI controls to create animations, handle touch events, apply text styles, and more.

The Cascades™ application framework also provides an event system which takes advantage of a slots and signals framework in Qt for inter-object communication. Objects can communicate with each other by emitting a signal. One object that wants to receive a message from another object can create a slot for a particular signal. Unlike the callback technique for inter-object communication, slots and signals are type-safe and loosely coupled. An object that implements a slot must match the method signature for the signal that it can receive. This approach allows the compiler to type-check the subscription. Apart from the data type in the signature, a slot implementation does not need to know anything about the signal implementation. The slot does not even need to receive the same number of arguments that a signal emits. Similarly, signals can be sent to objects if the slots which the signals implement are known. The Cascades™ application framework discards signal arguments that are not implemented by the slot. Accordingly, events in the Cascades™ application framework are implemented as signals. When a user interacts with the UI of an application, the Cascades™ application framework emits a signal. The Cascades™ application framework delivers the signal to each slot that is connected to the signal.

The Cascades™ application framework also animates any change in certain types of properties of a UI control by default. Properties which can be animated include:
Position;
Size;
Scale;
Rotation; and
Opacity.

The UI of an application operates as a collection of containers with which a user can interact. For example, assume a user is allowed to inspect the contents of a container when it is tapped. The Cascades™ application framework monitors for a touch event in the screen area occupied by the container and, in response to detecting a touch event in the screen area occupied by the container, changes the x and y coordinates and the height and width of the container to enlarge the displayed size of the container. When the x and y coordinates of the container are changed, the Cascades™ application framework slides the container from its current position to the target position. A traditional UI framework may simply draw the container again in its new location, but the Cascades™ application framework animates the change in position automatically. Similarly, when the height and width of the container are changed, the container is enlarged from its current size to the target size.

The Cascades™ application framework also provides fine control over animation. Transitions between pages (screens) can be explicitly specified transitions using classes which include:
FadeTransition—an animation that controls the opacity of a VisualNode;

RotateTransition—an animation that rotates a VisualNode around its z-axis,

ScaleTransition—an animation that scales the size of a VisualNode;

TranslateTransition—an animation that controls the position of a VisualNode;

EasingCurve—an abstract class for easing curves that are used with animations;

SequentialAnimation—a group animation that plays its children animations sequentially;

ParallelAnimation—a group animation that plays its children animations in parallel; and GroupAnimation—abstract class containing properties exposed to group animations.

The Cascades™ application framework also provides a flexible layout system which adjusts the size and position of UI controls automatically. When additional controls are added to a container with a layout, the size and positioning parameters of the control can be configured to change relative to other controls in the layout. The Cascades™ application framework provides layouts which include:

StackLayout—arranges child controls vertically or horizontally relative to each other. This is the default layout for containers.

DockLayout—arranges child controls along the edge, or in the center, of the container specified by the child control.

AbsoluteLayout—requires that x and y coordinates of each control be specified. The origin of the coordinate system is the top-left corner of the control's parent container.

Figure 4:
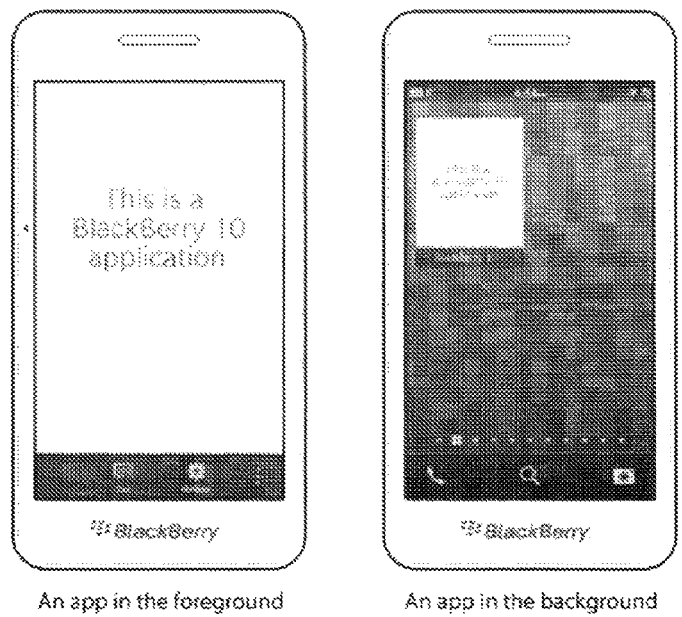
FIG. 4 illustrates an application running in the foreground and the same application running in the background.

Applications developed using the Cascades™ application framework have a similar lifecycle that includes three possible operational states: running in the foreground, running in the background and stopped. An application is running in the foreground if it is currently visible and is taking up the entire screen. An application is running in the background if it is visible and is running in a reduced size (e.g., as a thumbnail), such as when a user swipes up from the bottom of the screen to display a list of running applications. An application is also considered to be running in the background if it is not visible but has the appropriate permissions to run in the background. An application is stopped if it is not visible and does not have permission to run in the background. FIG. 4 illustrates an application running in the foreground and the same application running in the background.

The operational state of an application may vary depending on user input and other factors. While applications can allow a user to directly interact with the application while running, applications do not require user input while running. This type of application may monitor for a particular event to occur on the mobile device 130 and then respond by notifying the user at that time. This type of applications is suitable to run in the background until the application needs to alert the user that the event has occurred. By default, an application enters the stopped operational state when it is in the background and not visible. The application cannot perform any operations in this operational state. Processor time is not allocated to applications in this operational state, so this helps to minimize battery power consumption and maximize the performance of the mobile device 130. However, an application may be set to continue running while it is in the background and is not visible by setting the appropriate permission. The Application class includes several signals that are emitted when the operational state of the application changes.

Figure 5A:
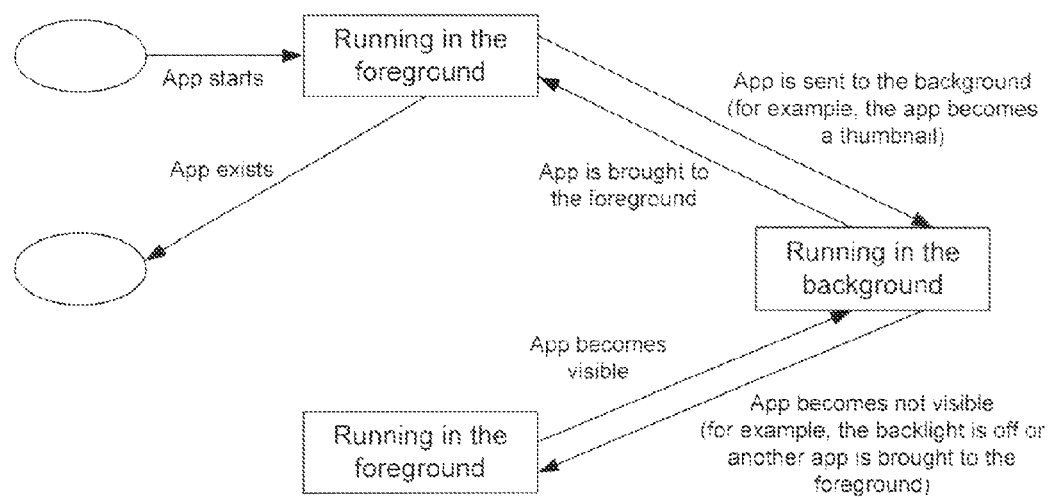
FIG. 5A illustrates changes in the operational state when an application does not have permission to run in the background and is not visible.

FIG. 5A illustrates an example of changes in the operational state of an application when an application does not have permission to run in the background and is not visible. The application lifecycle includes the stopped operational state. An application enters the stopped operational state, for example, when it is in the background and not visible—the application cannot perform any operations in this operational state.

Figure 5B:
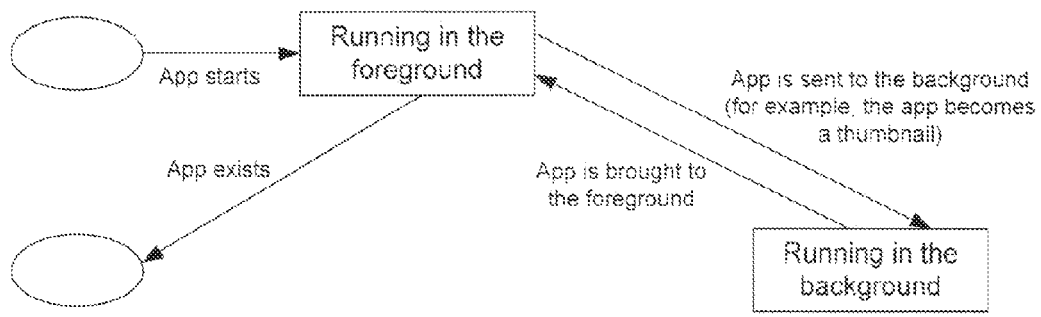
FIG. 5B illustrates changes in the operational state when an application has permission to run in the background and is not visible.

FIG. 5B illustrates an example of changes in the operational state of an application when an application has permission to run in the background and is not visible. The application lifecycle does not include the stopped operational state. The application continues to run when it is in the background and not visible, and the application can continue to perform operations and process events in this operational state.

QObject, the Qt Base Class

All objects in Cascades™ are derived from the QObject class. This class is the base class of all Qt objects and provides several important features. Most notably, QObject provides support for signals and slots, which is a mechanism that allows objects to communicate with each other. When something happens to an object in an application (for example, a user clicks a button), the object emits a signal. The application can respond to the emitted signal caused by the event by using a function called a slot.

This structure of a QObject subclass will now be briefly described by examining parts of a C++ header file to provide an understanding of the connection between QML elements (such as properties) and the C++ equivalents, which can be imported when custom control components are created used in conjunction with other QObject elements.

To illustrate some of the features and requirements of a QObject in Cascades™, consider the Button control. This control represents a clickable button that can be used in an application. The header file (button.h) for this control is located in the folder where the BlackBerry 10 Native SDK as installed, typically in the target\qnx6\usr\include\bb\cascades\controls subfolder.

Class Declaration class QT_CASCADES_EXPORT Button:public AbstractButton {

Figure 6:
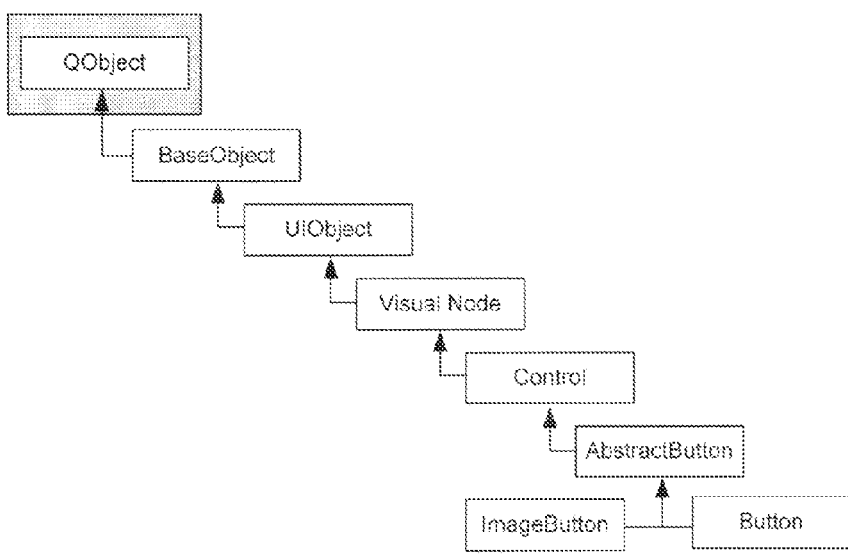
FIG. 6 is a block diagram illustrating the inheritance chain associated with the Button control for the purpose of illustration.

All Cascades™ controls inherit QObject, either directly or indirectly. FIG. 6 illustrates the inheritance chain associated with the Button control. The Button class inherits several intermediate classes, all of which eventually inherit QObject.

Q_OBJECT macro private: Q_OBJECT

To identify a class as a QObject, the Q_OBJECT macro needs to be used in the private: section of the class definition. This macro is processed by the Qt Meta Object Compiler and enables features such as properties, signals, and slots.

Property Declaration

Q_PROPERTY(QString text READ text WRITE setText RESET resetText NOTIFY textChanged FINAL)

A property is a single piece of information about an object, and is declared by using the Q_PROPERTY macro. This macro allows the property to be accessible in QML. Inside Q_PROPERTY, the name and type of the property can be specified. Keywords (such as READ and WRITE) can be used to specify the names of functions to manipulate the property value. Properties are declared in the private: section of the header file, along with the Q_OBJECT macro.

As shown above, the Button class includes the text property, which specifies the text to appear on the button. This property is a QString (the Qt representation of a text string) and has associated functions called text( ) setText( ) and resetText( ) to obtain, set, and reset the value of the property, respectively. These functions still need to be declared later; the Q_PROPERTY macro simply associates the functions with the property. A signal emitted when the value changes can be specified by using the NOTIFY keyword.

Function Declaration
public: Q_SLOT void setText(const QString & text);

Functions for QObject classes can be created like any other C++ classes. However, the Q_SLOT macro is used before the function declaration. This macro is another special element of Qt and indicates that this function is a slot. Slots can be connected to signals so that when a signal is emitted, the connected slot function is called automatically. As an alternative to the Q_SLOT macro, slot functions can be declared in a public slots: section in a header file. In the Cascades™ application framework, these approaches are equivalent.

Q_INVOKABLE is another useful macro which can be used in front of a function declaration (in the same place as Q_SLOT above) to indicate that a function can be called from QML. This approach can be useful for a complicated operation (for example, a custom transition for a UI control) implemented in C++. The UI-related portion (calling the function at the appropriate time) can be called in QML but the operation in C++ can be implemented any way.

Signal Declaration
Q_SIGNALS: void textChanged(QString text);

Q_SIGNALS: section can be used to declare signals that a QObject emits when certain events occur. A Button emits the textChanged( ) signal when its text changes, and this event can be handed within an application if needed. See signals may also be declared in a signals: section in a header file, which is equivalent in the Cascades™ application framework.

Object Ownership

Every QObject can be related to other objects in parent/child relationships. An object can have one parent, as well as zero or more children. A parent object is said to own its child objects. When an object is destroyed, its children are also destroyed, so it is important to keep in mind which objects are related to other objects within an application.

Scene Graphs

The Cascades™ application framework maintains the relationships between objects internally and automatically transfers ownership between objects when functions that change object ownership are called. To make it easier to visualize the parent/child relationships in an application, a structure called a scene graph is used. The scene graph illustrates nodes in an application, which are user interface control objects, and how the nodes are related to each other. The scene graph is a logical representation of user interface control objects which is typically not displayed to the designer. The scene graph makes it easier to visualize how the Cascades™ application framework internally keeps track of object relationships.

Figure 7:
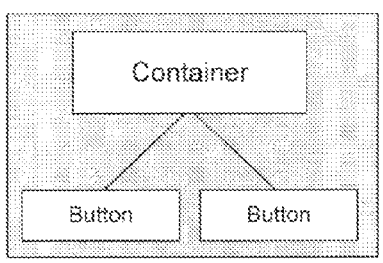
FIG. 7 is a block diagram illustrating a scene graph for the Button control for the purpose of illustration.

Scene graphs are common in many types of applications, such as complex UI applications and games and make it easier to manage complex arrangements of UI components. Using scene graphs can also increase the performance of applications. Finally, the hierarchical nature of scene graphs fits well with the parent/child relationship structure of Qt objects. For example, the code for a Container with two Button controls can be presented by the following and illustrated by the scene graph in FIG. 7.

```
Container {
    Button {
        text: "Button 1"
    }
    Button {
        text: "Button 2"
    }
}
```

Scene graphs can be useful to keep track of how object ownership might affect various aspects of an application. For example, a scene graph can be used to visualize how touch events are delivered to different controls on the screen.

Object Ownership in QML

In QML, ownership is established automatically according to the structure of the QML code of the application. For example, consider the above-noted code sample which creates two Button controls and adds the controls to a Container. The Container is the parent of the buttons and the buttons are children of the Container. When the container is destroyed, both buttons are destroyed as well.

Object Ownership in C++

In C++, object ownership is a somewhat more complicated. Initial object ownership can be established either when controls are created or when the controls are added to other controls. Both approaches result in the same parent/child relationships, so either approach can be used in an application.

After object ownership has been established, the parent of an object can be changed by simply by adding the object to a different parent. The object is removed from the first parent and added to the new parent and the new parent then owns the object. An object can also be removed from a container without specifying a new parent for the object. However, this can present issues because even though the object has been removed from the container, the container is still the parent of the object and still owns the object. If the container is deleted, the object will be deleted as well. This can lead to errors in an application may be difficult to recognize.

When an object is removed from its parent, or when an object is replaced by a new object (in the case of certain setter functions, such as Page:setContent( )), it is removed from the visual hierarchy (i.e., it is not displayed on the screen anymore). The object's parent still owns the object, though an object can be re-parented or deleted at this point. If the object is not re-parented, it is still deleted when the parent object is deleted. However, an object cannot be re-parented if it is still part of the visual hierarchy of its parent. The object needs to be removed before it can be re-parented.

All QObject instances include a function called setParent( ) and this function can be used to re-parent an object when allowed, as described above. Using setParent( ) to re-parent an object does not add that object to the parent's visual hierarchy—it still needs to be added explicitly, for example, by calling Container:add( )). To prevent an object from being deleted when its former parent is deleted, a call to setParent(0) can be added after an object is removed from its parent.

There is an exception to the rules of object ownership. The top-level scene in an application, which is the AbstractPane object that is set as the root node using Application:setScene( ), behaves differently than other scenes/panes. The application takes ownership of the AbstractPane only if the pane does not already have a parent. If the AbstractPane does not have a parent when setScene( ) is called, the application will own the pane and will delete it if a new scene is set. However, if the AbstractPane already has a parent the application will not take ownership of the pane when setScene( ) is called.

This behavior lets an application switch between different scenes but still ensures that for the most basic use case (an application with just a single scene) the old scene is deleted when appropriate. If the application is to switch between two scenes, the parents of the AbstractPane objects should be set explicitly using setParent( ) before setScene( ) is called.

Many other functions of the Cascades™ application framework classes change the ownership of objects. The API reference for the classes and functions in application should be checked to ensure that object ownership is not altered in unexpected in ways Thread Support Qt provides support for threaded applications with the QThread class. The ability to create new threads is often necessary if an application contains resource-intensive processes that would otherwise block the UI thread. A QThread represents a separate thread of control within the application; it can share data with all the other threads within the application, but executes independently in the same way that a standalone application does. In order to facilitate communication between threads, signals and slots are fully supported.

To use the QThread class, it is recommended to create a worker object derived from QObject and implement a slot on that worker to handle the task. The worker should also specify a signal that is emitted when the task is finished and an optional signal that is emitted when in case of an error. Once the worker class is created, QThread can be given ownership of the worker, the appropriate signals and slots can be connected, and the thread can be started.

Application Development Tool

Figure 8:
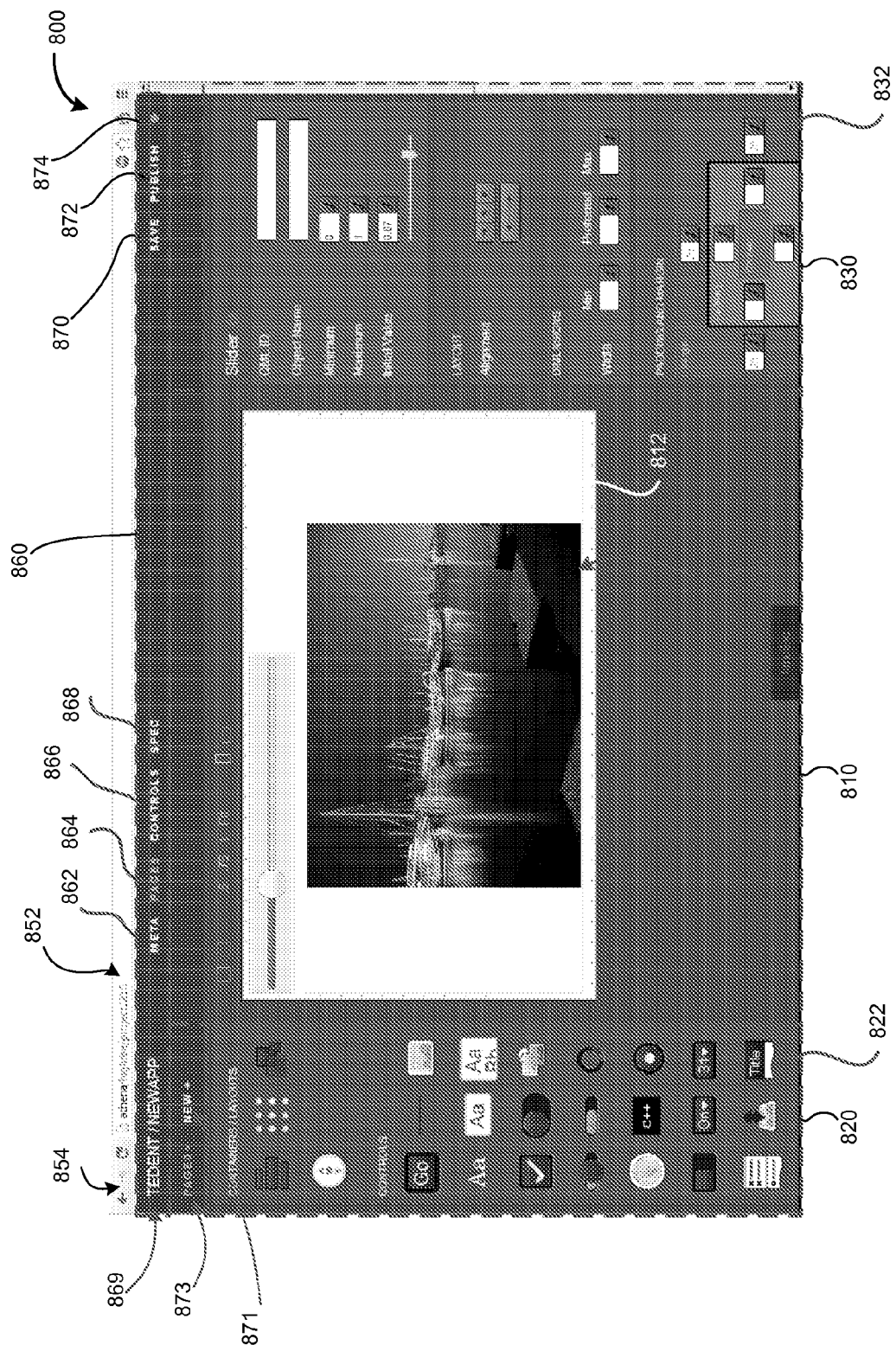
FIG. 8 is an example editor user interface screen of the application development tool for creating, editing and viewing an application page in accordance with an example embodiment of the present disclosure.
Figure 9A:
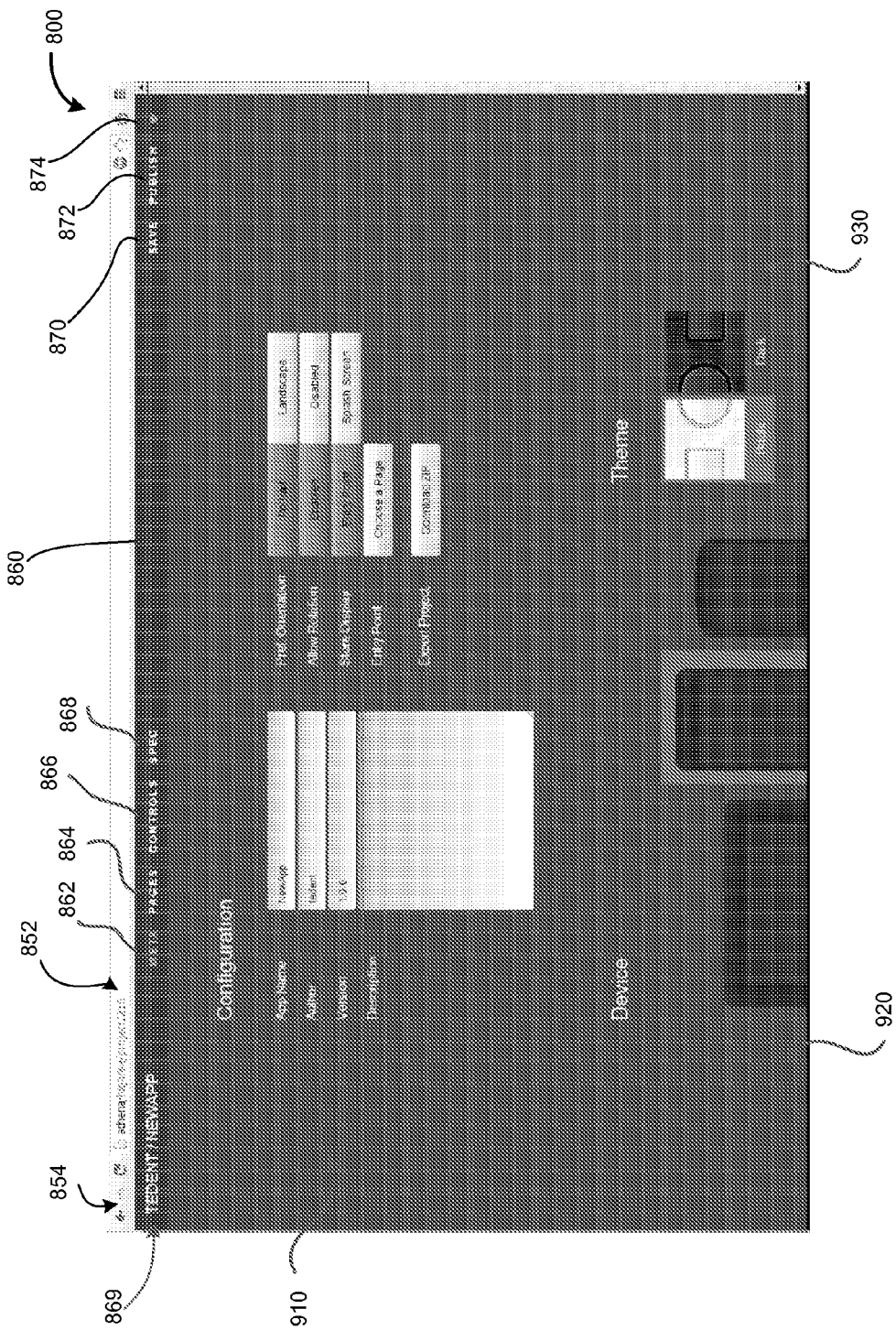
FIGS. 9A to 9D show a Metadata user interface screen of the application development tool for setting application properties in accordance with an example embodiment of the present disclosure.
Figure 9B:
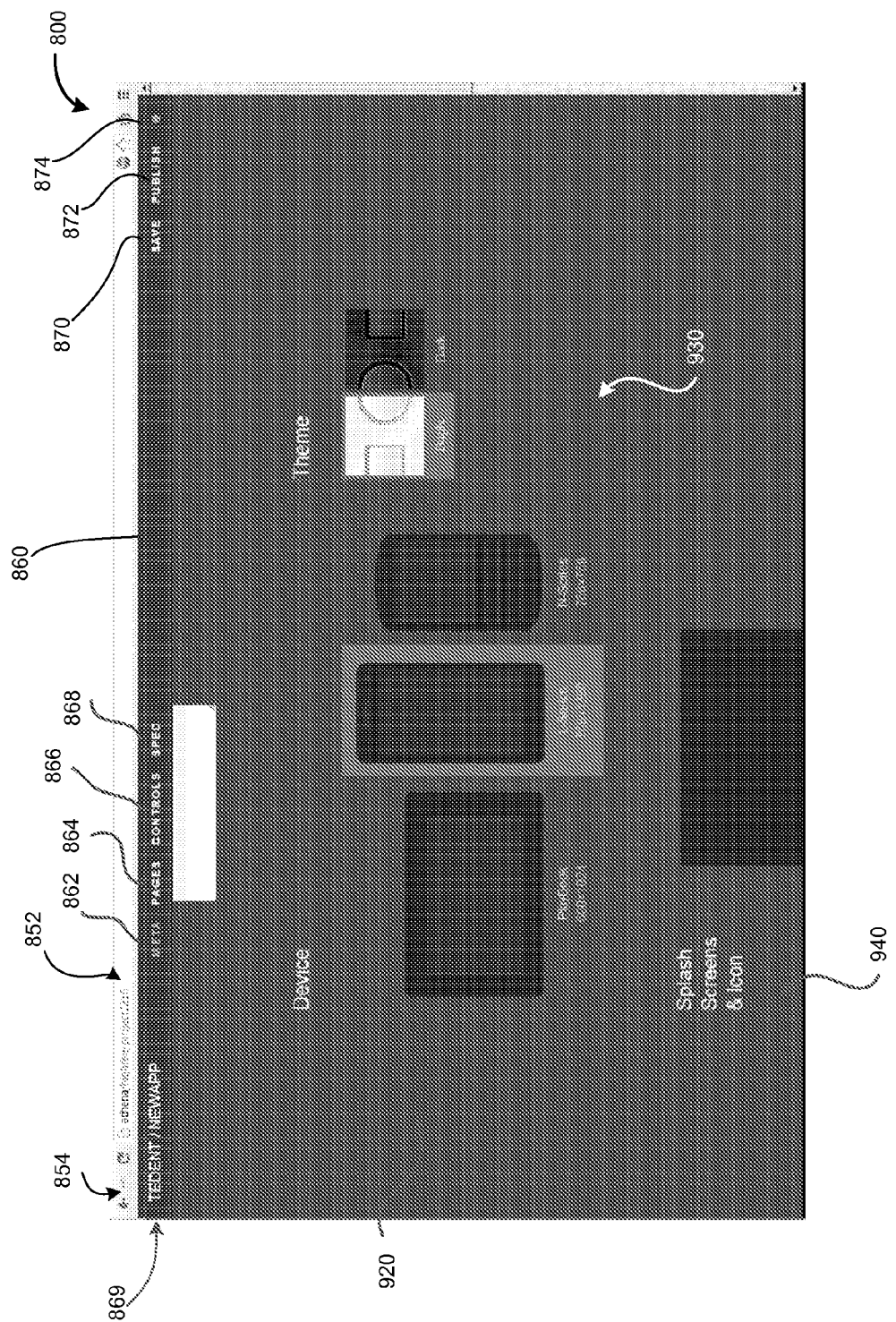
Figure 9C:
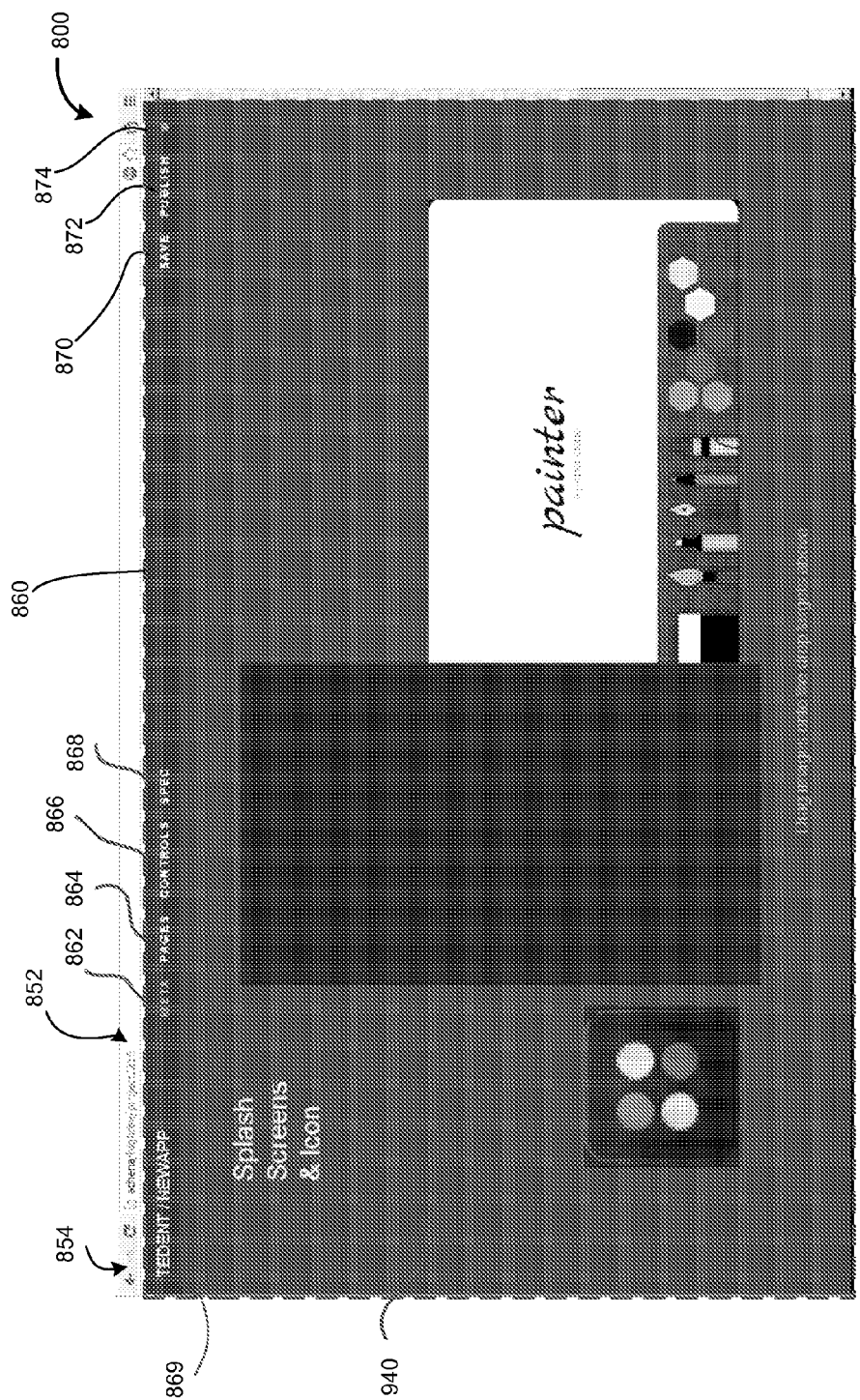
Figure 9D:
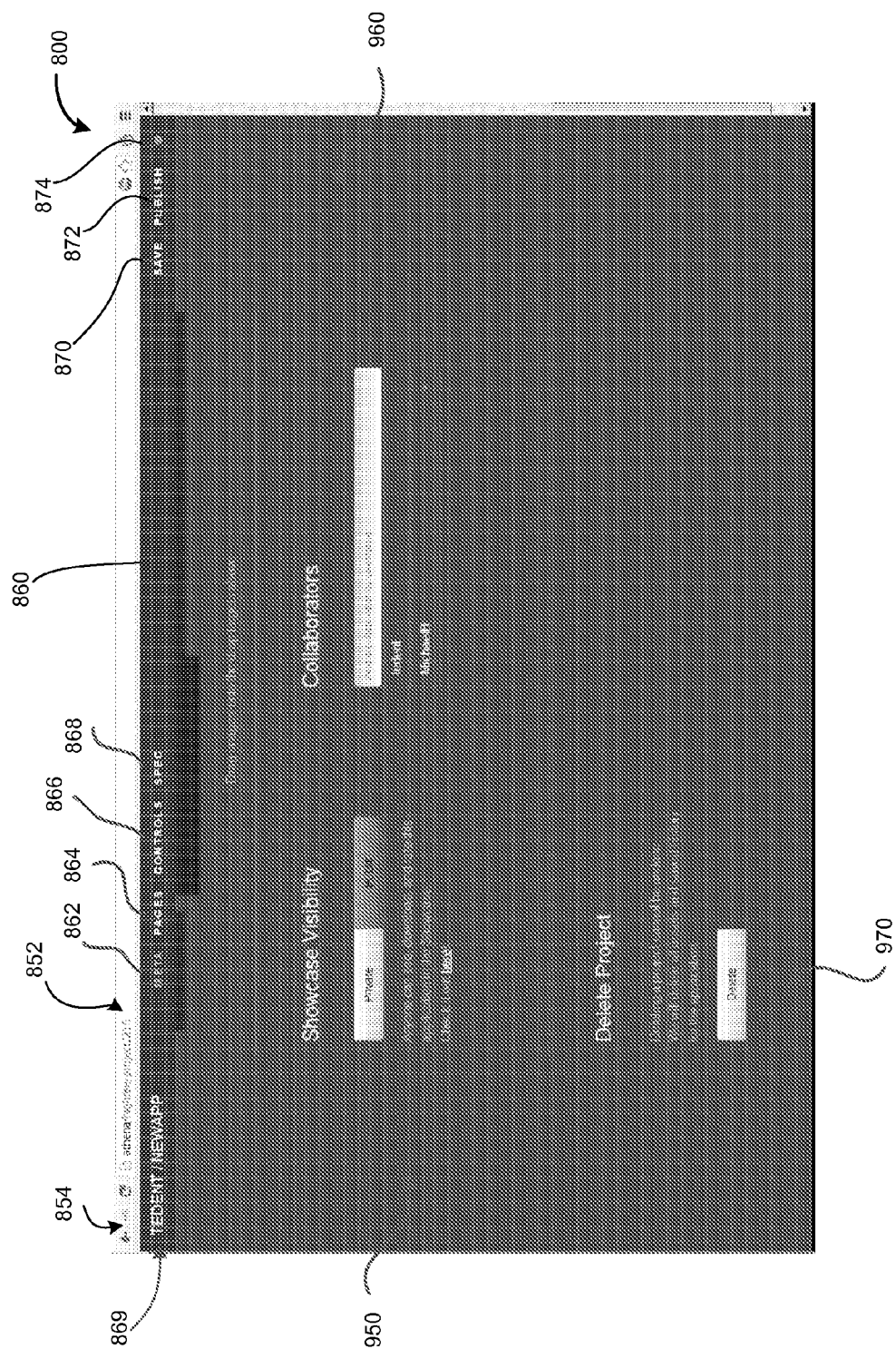

Referring now to FIGS. 8 to 12, a Web-based application development tool (tool) 800 in accordance with the present disclosure will be described. FIG. 8 shows an editor user interface screen of the tool 800 which acts as the editor user interface. The editor user interface screen allows individual application pages to be created and edited. Each application comprises a series of one or more pages which are displayed on the display 312 of a mobile device 130. Each application specifies the content and interaction between the pages. The tool 800 provides a visual user interface having a variety of tools for creating and editing applications for mobile devices 130 running a supported operating system 378. In the described embodiment, the tool 800 provides an interface for rendering and displaying applications for use the Cascades™ application framework for the BlackBerry™ 10 operating system, as well as creating and editing such applications. The tool 800 also causes application code in accordance with the Cascades™ application framework to be generated during saving, exporting or publishing of the application. The descriptive nature and properties of Qt and the Cascades™ application framework facilitates the use of a visual tool such as that provided by the present disclosure, which brings drag and drop functional to visual object creation, change and deletion in a manner which supports real-time collaboration development and "always-save" functionality. Nevertheless, it is contemplated that the tool 800 could be adapted to generate application code for use with a different application framework in other embodiments.

The tool 800 is a Web-based application which is accessed using the Web browser 282 on a computer 120. The Web browser 282 includes an address bar 452 which, when viewing or editing an application, indicates the address of the application hosted by the application development server 110, navigation buttons 854 and other controls. A user accesses the tool 800 by navigating to the application development server 110, for example at its Internet address, logging in to the application development server 110 using provided user credentials (user name and password), and requesting that a particular application under development which is hosted by the application is opened with the tool 800. Users can also register for a new account if they do not already have an account. These operations are implemented using communication protocols, such as HTTP/HTTPS communications, well known in the art.

As noted above, the tool 800 stores the application state in its own internal format on the client (e.g., computer 120). The tool 800 transcodes the QML document into JavaScript to create a hierarchy of JavaScript objects which correspond to the QML objects of the QML document using a JavaScript QML parser. The details of the transcoding need not be described for the understanding of the present disclosure. After transcoding, the computer 120 may discard the QML data. The current state of the application is maintained in memory by the computer 120 in JavaScript. In contrast, when the application is published to a mobile device 130, QML documents are processed natively with the provided QML parser.

The UI rendering engine on the computer 120 transcodes the JavaScript objects into HTML (HyperText Markup Language) objects styled using CSS (Cascading Style Sheets) so as to resemble Cascades™ UI controls written in QML. The JavaScript engine then inserts these stylized HTML objects into the active HTML page (document) and positions the UI controls with the HTML page using CSS in a manner similar to how the Cascades™ UI rendering engine would position the UI elements on a deployed mobile device 130. The transcoding operations allow the processing of a Cascades™ application in QML to be emulated within the Web browser 282 on a computer 120 which is not capable of natively processing the QML documents of the application and/or which does not support the Cascades™ application framework. It is contemplated that in other embodiments, QML documents could be processed using a combination of languages or technologies other than JavaScript, HTML, and CSS. The computer 120 causes QML application code in accordance with the Cascades™ application framework to be generated from the internal format (e.g., JavaScript) stored on the computer 120 when saving the application, exporting the application or publishing of the application to a mobile device 130. The computer 120 generates the full application code in its current state (if not already in memory), transcodes it from JavaScript to QML, and sends the QML to the ADS 110 when the application needs to be saved, exported or published to a mobile device 130. At least some of the metadata, such as the version number, associated with the application is typically exported with the application and included with the application when published to a mobile device 130. Once the application is published to a mobile device 130, the application communicates with the ADS 110 in the same or similar manner as the tool 800 with a Web browser 282 on a computer 120.

The tool 800 includes a canvas 810 in which a real-time rendering of an application under development is provided. The canvas, in the described embodiment, displays a rendered page 812 of the application. Different pages of the application can be rendered and displayed as the user navigates through the application pages activating the appropriate option in a control panel 860. Creating a new page displays a blank page and selecting an existing page causes the selected page to be rendered and displayed in the canvas 810. The canvas 810 may display gridlines or rulers other reference markings depending on the setting and may highlight a currently selected object.

The tool 800 includes a drag-and-drop object palette 820 which includes a number of objects including control UIs. The objects include core control UIS 822 which are defined by the Cascades™ application framework and Qt, such as a Button, CheckBox, ToggleButton, Slider, Label, TextField and ImageView, and optionally one or more custom control UIs. Objects from the object palette 820 can be added to the active (current) page of the application which is rendered and displayed in the canvas 810 by dragging and dropping the desired object from the object palette 820 to a desired location on the canvas 810.

When an object in the canvas 810 is selected, the tool 800 provides an attributes panel 830 which includes a number of attributes 832 for a selected object. The particular attributes 832 are context sensitive and depend on the type of the object which is selected. Similarly, the value of the various attributes 832 depend on the particular object which is selected. In the illustrated example of FIG. 8, a slider is selected so the attributes panel 830 displays attributes associated with slider. The attributes 832 for the slider include the object type, the object name, minimum, maximum and initial values for the slider, alignment properties, dimensions, padding and margins, among other properties. Similarly, the value of the various attributes 832 correspond to the selected instance of the slider. It will be appreciated that any of the panes in the tool 800, such as canvas 810, object palette 820 and attributes panel 830, may be scrollable to reveal additional content which does not fit within the pane due to the resolution of the computer 120 and the amount of content with the respective pane.

As noted above, the particular attributes 832 are context sensitive and depend on the type of the object which is selected. A TextField, for example, may include attributes 832 for font, font size, italicization, bolding, and other visual highlighting.

Other possible attributes 832, such as visual attributes, may include whether the object is visible, opacity, scale, rotation from a default position, and the like. Other possible include attributes 832 may include audio properties. Some objects can have animation properties which, for example, can define transitions which can describe when and how an object moves, appears and disappears, rotates, or changes in size.

Some attributes 832 of an object not be locked and unavailable for modification by the user. The locked attributes have the associated values "greyed out" or otherwise displayed in a manner to indicate that the attributes are currently locked and cannot be changed.

It will be appreciated that the drag-and-drop object palette 820 and attributes panel 830 may include too many elements to display on the screen at the same time. In such instances, a scrollable panel or page is provided by the Web browser 282.

The tool 800 also includes a control panel 860 which includes control tabs for navigating between different pages of the tool 800. The control tabs include Meta tab 862 for displaying a Metadata user interface screen for setting and editing application information, device, orientation, splash screens, etc., a Pages tab 864 for displaying and editing application screens/pages, a Controls tab 866 for displaying, creating and editing custom UI controls which can be reused, and a Spec tab 868 for displaying a Specification user interface screen to review and document each of the Pages and Controls in the application.

While not typically part of the control panel 860, the editor user interface screen also includes a tab 871 for creating a new page and one or more tabs 873 (only one of which is shown in FIG. 8) for selecting a different existing page. While not shown in the described embodiment, the control panel 860 could also include navigation buttons for navigating between pages of the application. The control panel 860 also includes a Save button 870, a Publish button 872 for publishing an application to a test device (e.g., to evaluate the software behaviour), a Connection Indicator 874 which indicates whether there is an active connection to a test device to which the application has been published. The Connection Indicator 874 is green when active connection exists and is red when active connection does not exist. The control panel 860 may also include a Save Indicator (not shown) which indicates whether all current changes in the current session have been saved. The Save Indicator is displayed has a first appearance when the current state of the application has been saved and is displayed in a second appearance different from the first appearance when current state of the application has not been saved.

Incremental changes made by each user having authorization to edit the application between saves are automatically stored even if the current state of the application has not been explicitly saved. The incremental changes are stored in the form of the change information associated with these changes. The change information for each incremental change, described more fully bellow, includes the type of change, the changed node (i.e., the changed user interface object or control), a timestamp which specifies the date and time of the change, the user who made the change, and information or instructions to apply and reverse the change. Saving the application, for example using the Save button 870, saves the application state at a specific state of development. Applying the incremental changes since a previous save point, if any, results in the current state of the application. The tool 800 can at any time, in response to instructions of a user, apply the instructions for reversing a change or a series of changes to restore the application state from the current state to a previous state, which may be an explicit save point or an intermediate point which represents one or more incremental changes from an explicit save point.

The tool 800 may automatically save the status of the application in response to designated types of changes. The designated types of changes for automatically saving the application may include one or more of publishing the application to a mobile device 130 (e.g., for testing) connected to a client device or the ADS 110, exporting the application in QML for input on another client device, or occurrence of a particular type of change (such as creating a new page or custom control, etc.). The designated types of changes may also include a change in the metadata of the application (such as the version number), start/stop of a user collaborating on an application and/or possibly others.

The application code representing the state of the application at explicit save points and incremental changes between save points are stored separately by the tool 800, for example, in separate database tables in memory (electronic storage) managed by the ADS 110. The database tables may be in common memory managed by the ADS 110. The memory is also used to store media assets, such as digital still images and possibly digital video used by the applications and information about the applications developed using the tool 800. The memory may be distributed among two or more physical storage devices, which may or may not be geographically distributed, depending on the embodiment. The memory could be located, for example, in internal memory 114 of the ADS 110.

The information about the applications which is stored includes save information about the various save points, such as a timestamp which specifies a date and time of the save, and the user who made the save. As noted above, the change information includes the type of change, the changed node (i.e., the changed user interface object or control), the timestamp, the user who made the change, and information or instructions to apply and reverse the change. The information required to reverse the change depends upon the type of change, examples of which are described more fully below. The change information may include some or all of the application code associated with the change, depending on the type of change and/or the specific data which is being changed.

The incremental changes which are stored also include changes to the metadata describing the application which is displayed in the Metadata user interface screen. The changes to the metadata which are stored may include, for example, version changes, author changes, dates and times at which users start or stop collaborating on the application, changes to application properties, changes to device properties, etc.

Examples of the types of changes which can be made include, but are not limited to, object creation, object deletion, object modification, page creation, page deletion, page modification, and application modification. The change information associated with various types of changes in accordance with one embodiment of the present disclosure is provided below:

(1) Node Added: the change information includes the name of the QML document that the node was added to, the unique identifier of the new node (unique within the QML document), the type of the new node (e.g. Button, Label, TextArea, etc.), the unique identifier of the new node's parent (i.e., the node that the new node was added to), and the index of the new node within the parent's list of child nodes;

(2) Node Deleted: the change information includes the name of the QML document that the node was deleted from, the unique identifier of the deleted node, the unique identifier of the deleted node's parent (before it was deleted—so it can be reinserted by a rewind/undo operation), the index of the deleted node within the parent's list of child nodes (before it was deleted—so it can be reinserted by a rewind/undo operation), and the QML code for the deleted node (in its state immediately before deletion—so it can be reconstructed by a rewind/undo operation);

(3) Node Moved: the change information includes the name of the QML document that contains the node, the unique identifier of the moved node, the unique identifier of the new parent of the node, the index of the node within the new parent, the unique identifier of the old parent of the node (so it can be moved back by a rewind/undo operation), and the index of the node within the old parent's list of children (before it was moved—so it can be moved back by a rewind/undo operation);

(4) Node Changed: the change information includes the name of the QML document that contains the node, the unique identifier of the node, the name of the QML attribute that was changed (e.g. text, opacity, etc.), the new value of the QML attribute (which could be a string, a number, a function definition, etc.), and the old value of the QML attribute (so it can be changed back by a rewind/undo the operation);

(5) QML Document Created: the change information includes the name for the QML document (unique within the application) and the type of the new document (e.g. Page, Container (for custom controls), etc.);

(6) QML Document Deleted: the change information includes the name of the QML document and the QML code for the deleted document (in its state immediately before deletion—so it can be reconstructed by a rewind/undo operation);

(7) Active QML Document Switched: the change information includes the name of the QML document that is now in the foreground within the tool 800, the name of the QML document that was previously in the foreground within the tool 800 and the unique identifier of the user who changed documents (so that a connected mobile device can change the foreground document but other users working on the application can ignore this change);

(8) QML Documents Refreshed: the change information includes a list of QML documents (used when a custom control is modified and then the tool has to notify the other clients to update any pages that contain an instance of the custom control);

(9) File Uploaded: the change information includes the name of the file, the directory of the file (possibly determined based on the file type), and the type of the file (e.g. image, XML document, etc.);

(10) File Replaced: the change information includes the name of the file, the directory of the file (possibly determined based on the file type), and the type of the file (e.g. image, XML document, etc.), and information about the old file such as a copy of the old file (in its state immediately before being replaced—so it can be replaced by a rewind/undo operation); and

(11) File Deleted: the change information includes the name of the file, the directory of the file and information about the deleted file such as a copy of the old file (in its state immediately before being replaced—so it can be reconstructed by a rewind/undo operation).

The storage of save points and incremental changes along with the change information allows a fine grained rewind/undo capability in which each change to the application can be reversed or undone. Any previous application state can be rebuilt from a previous save point and applying all of the subsequent incremental changes. Furthermore, the sending of incremental changes rather than the full application code provides a lightweight "always-save" functionality similar to "autosave" in which the ADS 110 saves all of the incremental changes made to the application.

When an object is added to the canvas 810 from the object palette 820, e.g. using a conventional drag-and-drop operation, the application state is automatically updated to add the object at the current page of the application and at the onscreen location. As noted above, in the described embodiment, when operated on a computer 120 the tool 800 stores the application state in its own internal format, such as JavaScript, the details of which need not be described for the understanding of the present disclosure. The application code for execution on a target device in QML, or possibly C++ or a combination of QML and C++, is generated and output when required, such as when the application is published, exported or saved. However, in other embodiments, the tool 800 could generate and output application code in any suitable programming language or format, such as Java™, JavaScript, HTML, XML (Extensible Markup Language), CSS, Flash or a suitable combination thereof.

The attributes of a new object may be undefined or set to a default value, depending on the type of object and the attributes 832. The attributes of the selected (e.g., active) object can be edited by changing or manipulating a corresponding field in the attributes panel 830. When the value of an attribute of an object in the page is changed (e.g., size, position, etc.), the change is immediately reflected in any affected object in the canvas 810 as appropriate and the application state is automatically updated to reflect the changed attributes. For example, if the font of a TextField is increased by changing the font size property value in the attributes panel 830, the text in the text box appearing in the canvas 810 is displayed in a larger font size as soon as the value is changed in the panel 830. The changes are typically stored in association with name or other unique identifier (ID) of the user which made the change (user name or ID), and the timestamp of the change. Conversely, if an object is manipulated in the canvas 810 (e.g., resizing or repositioning of the object within the page), any affected attributes (e.g., size, position, etc.) are automatically updated in the attributes panel 830 and the application state is automatically updated to reflect the changed attributes.

The state of the application is updated on client devices in real-time or near real-time. To obtain a real-time or near real-time changes in the state of application, the client requests the current state of the application from the ADS 110. The client receives the application code in accordance with a previous save point from the ADS 110 along with any incremental changes, renders the user interface in accordance with the received application code, and applies any incremental changes that occurred since the previous save point in the order in which the changes occurred to construct the current state of the application. The client then requests further incremental changes to the application and applies further incremental changes when received from the ADS 110. The client and server interact in the same way to provide a real-time or near real-time copy of the application regardless of whether the client is viewing a single application (e.g., in the editor user interface) or a number of applications (e.g. showcase user interface).

An example implementation of a method for detecting and reporting changes to applications which a user has access to using the tool 800 will now be described. Each application which a user has access to is identified using, for example, an application identifier (ID). Comet may be used when the persistent connection between the clients and ADS 110 is a HTTP or HTTPS connection so that the ADS 110 can "push" data to a Web browser of a computer 120 or (Web) application on a mobile device 130 without an explicitly request for the data. Comet, also known as two-way-web, HTTP Streaming and HTTP server push among other names, may use one of multiple techniques which rely on features included by default in most Web browsers such as JavaScript and which is a common or easily incorporated feature of an application on a mobile device 130.

Specific methods of implementing Comet fall into two major categories: streaming and long polling. Each client may have an open GET request which requests recent changes from the ADS 110. Using an open GET request each client connected to the ADS 110 sends a GET request to the ADS 110 and expects it to remain open until there is a change to the application. When a change in the application is detected by the ADS 110, the ADS 110 responds to the GET request with the details of the change, the client applies the change to rendered user interface, and then the client sends a new GET request to the ADS 110. This process is repeated by each client while connected to the ADS 110. The use of an open GET request or other Comet technique provides a lightweight and straightforward implementation for detecting changes to the application state stored by the ADS 110 and reporting the changes to clients. Alternatively, a web socket or other similar technology could be used or the client could poll the ADS 110 for recent changes periodically. Alternatively, a POST request with no message body data or possibly other HTTP request could be used to obtain the same result as a GET request provided the ADS 110 is configured to interpret the POST request or other HTTP request in that manner.

Referring now to FIGS. 9A to 9D, a Metadata user interface screen of the tool 800 in accordance with example embodiment of the present disclosure will now be described. The Metadata user interface screen provides a visual user interface for setting application properties and is displayed in response to selecting the Meta tab 862 described above. The Metadata user interface screen, based on the content and display configuration in the illustrated embodiment, is too large to be displayed within one screen of the Web browser 282 so a scrollable page is provided by the Web browser 282. In particular, three screens are required to display all of the Metadata user interface screen, although in other embodiments more or less screens may be required or the entire Metadata user interface screen could be displayed in a single screen.

The Metadata user interface screen displays information, settings and other properties relating to the application, many if not all of which can be set or changed by a user. The Metadata user interface screen includes a configuration section 910 in which application information such as the application name, author, version number and description can be set. The configuration section 910 also includes settings for preferred orientation, rotation options specifying whether the screen is permitted to rotate in accordance with device orientation, an entry point in the form of a page of the application at which the application is launched, a store display option for setting one or more images to be displayed in an application store (either the entry point or a one or more splash screens in the shown embodiment), as well as an export option for exporting the application code.

The Metadata user interface screen includes a device section 920 (FIG. 9B) which allows a device configuration to be selected from one or more supported mobile devices 130. The device section 920 which can include device names, device information and/or graphical representations of the mobile devices 130. In the illustrated embodiment, the following device configurations are possible: a tablet having a touchscreen, a smartphone having a touchscreen, and smartphone having a touchscreen and a keyboard, each having different screen sizes/shapes (e.g., aspect ratio) and possibly display resolutions.

When a device configuration is selected from the device section 920, device information regarding the selected device is propagated throughout the application. The page and its controls are re-rendered at a new screen orientation (canvas size) which corresponds to the newly selected device configuration. In the described embodiment, the generated application code does not contain any information about the target device although this may differ between embodiments. If the application code did contain information about the target device, the application code could be automatically updated to reflect the device configuration as required. Propagated device information may include, for example, display size, pixel density, display resolution, preferred orientation and the rotate option.

When a new application is created, the default page size (aspect ratio) and orientation will correspond to the screen size, screen resolution, and preferred orientation of the selected device configuration. If the device configuration is changed, the screen size, the default page size and preferred orientation of the new device configuration is propagated to all the pages of the application. The attributes of existing objects affected by these device properties in the application code are automatically updated, for example, by changing size, layout and rotation values, such that the object is properly sized, positioned and oriented for the new device configuration.

Other device configuration information which may be selectable in the device section 920 and which may be propagated through the application includes also information regarding other input or output devices, such as if the device has a physical keyboard, an orientation sensor, a proximity sensor, a motion sensor, a camera, a GPS, audio devices, lights, buzzers, wired or wireless communication capabilities and the like. Device information can also include processor type, memory size, operating system information, vendor, compatible programming language, available software modules and the like. It will be appreciated that the supported mobile devices 130 may vary based on the application framework implemented by the tool 800.

It is contemplated that some object attributes may be device specific and may not change when the device configuration changes. This may allow nuances of a particular device to be maintained even when developing an application for use on different mobile device configurations. It is also contemplated that some object attributes may be locked for an application so as to be common across all device configurations.

The Metadata user interface screen includes a theme section 930 (FIG. 9B) for selecting a theme. By selecting a theme, attributes associated with that theme such as color schemes, fonts, layouts, and the like, can be propagated to appropriate object attributes throughout the application. In the shown example, a light theme and a dark theme are shown. However, other themes may be shown in other embodiments.

The Metadata user interface screen includes a splash screens and icon section 940 (FIG. 9C) for setting one or more splash screens to be displayed during the boot-up or launch of the application and an application icon to be displayed in an icon menu of home screen or other screen of a device upon which the application is installed. The splash screens and application icon are represented by dark grey boxes. "Hint" text explaining the respective function of the boxes may display in response a hover on an onscreen position indicator (e.g., pointer). The hints may be displayed towards the vertical middle of the screen. A developer or designer can drag and drop images onto the disabled boxes, or otherwise select images to set the application icon, horizontal splash screen for a horizontal screen orientation, and vertical splash screen for a vertical screen orientation. The source images may be stored locally, for example on a local hard disc drive, or remotely.

The application icon box expects a square image (and has a square drop target). The application icon is typically displayed on the home screen application icon menu as well as an application storefront (which is outside the scope of the present disclosure). The icon source image is PNG and the Splash Screens are PNG or JPG/JPEG in the described embodiment, but could vary in a different embodiment.

The Metadata user interface screen includes a visibility section 950 (FIG. 9D) for viewing and setting whether the application is private or public. Private applications are only accessible by authorized users (i.e., collaborators described below), whereas public applications are accessible to all users of the application development server 110. This allows, for example, applications under development to be viewed by all users of a particular enterprise.

The Metadata user interface screen includes a collaborator section 960 (FIG. 9D) for viewing and setting users who have authorization to view and edit the application, known as a collaborators. The Metadata user interface screen includes a delete section 970 (FIG. 9D) for deleting an application from the application development server 110.

Figure 10:
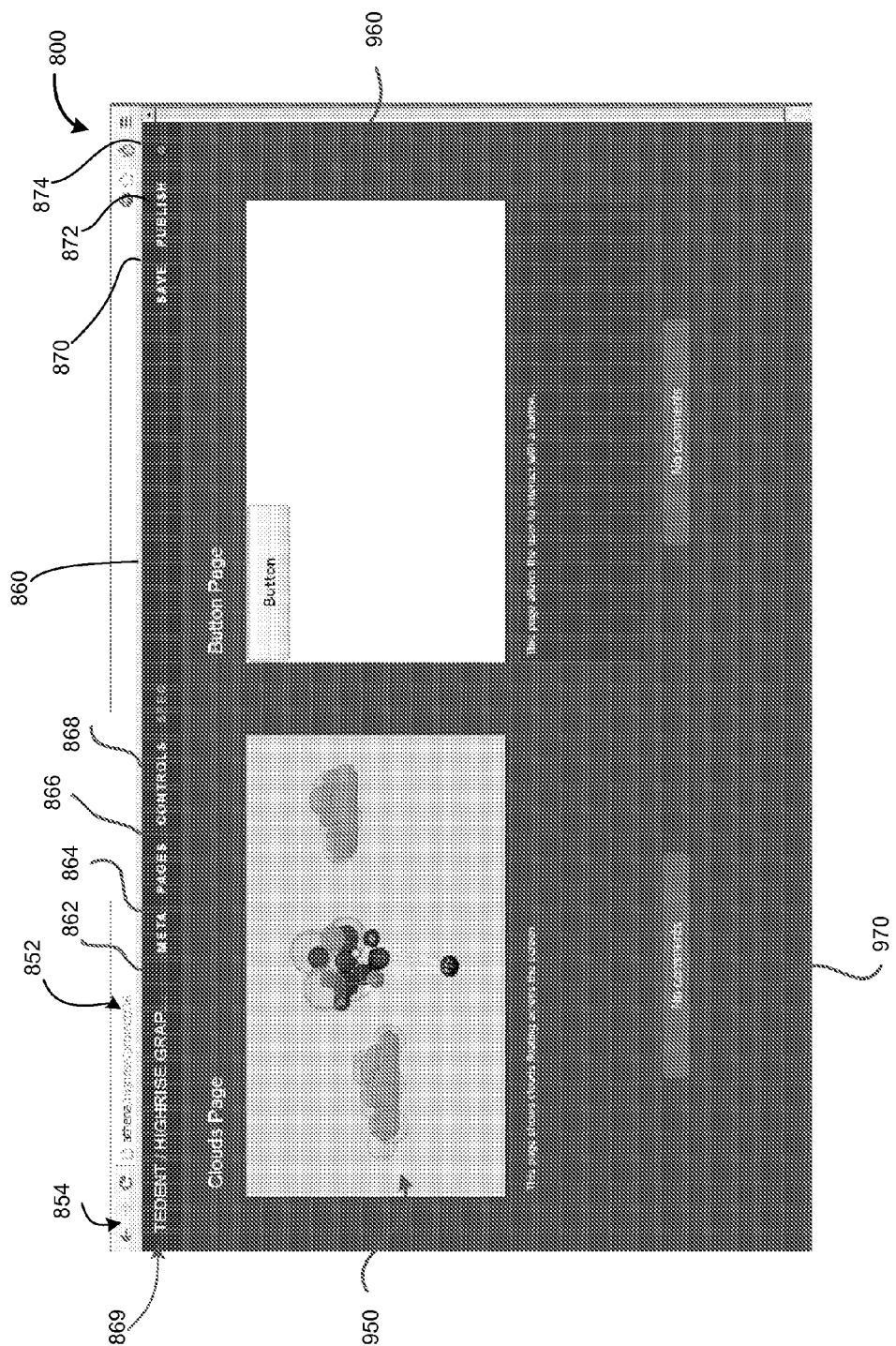
FIG. 10 is a Specification user interface screen of the application development tool in accordance with an example embodiment of the present disclosure.

Referring now to FIG. 10, a Specification user interface screen of the tool 800 in accordance with an example embodiment of the present disclosure will now be described. The Specification interface screen is displayed in response to selecting the Spec tab 868 described above. The Specification user interface screen shows a grid of all the pages (screens), panes, and controls in the application. Pages, panes and controls are all the individual document files which become QML files when exported. The Specification user interface screen renders each of the documents in a single page along with a few editable fields which a developer or designer can use to document the files. This gives developers and designers a way to provide some metadata about each file, such as its purpose. For example, "Title: Application Login Page. Description: This page is shown when the application is launched and the user has not previously logged in." The Specification user interface screen is meant to be a digital form of a "Specification document" that would typically be created in a non-development environment which can be printed and shared or discussed. In a different embodiment, the Specification interface may also include a user interface area for comments or discussion around the application, and/or user interface areas for comments or discussion around each of the application pages.

Figure 11A:
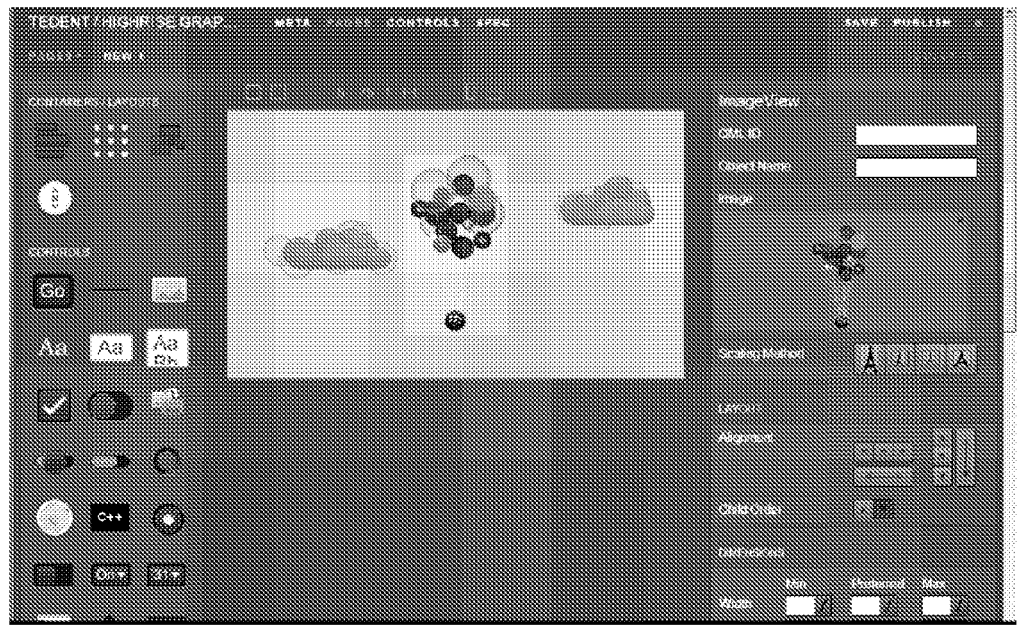
FIGS. 11A and 11B show an Image user interface screen of the application development tool in accordance with an example embodiment of the present disclosure.
Figure 11B:
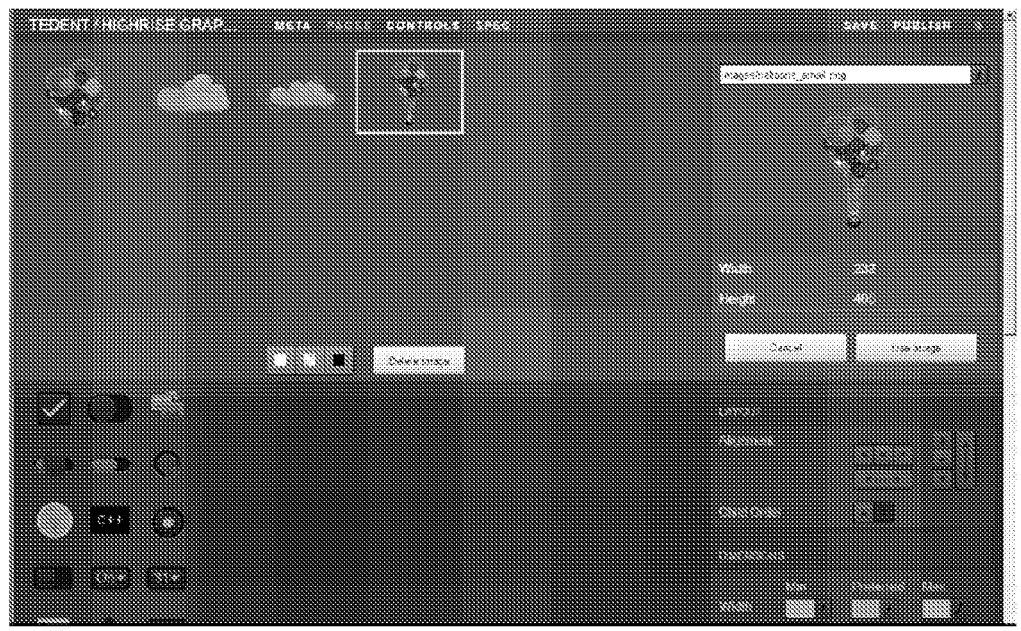

Referring now to FIGS. 11A and 11B, an Image user interface screen of the tool 800 in accordance with example embodiment of the present disclosure will now be described. The Image user interface screen provides a list of all the image assets that have been imported into the application. When an image control in an application displayed in the editor user interface screen is selected (see FIG. 11A), such as an Image View, an option to invoke the Image user interface screen, sometimes referred as the Image Picker, is provided. The option may be provided, for example, by clicking on an area in the attributes panel 830, or in a context-sensitive menu which itself may be invoked by a right-click of a mouse or other pointing device on the computer 120 or other input. Alternatively, the Image user interface screen may be displayed in response to selecting an Image tab (not shown) in the control panel 860 which is available when images are included in the application. As shown in FIG. 11B, the Image user interface screen provides a visual interface to select, delete, review and change the properties (e.g., background color) of image assets in the application.

Figure 12A:
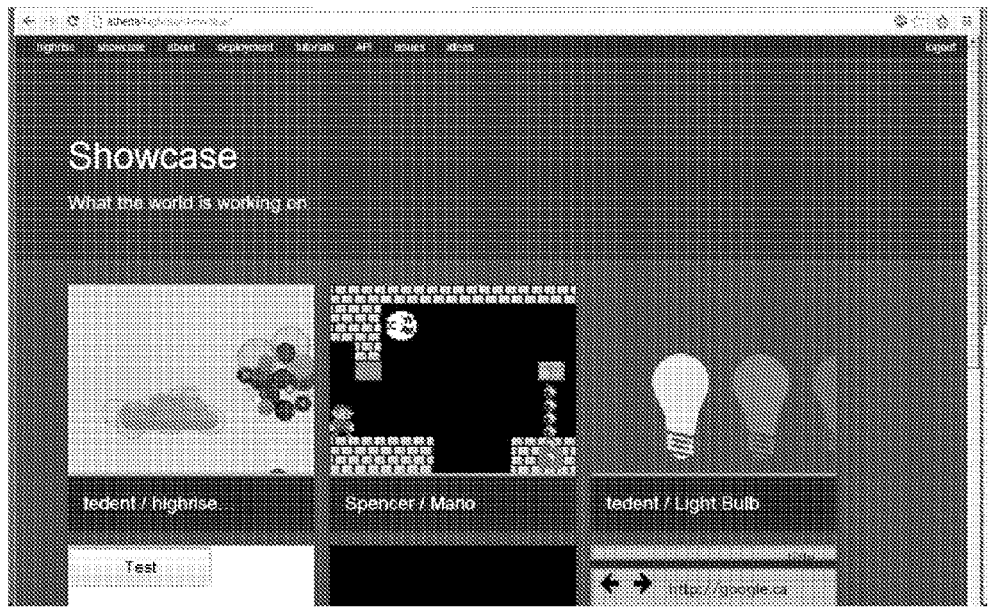
FIGS. 12A and 12B show a Showcase user interface screen of the application development tool in accordance with an example embodiment of the present disclosure.
Figure 12B:

Referring now to FIGS. 12A and 12B, a Showcase user interface screen for viewing community applications in accordance with example embodiment of the present disclosure will now be described. All applications managed by the tool 800 are developed and stored on the application development server 110; however, not all applications are publicly visible. A developer or designer must choose to share their application with the community in order for other users to view the application in a community "Showcase" user interface screen, an example of which is shown in FIG. 12A. The community Showcase user interface screen displays application information for one or more applications to which a user has access. An application name and one or more pages from one or more shared applications is rendered and shown in the community Showcase user interface screen. A user has access to applications created by the user, applications explicitly shared with the user, and public applications that all users can access. If an application is marked "public" in the visibility section 950 (FIG. 9D) of the Metadata user interface screen, the application is available in the Showcase user interface screen. The Showcase user interface screen can be used to display a number of applications at one time, display the changes being made to the applications as the changes happen in the same fashion as changes to a particular application the user is working on is shown, and can be used to display who is working on which applications in real-time or near real-time. This allows collaborators to preview some of the most recent changes to applications to which a user has access.

In the shown embodiment, a single page and the application name for each accessible application is displayed in a grid or array. The page displayed may be a last edited page or a designated page in the application, among other possibilities. In other embodiments, the application information can be displayed other formats including but not limited to a list format or a slide reel format. The application information displayed in the Showcase user interface screen may also include, for example, an application version number, description, author, edit dates/times, or any other application related information.

One, some or all of the pages of the application can be rendered in the Showcase user interface depending on the application (e.g., parameters in association with the tool, number of pages, etc.) or the tool 800 (e.g., settings). The rendered applications in the Showcase user interface screen can be sorted according to most recently created, or most recently edited or other criteria. The ADS 110 detects changes made to all of the applications which a user has access to. In the described example, changes are associated with a particular application using the application ID. When a change is made to one of the applications which a user has access to, the ADS 110 reports the change information in the client so that it can be applied to the corresponding page of the corresponding application shown in the Showcase user interface screen.

In the described embodiment, each client sends an open GET request to the ADS 110 for each application which the corresponding user has access to. As noted above, the application ID is used to identify the respective applications. When the ADS 110 detects a change to an application for which there is an open GET request, the ADS 110 responds to the GET request by sending to the client the change information corresponding to the change. The client then applies the change to rendered user interface. When the client is a computer, the change information may be transcoded from QML as described above if the received change information included QML code. Finally, the client sends a new GET request to the ADS 110 in respect of the changed application so that it receives further changes to the application. This process is repeated by each client while connected to the ADS 110.

The Showcase user interface screen may identify recently modified applications, such as the most recently modified application. For example, the application which has been most recently updated may be displayed at the top of the Showcase user interface screen. The page of the application may move or "bubble" of the top of the displayed pages of the applications in the Showcase user interface screen to bring the application in view, for example, if it was below the current page scroll. Alternatively, rather than changing the position of the application, the application may be bolded, flash, displayed in a different color, or otherwise displayed in a manner that distinguishes the most recently updated application.

An identification of the user who is working in the application may also be displayed in the Showcase user interface screen in association with the page, for example, below the live-rendered page. Because the ADS 110 knows the last incremental change for each user and how long ago the change happened, the client 110 can accurately identify and display user avatars (or images) in association with the applications which users are working on.

In the shown embodiment, the number of shared applications is too large to display all of the live-rendered pages within one screen of the Web browser 282 (FIG. 2) so a scrollable page is provided by the Web browser 282 (FIG. 2). In the shown embodiment, the live-rendered pages are presented in a tiled or grid configuration. A different arrangement may be used in other embodiments. The live-rendered pages of the shared "community" applications may be a last edited page (e.g., changed or added page) or a designated page. In either case, the pages are live-renders based on the current state of the application.

As shown in FIG. 12B, a public application is accessible via a dedicated URL (uniform resource locator) and has a dedicated application page which may be displayed by selecting the application from the Showcase user interface screen, for example, by appropriately selecting the live-rendering of the application from the Showcase user interface screen or via the dedicated URL. The application page displays renderings of the application and shows some or all of the data from Specification user interface screen.

Figure 13:
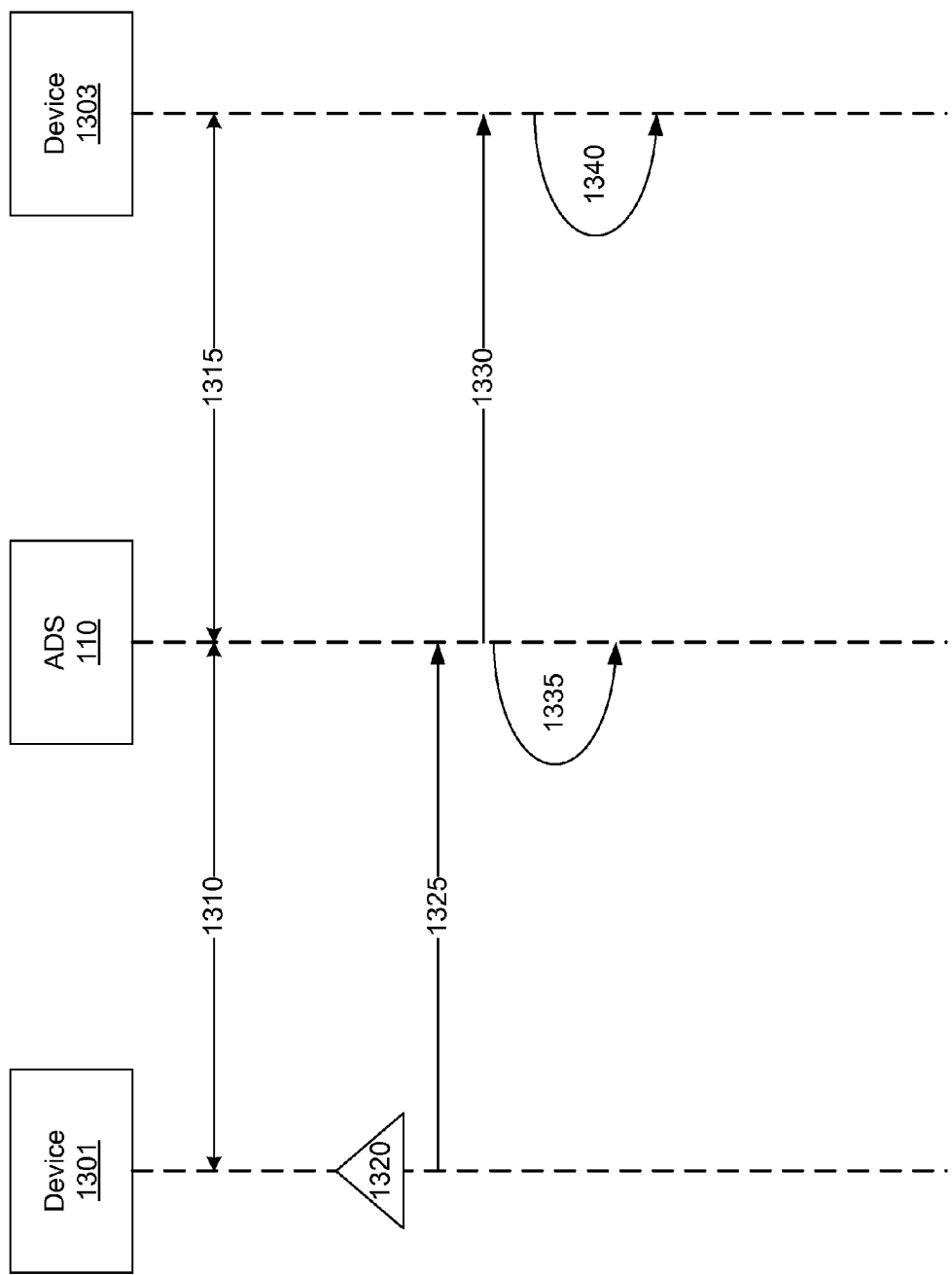
FIGS. 13 and 14 are message sequence diagrams illustrating example communications between devices collaborating on an application in accordance with an example embodiment of the present disclosure.

FIG. 13 illustrates a message sequence diagram illustrating example communications between devices 1001, 1003 collaborating on an application via the application development server (ADS) 110 in accordance with example embodiment of the present disclosure. The application is hosted by the ADS 110. The devices 1301, 1303 are computers 120, or possibly mobile devices 130 or a combination of a computer 120 and a mobile device 130. While FIG. 13 illustrates two collaborating devices 1301, 1303, the example communications described herein can be expanded to include additional collaborating devices.

At event 1310, a persistent connection is established between the first collaborating device 1301 and the ADS 110. When first collaborating device 1301 is a computer 120, the tool 800 is accessed via a Web browser 382. When the first collaborating device 1301 is a mobile device 130, the connection may be established by an application running on the mobile device 130. Similarly, at event 1315, a persistent connection is established between the second collaborating device 1303 and the ADS 110. By maintaining an open communication channel between the ADS 110 and the devices 1301, 1303, the ADS 110 can send real-time or near real-time updates to the devices 1301, 1303. The order or manner in which the persistent connections are established may vary between embodiments.

The client device will re-open the connection if the persistent connection closes, so that it is continually receiving changes to applications. When opening the persistent connection, the client device provides the ADS 110 with information used to determine the changes to send to the client device. The information includes a timestamp which tells the ADS 110 the last change which was received with respect to a given application, and one or more application identifiers (IDs) which informs the ADS 110 which change notifications to send to the client device). The timestamp is used when the connection to the ADS 110 is closed and the client device attempts to re-open the persistent connection. During the time it takes to re-open the persistent connection an event (i.e., change to an application) could happen on the ADS 110. When the persistent connection is re-established, the ADS 110 sends any events (i.e., changes) which occurred during between the closing and the re-opening of the persistent connection.

At event 1320, one or more updates are performed on the application on the device 1301. The types of updates generally include additions, deletions or other changes to the application. Examples of specific changes include, but are not limited to, object creation, object deletion, object modification, page creation, page deletion, page modification, and application modification.

At event 1325, the device 1301 sends change information to the ADS 110. The change information, which can be in any format or data structure, includes information identifying a change to the application. For example, the change information can identify changes affecting properties, objects, views, pages, or the application as a whole. The device 1301 sends the change information to the ADS 110 over the communication channel as a message or other data transmission compatible with the communication channel and connection between the ADS 110 and the device 1301. The device 1301 sends the change information to the ADS 110 immediately after the change is performed locally such that the change information is sent to the server in real-time or near real-time. As noted above, change information can include the type of change, the changed node (i.e., the changed user interface object or control), the timestamp of the change, the user who made the change, and information or instructions to apply and reverse the change.

The tool 800 or application on the mobile device 130 may be configured to identify more than one change in a single notification, typically when the changes are related. For example, if the word "hello" is input as individual characters, instead of five separate change information messages, the input of the entire word can be identified in a single change information message. Similarly, multiple changes to a single object such as changing multiple attributes, or a combination of creating an object and modifying its attributes can be identified in a single change information transmission. Other combinations of changes including similar modifications to multiple objects are also possible. The tool 800 or application on the mobile device 130 can be configured to only include multiple changes in a single change information message when the changes are performed within a short period of time. The duration of time allow changes to be reported to the ADS 110 with less delay.

Upon receiving the change information from device 1301, the ADS 110, at event 1330, sends the change information to one or more collaborating devices such as the device 1303. In the example in FIG. 13, the ADS 110 sends the change information to the device 1303 over the communication channel established at event 1315. By sending the change information to the device 1303 immediately or shortly after the change information is received by the ADS 110, the collaborating devices can be informed of the change to the application in real-time or near real-time.

The change information sent to the collaborating devices can be in the form of a delta record (change record) or in any other format or data structure. The ADS 110 can simply forward the change information from the device 1301 to the device 1303 and other collaborating devices. Alternatively, the ADS 110 can repackage or otherwise send additional information along with the change information. For example, the ADS 110 can include a timestamp of when the change information from the device 1301 was received by the ADS 110. In another example, if not already included in the change information received from the device 1301, the ADS 110 can include information regarding the user or device associated with the changes. When a user is associated with a particular device, the ADS 110 can, in some examples, determine what user performed the changes based on the device from which the change information was received.

At event 1335, the change information received at event 1325 is stored at the ADS 110. While event 1335 in FIG. 13 is illustrated as occurring after event 1330, event 1335 can occur before or concurrently with event 1330. The change information can be stored on a storage device physically connected to the ADS 110 or a storage device at one or more locations on a network. For example, the change information can be stored in the internal memory 114 of the ADS 110, or it can be stored on the communication network 150 in a database 142 at one or more collaboration servers 140. The change information may be stored at multiple locations in some embodiments.

By storing change information identifying all changes performed on the application by all collaborators on any collaborating device, the ADS 110 creates a complete modification (change) history from the inception of the application. The modification history may be used to allow a user to rewind the state of the application from the current to any previous state of the application regardless of whether the application was saved with an explicit save command, and the moved forward to a later state of the application from the previous state of the application.

At event 1340, device 1303 applies the change to the local copy of the application, displayed within the tool 800 presented in the Web browser 282 or application on the mobile device 130, upon receiving change information from the ADS 110 identifying the change.

Generally, the change is applied immediately upon receipt of the change information at event 1330 and the application is automatically re-displayed including any changes; however, in some example embodiments, the performance of the change may be deferred. For example, if device 1303 is displaying a page of the application which is not affected by the change, the change will not appear until the application is changed to the page which is affected by the change.

Figure 14:
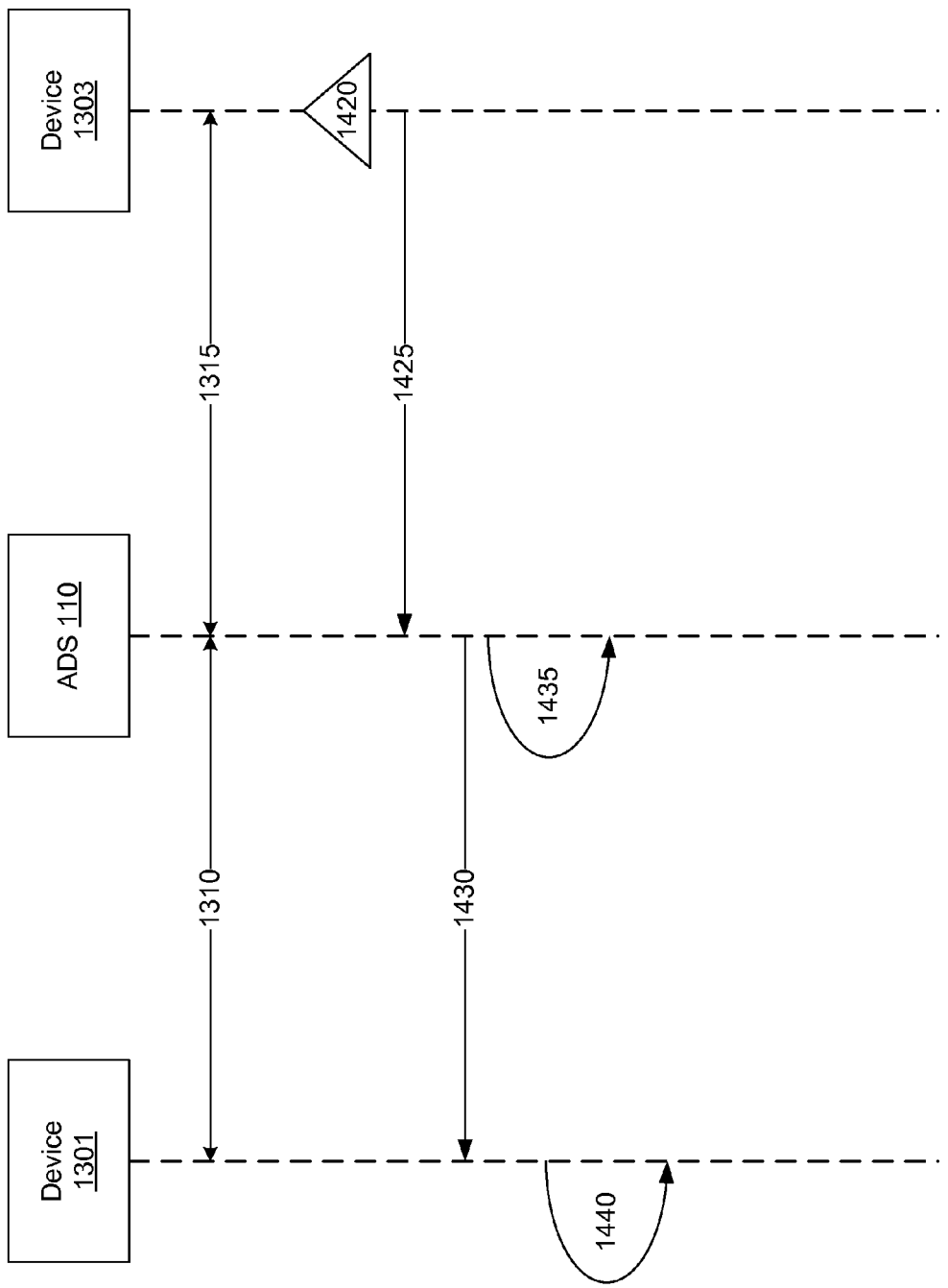

FIG. 14 illustrates a message sequence diagram illustrating example communications between devices 1001, 1003 collaborating on an application via the ADS 110 in accordance with another example embodiment of the present disclosure. The events of FIG. 14 are similar to the events shown in FIG. 13 with the notable difference that the change originates on the device 1303 rather than device 1301. The shown events can occur before, after or concurrently with the events in FIG. 13.

At event 1310, a persistent connection is established between the first collaborating device 1301 and the ADS 110. When first collaborating device 1301 is a computer 120, the tool 800 is accessed via a Web browser 382. When the first collaborating device 1301 is a mobile device 130, the connection may be established by an application running on the mobile device 130. Similarly, at event 1315, a persistent connection is established between the second t collaborating device 1303 and the ADS 110. By maintaining an open communication channel between the ADS 110 and the devices 1301, 1303, the ADS 110 can send real-time or near real-time updates to the devices 1301, 1303. The order or manner in which the persistent connections are established may vary between embodiments.

At event 1420, one or more updates are performed on the application on the device 1303 rather than device 1301. The updates include additions, deletions or other changes to the application.

At event 1425, the device 1301 sends change information to the ADS 110. The change information, which can be in any format or data structure, includes information identifying one or more changes to the application.

Upon receiving the change information from device 1301, the ADS 110, at event 1430, sends the change information to one or more collaborating devices such as the device 1301.

At event 1435, the change information received at event 1425 is stored at the ADS 110.

At event 1440, device 1301 applies the change to the local copy of the application, displayed within the tool 800 presented in the Web browser 282 or application on the mobile device 130, upon receiving change information from the ADS 110 identifying the change.

Dynamic Linking

Control objects can be linked to underlying media assets such as image, video or audio files within the Cascades™ application framework. For example, the ImageView control can be defined by an underlying image file. Image objects within an application opened in the tool 800 can maintain a dynamic link to the image that they contain. For example, an image object in FIG. 8 appears in the canvas as an image 890 showing a harbour. This image object may have an image source property (not shown) dynamically linking the image object to an image file, for example named "boats.jpg".

Figure 15:
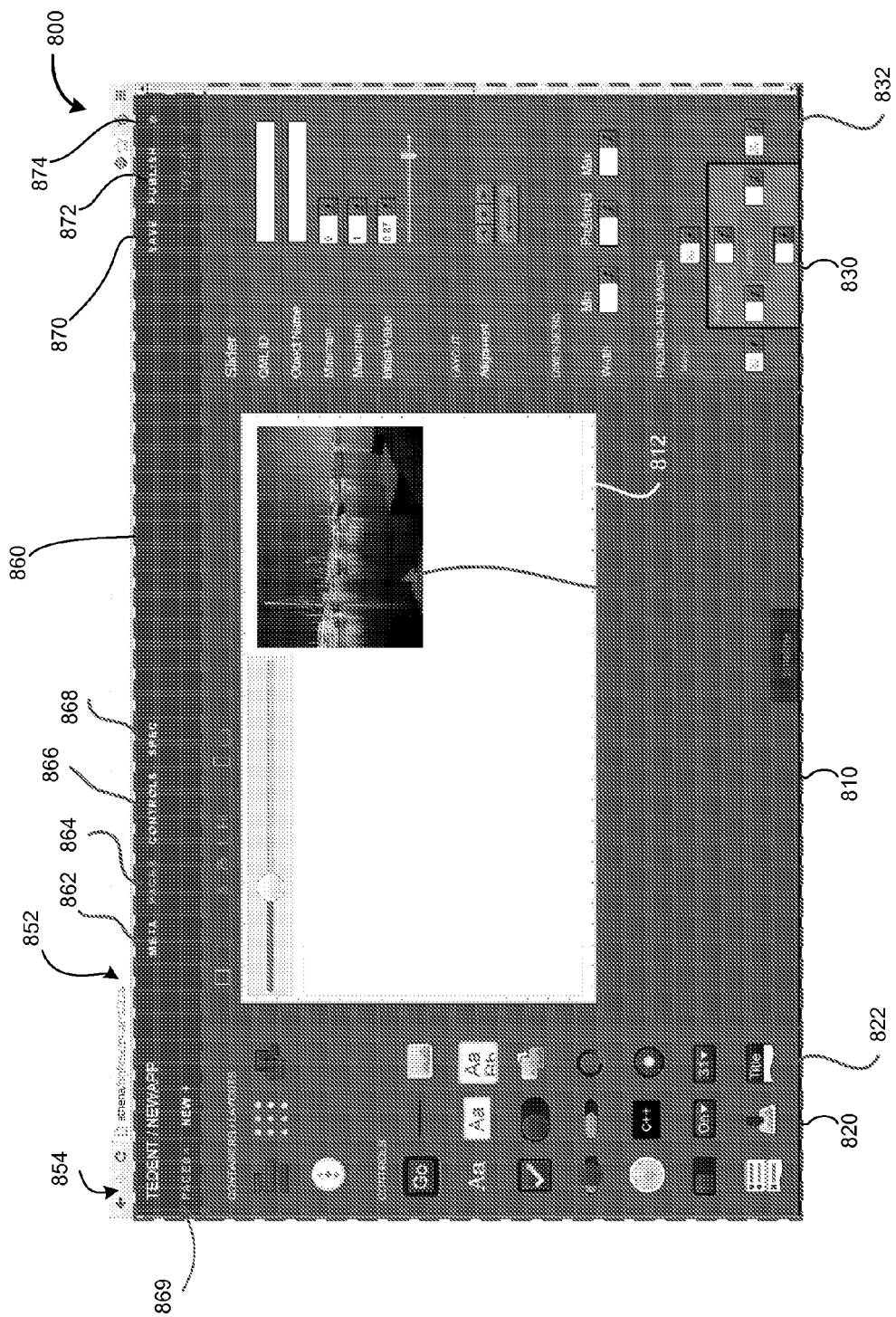
FIG. 15 is another example editor user interface screen of the application development tool for creating, editing and viewing an application page in accordance with an example embodiment of the present disclosure.

Multiple image objects may link to the same image file. These image objects do not necessarily share other attributes such as dimensions, opacity, location and the like, but can share the same dynamic link. For example, the image object in FIG. 8 occupies a large area centered in a bottom portion of the rendered page. However, another example image object on a second page illustrated in FIG. 15 can reference the same "boats.jpg" file, but can have a different size and location. In FIG. 15, the image 895 is rendered smaller on the second page and is positioned at the top right corner of the page.

The image file underlying an image object can be changed, for example, by changing the filename in the associated image object property field, or by dragging a new image onto the canvas such that it replaces the existing image in the canvas. This changes the dynamic link of the image object. The dynamic link may also be changed by other means.

When a dynamic link is changed, the change is applied to all image objects sharing the same dynamic link. In the example above, if the image 890 seen in FIG. 8 is changed to an image of cars from an image file named "cars.jpg", the dynamic link in the image object is changed to "cars.jpg" and the image rendered in the canvas is automatically changed to display the cars.jpg image. Changing this dynamic link also changes the image object on the second page to "cars.jpg", and any user viewing the second page will automatically see the updated image. These changes to dynamic links can be communicated to different collaborators by any of the example methods described herein.

For example, with reference to FIG. 13, a first user at device 1301 may be collaborating with a second user at device 1303 on the application appearing in FIGS. 8 and 16. The first user may be viewing a first page of the application as seen in FIG. 8 while the second user may be viewing a second page of the application as seen in FIG. 15. At event 1320, the first user performs a change which changes the dynamic link in the image object from "boats.jpg" to "cars.jpg".

At event 1325, the device 1301 sends change information to the ADS 110 including information identifying the change changing the dynamic link to the image object. If the new image file is only stored on the device 1301 and is not on the ADS 110 (rather than, for example, being selected from the images in the Images user interface screen shown in FIGS. 11A and 11B), the new image file is also sent to the ADS 110 at event 1325.

At event 1330, the ADS 110 sends the change information identifying the change changing the dynamic link to the image object so that it links to the new image file. The ADS 110 can also send the new image file to the device 1303 when required.

At event 1335, the changes information received at event 1325 and the new image file, if applicable, are stored at the ADS 110 as described herein. While event 1335 in FIG. 13 is illustrated as occurring after event 1330, event 1335 can occur before or concurrently with event 1330.

Upon receiving the change information from the ADS 110 identifying the change, the device 1303 at event 1340 applies the change to the local copy of the application. If the change to the dynamic link affects multiple objects, each object is updated accordingly.

Generally, the updated dynamic link and new image file are applied immediately upon receipt of the change information at event 1330 and the application is automatically re-displayed including any changes; however, in some example embodiments, the application of the dynamic link and new image file may be deferred. It will be appreciated that when multiple objects are affected by the updated dynamic link, multiple pages of the application can be affected. For example, if device 1303 is displaying a page of the application which is not affected by the updated dynamic link (i.e., which does not include an image object defined by the dynamic link), the new image will not appear until the application is changed to a page in which the image object defined by the dynamic link is displayed.

Application Showcase

Figure 16A:
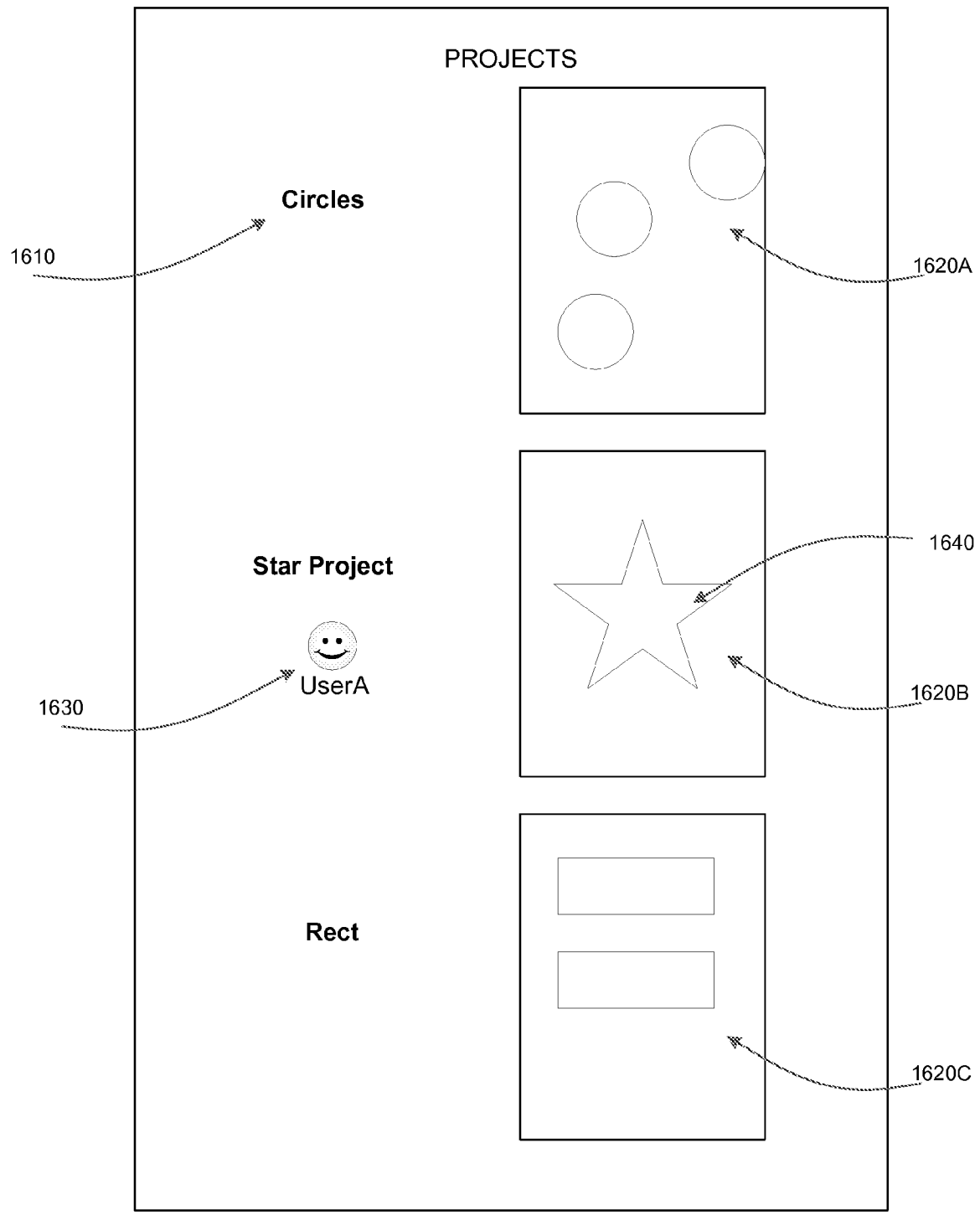
FIGS. 16A, 16B and 16C are example Showcase user interface screens of the application development tool in accordance with an example embodiment of the present disclosure.

FIG. 16A illustrates another example of a Showcase user interface screen displaying three applications "Circles", "Star Application" and "Rect". In FIG. 16A, the application name 1610 and a page from each application 1620A, 1620B, 1620C. When a device displaying the Showcase user interface screen receives change information identifying a change to a page of an application being shown in the Showcase user interface screen, the device applies the change and updates the local application of the application and redisplays the updated page in the Showcase user interface screen.

For example, with reference to FIG. 16A, consider that a collaborator "User A" at device 1301 is editing the application entitled "Star Application" hosted on the ADS 110 and that a collaborator "User B" at device 1303 is viewing the Showcase user interface screen. The Showcase user interface screen displays the user name or other user identifier for User A as well as avatar 1630 in association with the live-rendered Star Application page and name.

Figure 16B:
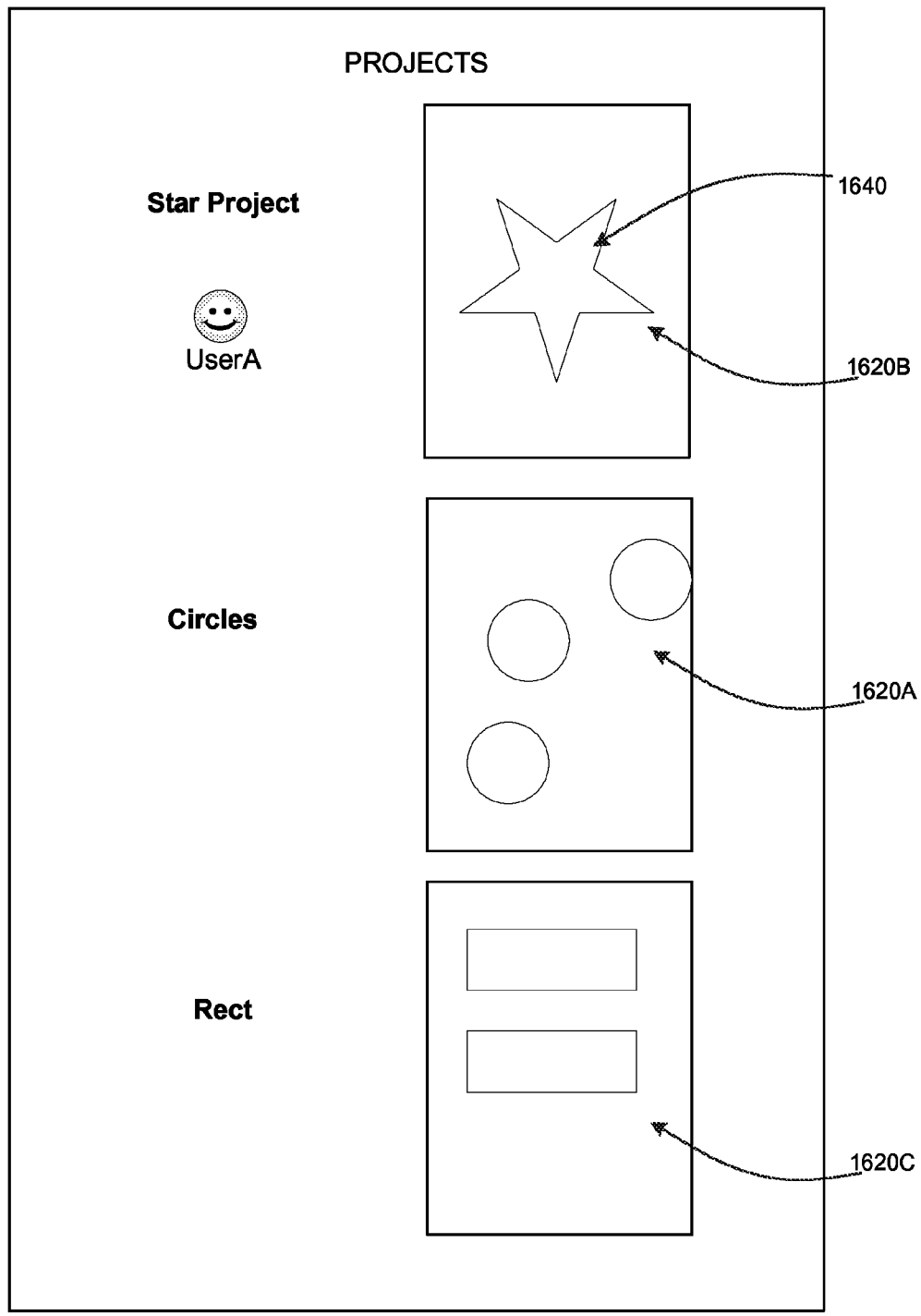

If User A changes the rotation property for a star object 1640 rendered in the page 1620B of the Star Application, the device 1301 sends the change information identifying the change to the star object 1640 to the ADS 110. The information is received and stored at the ADS 110. The ADS 110 sends the change information identifying the change to the rotation property of the star object to the device 1303 of User B. At event 1340, the device 1303 applies the change to the rotation property of the star object which changes the page of the Star Application shown in the Showcase user interface screen. The updated page of the Star Application is displayed in the Showcase user interface screen as seen in FIG. 16B. In the shown example, the Star Application is the most recently modified application, so the Star Application is moved to the top of the Showcase user interface screen.

Figure 16C:
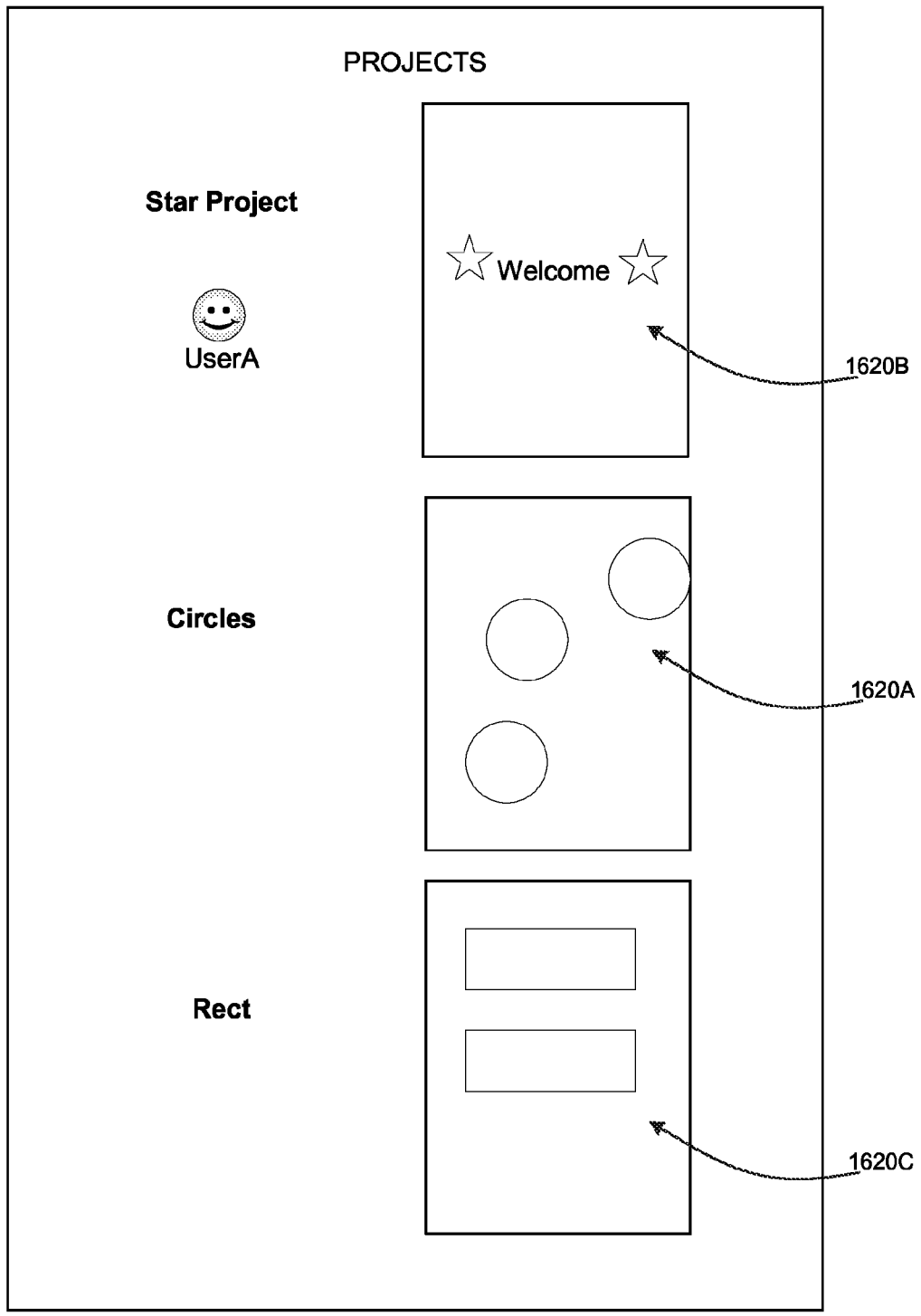

When collaborator User A makes a change to a page of the application which is not currently displayed in the Showcase user interface screen on the device 1303 of User B, the page of the application shown in the Showcase user interface screen is changed the updated as shown in FIG. 16C.

FIG. 17A and FIG. 17B show other examples of the Showcase user interface screen in which multiple pages of a single application are displayed. In FIG. 17A, the two most recently updated pages of the "Star Application" are displayed with the most recently updated page appearing in the left position and the previous version appearing in the right position. As additional changes are made to the application, the newly affected views can be displayed sequentially and less recently updated views may no longer be displayed. In FIG. 17B, the pages of the application are displayed in an overlapping layout with the most recently updated view appearing on top.

Methods for Real-Time Collaboration

Figure 18:
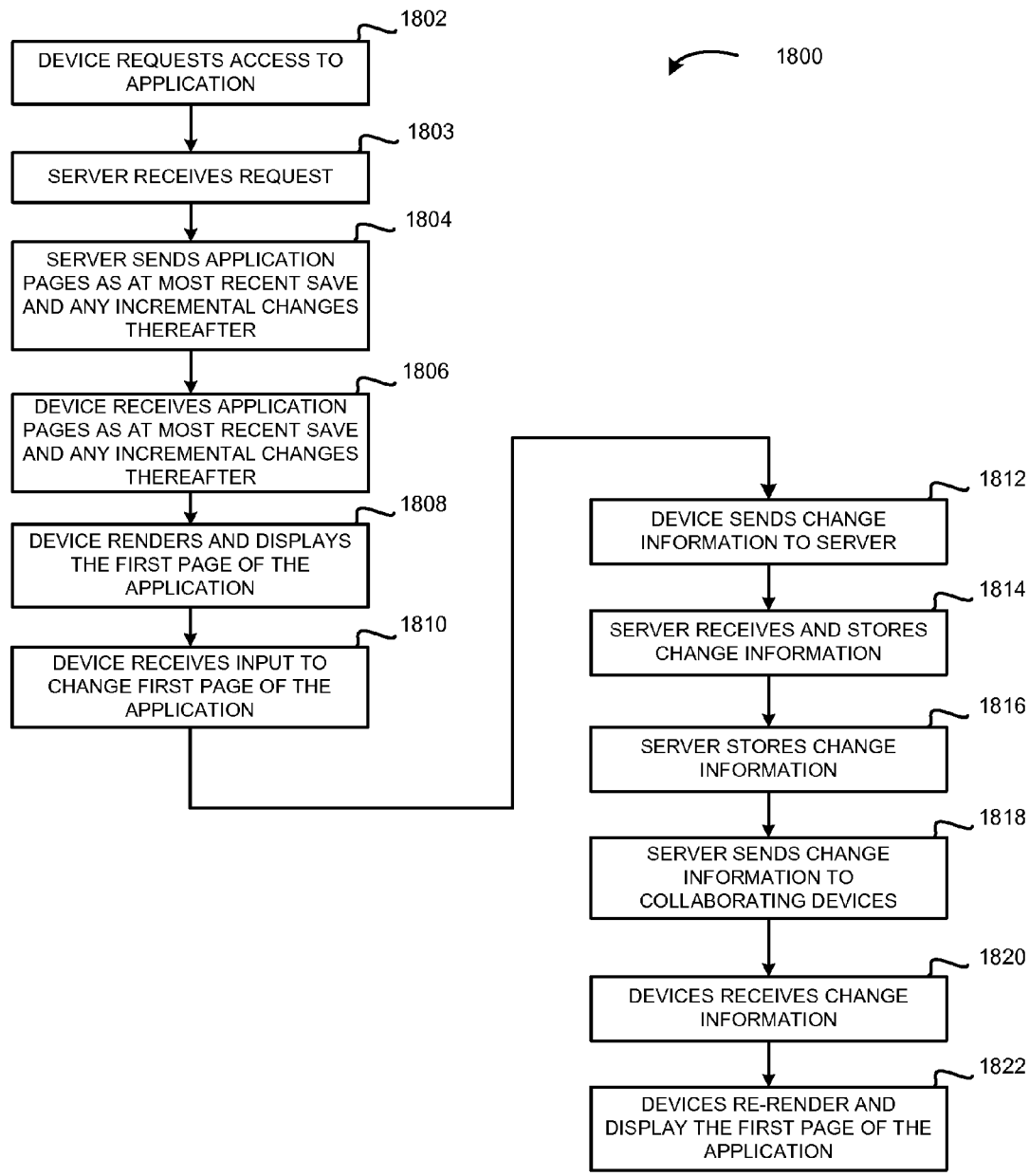
FIGS. 18 to 21 are flowcharts illustrating methods for real-time collaboration on an application under development among two or more collaborating devices in accordance with example embodiments of the present disclosure.

FIG. 18 is a flowchart illustrating a first method 1800 for real-time collaboration on an application under development among two or more collaborating devices in accordance with one example embodiment of the present disclosure. The method 1800 may be carried out by software executed, for example, by a processor. Coding of software for carrying out such a method 1800 is within the scope of a person of ordinary skill in the art provided the present disclosure. The method 1800 may contain additional or fewer processes than shown and/or described, and may be performed in a different order. Computer-readable code executable by the processor 102 to perform the method 1800 may be stored in a computer-readable medium such as a memory of a host device.

The method 1800 presumes that the tool 800 is running on a suitable computer 120 or the published application is running on the mobile device 130. The tool 800 is run by accessing the website at which the tool 800 is hosted using the Web browser 282 of a computer 120. The QML parser is downloaded when the tool 800 is launched within the Web browser 282. Alternatively, the QML parser may be a provided by a plugin for the Web browser 282. As part of running the tool 800 or published application, a persistent connection is established between the computer 120 or mobile device 130 and the ADS 110. The persistent connection may be an HTTP or HTTPS connection. Depending on the connection type, this may include sending or responding to keep alive or heartbeat messages. A user authentication step in which user credentials are requested and challenged are typically performed but have been omitted here for simplicity. At 1803, the request is received by the ADS 110.

At event 1802, a first collaborating device 1301 requests the current state of an application from the ADS 110, for example, by requesting to edit or view an application which the user has access to within the editor of the tool 800. The application in the described example has a number of collaborating users which are authorized to view and/or edit the application. Each collaborating user accesses the application from a client device such as a computer 120 or mobile device 130. It will be appreciated that other collaborating devices may also be viewing the same page or different pages of the same application at the same as the first collaborating device 1301. It is contemplated that in other examples the first collaborating device 1301 may request an application state other than the current state of an application.

At event 1804, in response to the request by the first collaborating device 1301 the ADS 110 sends all of the pages of the application in accordance with a previous save point of the application, typically the most recent save point, and any and all incremental changes since the previous save point. The pages of the application, which are defined QML and each comprise one or more QML files, are sent to the first collaborating device 1301 along with any incremental changes. The incremental changes are defined by the change information associated with those changes, as described above, includes information or instructions to apply and reverse the change.

At event 1806, the first collaborating device 1301 receives the application pages as well as any incremental changes. As noted above, the pages each comprise a QML document and any media assets included therein.

At event 1808, the first collaborating device 1301 generates the current state of the application by applying any incremental changes to the application code at the previous save point. As noted above, each save point and each incremental change may be associated with a respective timestamp which allows the identification thereof. The incremental changes are applied to the application page as at the previous save point in order using the timestamps associated with the incremental changes. The first collaborating device 1301 then renders the first page of the application in accordance the current application state, and displays the rendered first page on the display of the client device within the Web browser or application, as the case may be. Alternatively, a last edited page, a default start page (also known as the entry point) or a specified page of the application may be displayed. The last edited page may be the page last edited by that particular user, or possibly any user. This allows the user to continue editing from the point of the last edits. In other embodiments, all pages of the application may be rendered rather than just the first page or other selected page. The pre-rendering of pages may create efficiencies and reduce lag in the user interface when subsequent pages of the application are later displayed.

As part of the rendering, the QML parser on the first collaborating device 1301 parses the QML of the application pages and creates HTML pages styled using CSS. Media assets which are used by the application, such as digital still images, are stored on the ADS 110 in the memory. The location of the media asset is specified in the QML for a given page. When a page displayed on the client includes a media asset, the client device constructs an URL to retrieve the media asset using the location specified in the QML/HTML pages for a given page in an analogous manner to how a Web browser renders images on a website—the QML/HTML pages contain links to the images which are stored on the ADS 110 and pulled when needed. The incremental changes are then applied to the CSS-styled HTML pages by the first collaborating device 1301 so as to render the current state of the application. The first page of the application is then displayed on the display of the first collaborating device 1301.

When the application is access via the tool 800, the tool 800 may be used to select and view other pages of the application in response to corresponding input via the editor user interface screen of the tool 800, for example, by selecting the tab 871 for creating a new page or by selecting one or more tabs 873 for selecting a different existing page (see, FIG. 8).

It will be appreciated that the application is rendered by each client device, either by JavaScript running within a Web browser 282 on a computer 120 and generating HTML/CSS for display, or by the Cascades™ UI rendering engine running on a mobile device 130.

In alternative embodiments, the application pages and any incremental changes may be received in two steps rather one step. For example, the client device may receive application pages first and then render the first application page. The client device may then request and receive any incremental changes, and apply the incremental changes to the rendered application page.

At event 1810, the first collaborating device 1301 receives input to change the displayed page (e.g., the first page) of the application. The change may be an explicit change made by the user in response to interacting or manipulating the page (e.g., within the tool 800), or the change may be an implicit change made by undoing one or more changes to revert to a previous state of the application or other different state of the application, for example, by selecting a different state of the application from a visual timeline of the application as described elsewhere in the present disclosure. The change is immediately applied by the first collaborating device 1301, i.e., the first collaborating device 1301 re-renders and re-displays the changed page.

At event 1812, the first collaborating device 1301 sends to the ADS 110 change information identifying the change to the displayed page of the application. When the page includes an image object comprising a dynamic link to an image file, the changes the image file associated with the dynamic link and the change information identifies a new image file to be associated with the dynamic link. The change information is associated with the new image file when the new image file is selected from a local memory of the first collaborating device 1301.

At event 1814, the ADS 110 receives the change information identifying the change to the displayed page of the application from the first collaborating device 1301. However, it will be appreciated that the ADS 110 detects and reports changes from all collaborating devices not merely the first collaborating device 1301. Accordingly, change information could also be received from a collaborating device other than the first collaborating device 1301, such as a second collaborating device 1303, connected to the ADS 110 with access to the application 110. The change information from the other collaborating device could be in addition to, or instead of, change information received from the first collaborating device 1301.

At event 1816, the ADS 110 stores the change information identifying change(s) to the application. As noted above, each change is stored individually in the common storage managed by the ADS 110 as an incremental change. The memory stores the application code, media assets (e.g., digital still images or digital videos) and incremental changes associated with each application managed by the ADS 110. As noted above, each change is stored in association with a timestamp which specifies a date and time of the change, and user information describing a user associated with the change. The timestamp be the date and time at which the change request was made or sent by the first collaborating device 1301, or the date and time the change request was received or applied by the ADS 110. The user information may be specified in the change information or could be part of information used to keep the persistent connection alive. The complete application code is also stored in one or more application states each representing the complete application code at a specific time. The complete application state may be stored, for example, in response to an explicit request to save the application.

At event 1818, the ADS 110 sends the change information describing the change(s) to all of the other collaborating devices, for example, in response to an open GET request from the other collaborating devices. Alternatively, the ADS 110 may send the change information to all collaborating devices, i.e. the first collaborating device 1301 and other collaborating devices which are displaying the page of the application, irrespective of which device collaborating device may the change. As noted above, the change information includes information or instructions to apply and reverse the respective change.

At event 1820, the collaborating devices receive the change information from the ADS 110.

At event 1822, when the change information is received, the current state of the application is displayed on the collaborating devices by applying the change information to the rendered first page, or alternatively the first page of the application is re-rendered by applying the change information to the application state existing on the collaborating devices. The changed or re-rendered pages are displayed on the display of the client device within the Web browser or application, as the case may be. The re-rendering and displaying happens automatically irrespective of which of the collaborating devices requested the change.

In the described embodiment, the change at event 1810 is immediately applied by the first collaborating device 1301 to provide a more responsive and efficient user interface. However, the first collaborating device 1301 or other collaborating device making a change to the application could first send the change information to the ADS 110 and waiting for the change information to be returned by the ADS 110 when it is sent to other collaborating devices before applying the change.

Advantageously, the above-described method 1800 allows changes which are made to an application under development by any of collaborating devices to be shared with other collaborating devices in real-time or near real-time regardless of the page of the application being viewed on the other collaborating devices.

It is contemplated that in other embodiments, the ADS 110 at event 1818 may send only the changes related to the page being viewed on the collaborating devices. It is further contemplated that in other embodiments the ADS 110 may alternatively send changes to all pages regardless of the page of the application being viewed but the client devices may ignore changes which do not relate to the page being viewed. In these alternative embodiments, the ADS 110 need not send the application code all of the pages of the application at event 1804 since the client devices will not receive or will ignore changes to pages other than the page being viewed.

Figure 19:
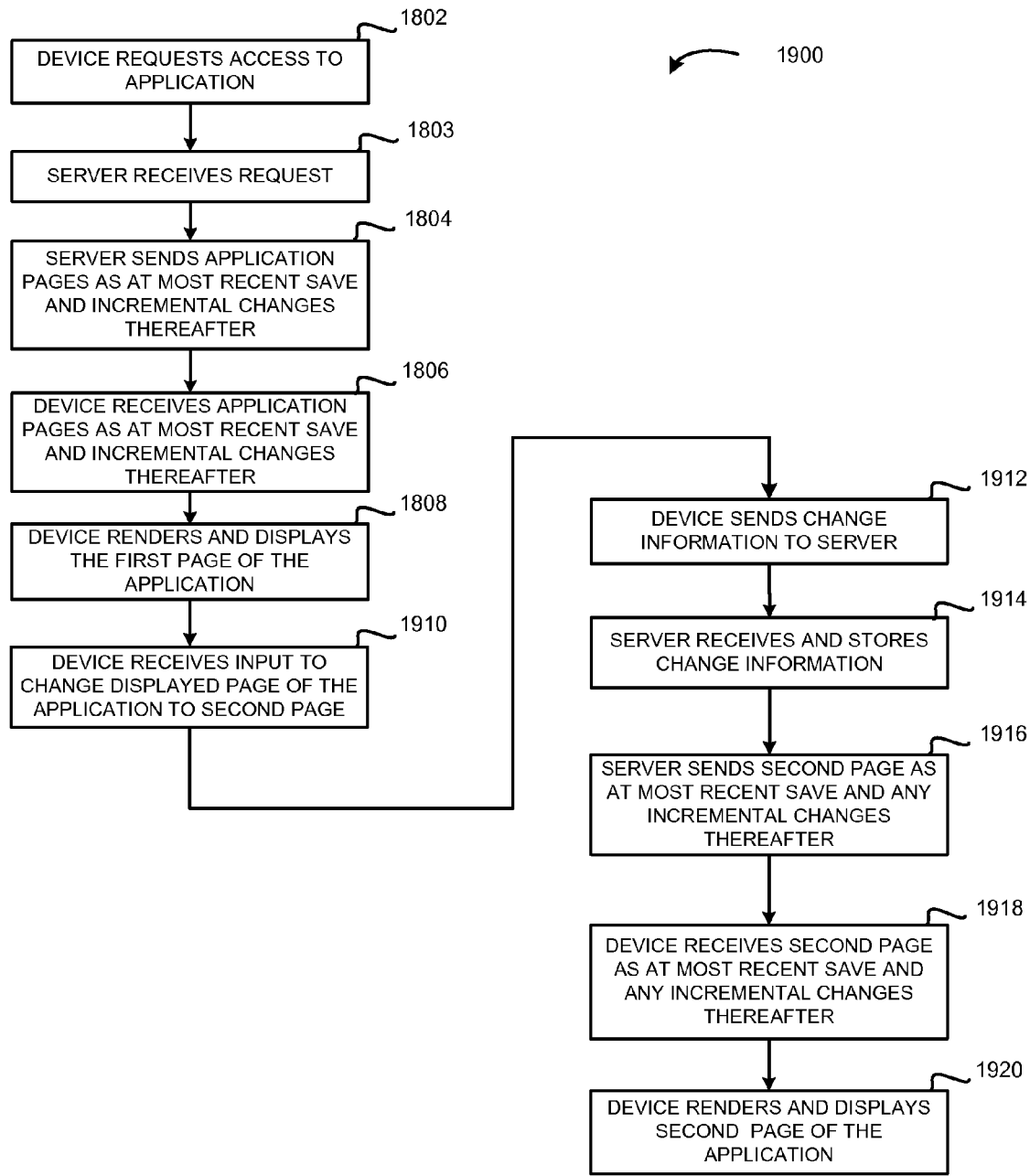

FIG. 19 is a flowchart illustrating a second method 1900 for real-time collaboration on an application under development among two or more collaborating devices in accordance with one example embodiment of the present disclosure. The method 1900 may be carried out by software executed, for example, by a processor. Coding of software for carrying out such a method 1900 is within the scope of a person of ordinary skill in the art provided the present disclosure. The method 1900 may contain additional or fewer processes than shown and/or described, and may be performed in a different order. Computer-readable code executable by the processor 102 to perform the method 1900 may be stored in a computer-readable medium such as a memory of a host device. The method 1900 presumes that the tool 800 is running on a suitable computer 120 or the published application is running on the mobile device 130 as in the method 1800.

The method 1900 is similar to the method 1800 described above, differing notably in that at event 1910 the first collaborating device 1301 receives input to change the page of the application being displayed from a first page to a second page rather than changing content in the first page. As described above, a change in the page being viewed is one type of change (i.e., "Active QML Document Switched") which is may be detected and reported.

At event 1912, the first collaborating device 1301 sends to the ADS 110 change information identifying the new page of the application to be displayed.

At event 1914, the ADS 110 receives the change information identifying the new page of the application to be displayed. As noted above, it should be appreciated that the ADS 110 detects and reports changes from all collaborating devices not merely the first collaborating device 1301. Accordingly, change information could also be received from a collaborating device other than the first collaborating device 1301.

At event 1916, in response to the request by the first collaborating device 1301 the ADS 110 sends the new page of the application in accordance with a previous save point of the application, typically the most recent save point, and any and all incremental changes since the previous save point.

At event 1918, the first collaborating device 1301 receives the new page of the application and any and all incremental changes since the previous save point. As noted above, the page comprises a QML document and any media assets included therein.

At event 1920, the first collaborating device 1301 generates the current application state and renders the new page of the application in accordance the current application state, and displays the rendered new page on the display of the client device within the Web browser or application, as the case may be.

The above-described method 1900 allows changes to pages of the an application under development which are made by any of the collaborating devices to be shared with other collaborating devices in real-time or near real-time even when the collaborating devices are displaying different pages of the application. Because the method 1900 sends the current state of an application when a request to display a new page is received, the method 1900 is particularly useful when the ADS 110 only sends changes related to the page being viewed on a collaborating device, or if clients ignore changes which do not relate to the page being viewed. In these alternative embodiments, the ADS 110 need not send the application code all of the pages of the application at event 1804 since the client devices will not receive or will ignore changes to pages other than the page being viewed.

Figure 20:
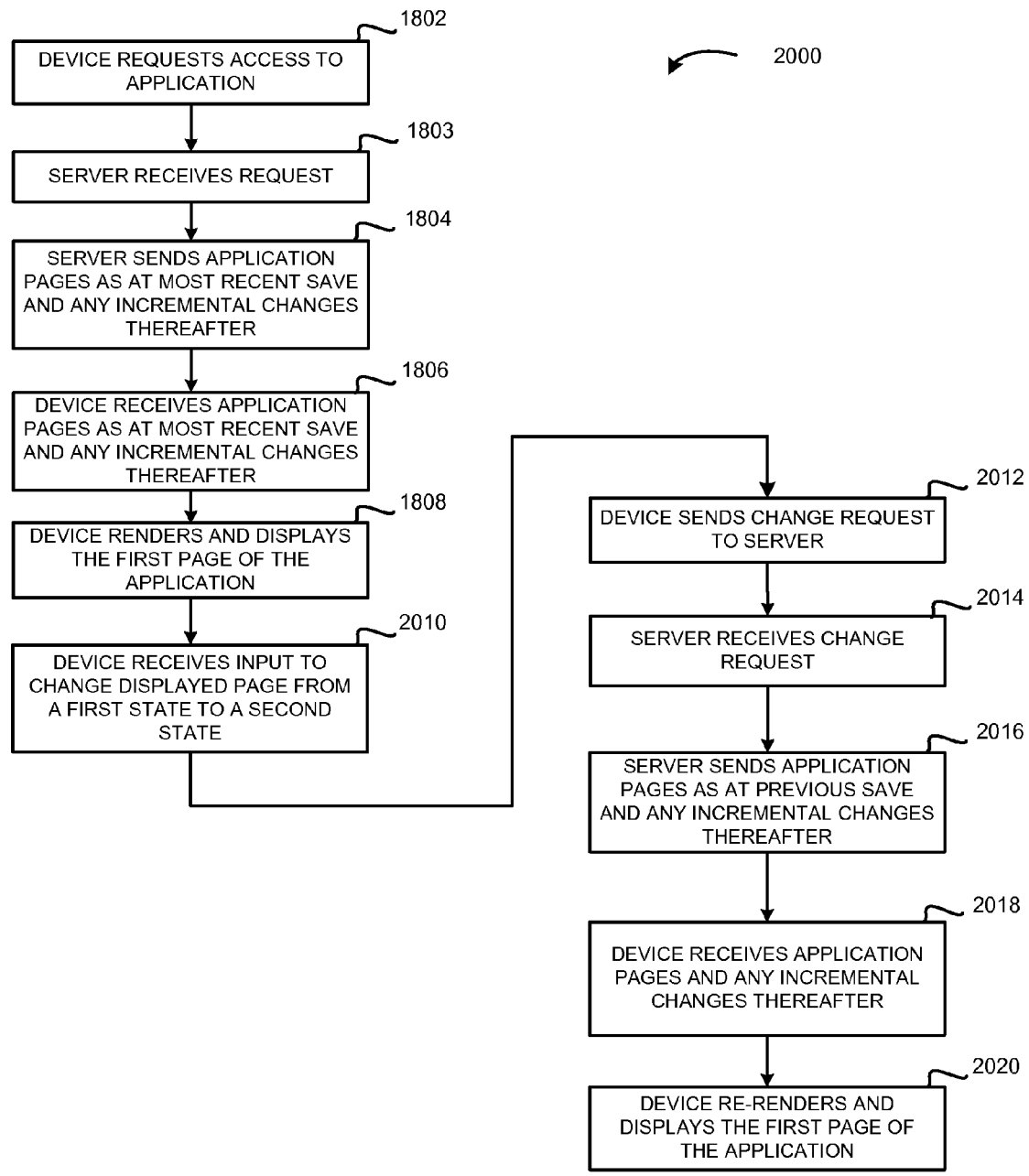

FIG. 20 is a flowchart illustrating a third method 2000 for real-time collaboration on an application under development among two or more collaborating devices in accordance with one example embodiment of the present disclosure. The method 2000 may be carried out by software executed, for example, by a processor. Coding of software for carrying out such a method 2000 is within the scope of a person of ordinary skill in the art provided the present disclosure. The method 2000 may contain additional or fewer processes than shown and/or described, and may be performed in a different order. Computer-readable code executable by the processor 102 to perform the method 2000 may be stored in a computer-readable medium such as a memory of a host device.

The method 2000 presumes that the tool 800 is running on a suitable computer 120 or the published application is running on the mobile device 130 as in the method 1800.

The method 2000 is similar to the method 1800 described above, differing notably in that at event 2010 the first collaborating device 1301 receives input to change the state of the application to be displayed from the first state to a second state. The second state could be a previous state (e.g., in response to a rewind/undo instruction) or other different state of the application (e.g., by selecting a different state of the application from a visual timeline of the application).

At event 2012, the first collaborating device 1301 sends to the ADS 110 change information identifying the second state of the application to be displayed.

At event 2014, the ADS 110 receives the change information identifying the new state of the application to be displayed. As noted above, it should be appreciated that the ADS 110 detects and reports changes from all collaborating devices not merely the first collaborating device 1301. Accordingly, change information could also be received from a collaborating device other than the first collaborating device 1301.

At event 2016, the ADS 110 sends the pages of the application in accordance with a previous save point of the application which occurs prior to the second state of the application, typically the most recent, and any and all incremental changes since the previous save point.

At event 2018, the first collaborating device 1301 receives the application pages of the application and any and all incremental changes since the previous save point. As noted above, the page comprises a QML document and any media assets included therein.

At event 2020, the first collaborating device 1301 generates the current application state and renders the application pages of the application in accordance the current application state, and displays the rendered new page on the display of the client device within the Web browser or application, as the case may be.

The above-described method 2000 allows different states of the application under development to be accessed by any of the collaborating devices in real-time or near real-time even when the collaborating devices are displaying different states and/or different pages of the application. In other embodiments, the ADS 110 at event 2018 may send only the page being viewed on the first collaborating device 1301.

Figure 21:
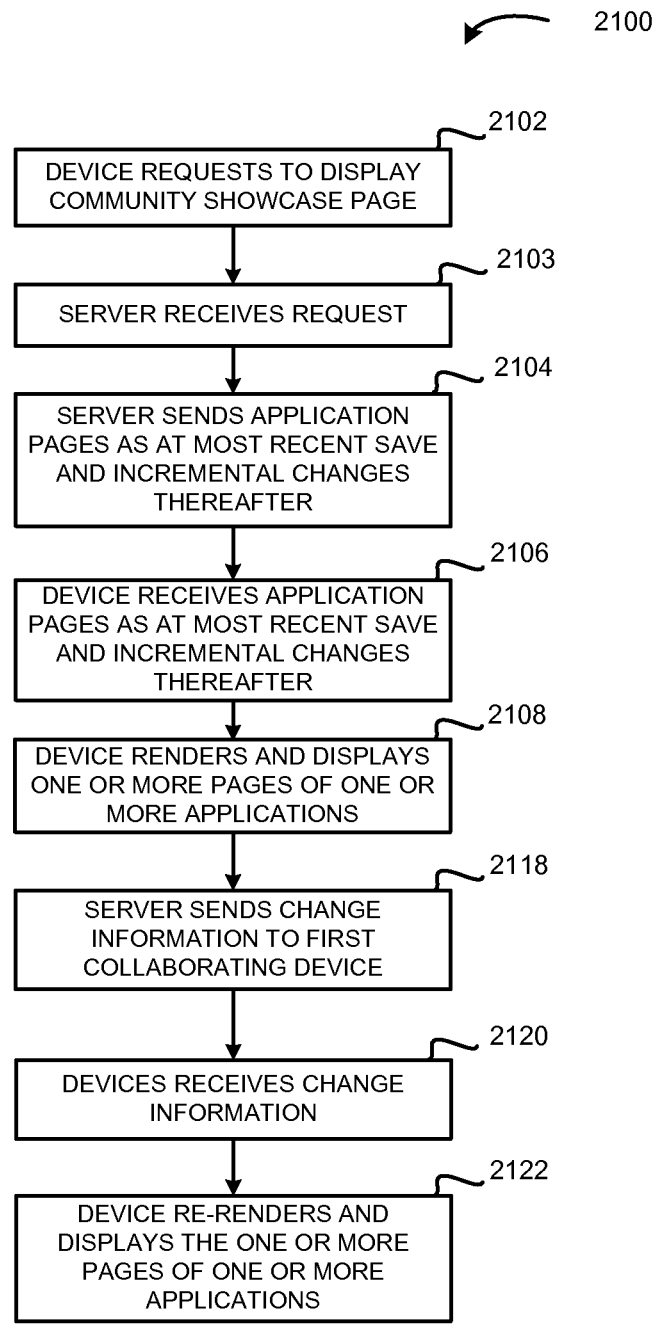

FIG. 21 is a flowchart illustrating a fourth method 2100 for real-time collaboration on an application under development among two or more collaborating devices in accordance with one example embodiment of the present disclosure. The method 2100 may be carried out by software executed, for example, by a processor. Coding of software for carrying out such a method 2100 is within the scope of a person of ordinary skill in the art provided the present disclosure. The method 2100 may contain additional or fewer processes than shown and/or described, and may be performed in a different order. Computer-readable code executable by the processor 102 to perform the method 2100 may be stored in a computer-readable medium such as a memory of a host device. The method 2100 presumes that the tool 800 is running on a suitable computer 120.

The method 2100 is similar to the method 1800 described above except that the first collaborating device 1301 requests a Community Showcase page be displayed rather than edit an application within the Editor. The applications in the Community Showcase page have a number of collaborating users which are authorized to view and/or edit the applications. Each collaborating user accesses the Community Showcase from a client device such as a computer 120. It will be appreciated that other collaborating devices may also be viewing the Community Showcase page. The request may be, for example, the result of a user on the first collaborating device 1301 attempting to view the applications shared by other uses which the user has access to.

At event 2102, the first collaborating device 1301 requests a Community Showcase page. In some embodiments, the first collaborating device 1301 requests each of the applications separately similar to when an application is requested in the editor. Alternatively, the applications could all be requested at once. The application IDs associated with the applications which the user has access to are stored by the ADS 110 and may be used by the ADS when determined which applications to send to the first collaborating device 1301. Alternatively, the application IDs may be sent to the client device, for example on user login, and may be sent to the ADS 110 with the request to display the Community Showcase page.

At event 2104, in response to the request by the first collaborating device 1301 the ADS 110 sends one or more pages of one or more applications which the user has access to in accordance with a previous save point of the application, typically the most recent save point, and any and all incremental changes since the previous save point. HTML defining the layout of the Community Showcase page is also sent to the first collaborating device 1301. Typically, the Community Showcase page is presented in a single page, for example, in an array or grid arrangement. An indication of the most recently modified application(s) may be provided as described elsewhere in the present disclosure.

For a given application, the one or more pages may be most recently edited page(s) or designated page(s). The number of applications for which pages are provided depends on the applications which the user has access to and any restrictions placed on the number of applications which can be displayed in one page. Thus, the content of the Community Showcase page is personalized for users based on the particular applications which the users have access to. For example, the Community Showcase page may set a limit on the number of applications which will be displayed for computational efficiency or other reasons, and when the user has access to more pages than can be shown in a single Community Showcase page, the Community Showcase page is implemented as a series of pages with each page having the set limit (e.g., 20 or 25 applications).

At event 2106, the first collaborating device 1301 receives the application pages as well as any incremental changes. As noted above, the pages each comprise a QML document and any media assets included therein.

At event 2108, the first collaborating device 1301 generates the current application state and renders the one or more pages of the one or more applications in accordance the current application state, and displays the rendered pages on the display of the client device within the Web browser or application, as the case may be. HTML defining the layout of the Community Showcase page is also sent to the first collaborating device 1301.

At event 2118, the ADS 110 sends change information describing changes to the rendered one or more pages of the one or more applications to the first collaborating device 1301, for example, in response to an open GET request from the first collaborating device 1301. As noted above, the change information includes information or instructions to apply and reverse the respective change.

At event 2120, the first collaborating device 1301 receives the change information from the ADS 110.

At event 2122, when the change information is received, the current state of the application is displayed on the first collaborating device 1301 by applying the change information to the one or more rendered pages of the one or more applications, or alternatively the one or more pages of the one or more applications are re-rendered by applying the change information to the application state existing on the first collaborating device 1301. The changed or re-rendered pages are displayed on the display of the client device within the Web browser or application, as the case may be.

It will be appreciated the first collaborating device 1301 and ADS 110 interact in the same way to provide a real-time or near real-time copy of the application regardless of whether the client is viewing a single application (e.g., in the editor user interface) or a number of applications (e.g. showcase user interface). It will be also appreciated that the methods 1800, 1900, 2000 and 2100 may be performed when any page of an application is being viewed.

Visual Timeline

Figure 22A:
FIGS. 22A and 22B are example editor user interface screens showing the invocation of a visual timeline in accordance with example embodiments of the present disclosure.
Figure 22B:
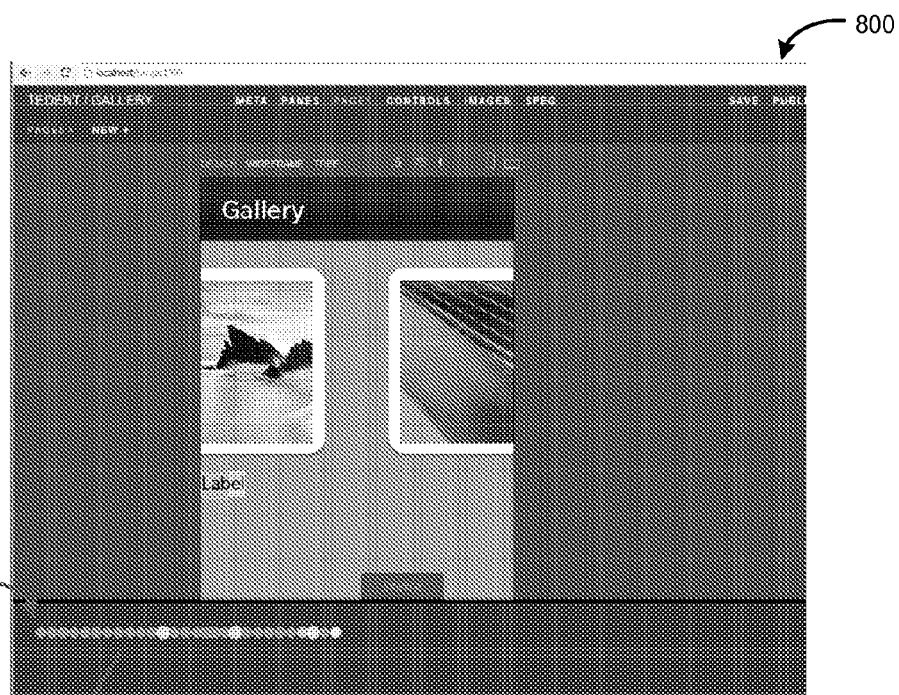

A visual time of the application state overtime may be provided by the tool 800 in some embodiments. FIG. 22A shows another example embodiment of the tool 800 in which the editor user interface screen is displayed. In this embodiment, the editing editor user interface screen includes a timeline button 2200. When the timeline button 2200 is activated, a visual timeline 2210 comprising a number of visual elements 2220 may be displayed as shown in FIG. 22B. Each visual element 2220 in the visual timeline 2210 represents an application state of a corresponding application, namely the application currently open for viewing/editing in the editor user interface screen. An application state may correspond to a save point or an incremental change, as described more fully below. The visual elements 2200 are arranged in the order in which the actions (i.e., save point or incremental change) occurred using the timestamps thereof. Selecting a visual element 2220 from the visual timeline 2210 may cause the current application state to change to the application state represented by the selected visual element 2220.

Figure 23A:
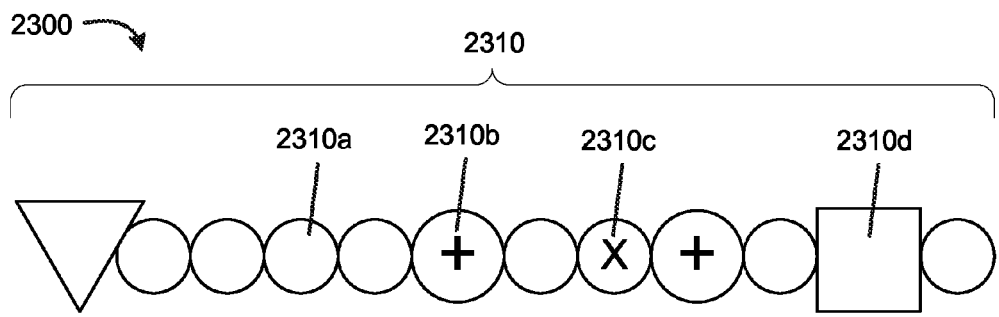
FIGS. 23A-23C show examples of a visual timeline in accordance with example embodiments of the present disclosure.

FIG. 23A illustrates an example timeline 2300 comprising a number of visual elements 2310 each corresponding to an incremental change and arranged in the order in which the changes occurred. The visual elements 2310 are aligned sequentially in the timeline 2300 based on the order in which the changes occurred. While not shown in the present examples, the visual elements 2310 could be spaced apart based on the time at which the changes occurred. For example, the space between the visual elements 2310 could be proportional to the time between changes. Different visual elements may be used to represent save points and incremental changes, and different visual elements may be used to represent different types of incremental changes. It is contemplated that a different visual element may be used to represent each different type of incremental change.

In the shown example of FIG. 23A, each visual element 2310 may have one or more visual properties, such as type, color, size or any combination thereof. At least some of the one or more visual properties of each visual element may depend on a type of action which the visual element 2300 represents. In the shown example, the visual element 2310 is an icon (or sprite), and the visual properties of the visual element 2310 can include an icon type, color, size or any combination thereof. In the shown example, different types of actions are shown using icons illustrating different geometric shapes (e.g., triangles for save points, squares for actions related to pages, and circles for changes relating to objects). The size of the visual elements may also be used to illustrate different actions in addition to, or instead, of the type of visual element. For example, visual elements may be displayed in a first size (e.g., default or standard size) to represent changes to an existing object or page, or a second size larger than the first size to represent additions of an object or page, or a third size smaller than the first size to represent deletions of an object or page.

In the shown embodiment, the visual elements are icons and the visual properties of the icons include an icon type, wherein save points are represented using a first icon type and incremental changes to objects are represented using a second icon type, and incremental changes to pages are represented using a third icon type. In particular, in this example, triangles are used to represent save points, circles are used to represent changes to objects, and squares are used to represent changes to pages. The visual properties of the icons may include a label, e.g. text label, to further identify the type of change. In the shown example, a first symbol displayed in association with the visual elements is used to represent additions, a second symbol displayed in association with the visual elements is used to represent deletions, and a third symbol (or the absence of a symbol) symbol displayed in association with the visual elements is used to represent changes/modifications to an existing object or page. In the shown example, the first symbol is '+' symbol, the second symbol is 'X' symbol, and an absence of a symbol is used to represent a change to represent changes/modifications to an existing object or page. Labels other than symbols could be used in other embodiments. The labels in the shown example are displayed with the geometric shapes; however, the text labels could be displayed differently in other examples.

Figure 23B:
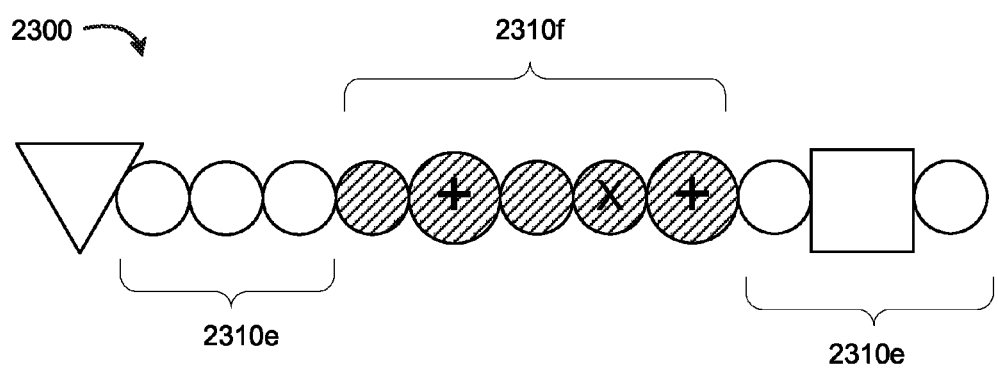

In the shown example, incremental changes of different types are represented using different visual elements, i.e. with different visual properties, while incremental changes of the same type are represented using the same visual elements, i.e. with the same or similar visual properties. For example, in the timeline 2300 shown in FIG. 23, the visual element 2310*a* is a circular icon and represents an incremental change in which a change is made to an object. Visual element 2310b corresponds to an incremental change in which an object is created. The visual element 2310b is circular like the visual element 2310a because both changes relate to objects; however, the visual element 2310b is larger and includes a '+' symbol to distinguish itself as a create object change. Visual element 2310c corresponds to an incremental change in which an object is deleted. The visual element 2310c is circular like the visual elements 2310a and 2310b because the changes all relate to objects; however, the visual element 2310c includes a 'X' symbol to distinguish itself as a deleted object change. Visual element 2310d which corresponds to an incremental change in which a change is made to the entire page. Visual element 2310d has a square-shape as it relates to pages to distinguish it from visual elements relating to objects which are circular.

Figure 23C:
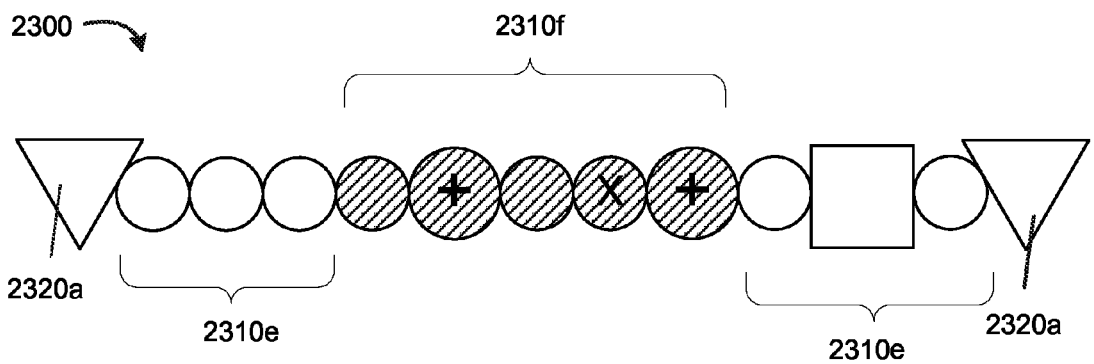

The visual elements representing save points and/or incremental changes associated with different users may be shown differently, for example, by changing one or more visual properties of the visual elements so that each user's save points or incremental changes are uniquely shown. For example, in the example timeline 2300 shown in FIG. 23B, the visual elements 23103 representing incremental changes of user 'A' have a first color (e.g., white) whereas the visual elements 2310f representing incremental changes of user 'B' have a second color (e.g., grey) different than the first color. The save points may be shown differently from the incremental changes associated as noted above. In FIG. 23C, the save points are shown using triangles (inverted in the shown example). A first save point 2320a is shown when the application is first created (i.e., in response to an automatic save operation), and a save point 2320b is shown when the application state is saved at a later time after a number of incremental changes represented by the visual elements 2310.

The visual timeline of the tool 800 does not only provide a visual representation of the various save points and incremental changes made to the application. In addition, the visual timeline may be used to change the application state by selecting a visual element from the visual timeline. The section causes the current application state to change to the application state represented by the selected visual element, which could be before or after the current application state. The use of the visual timeline to change the application state will now be described with reference to FIGS. 24A to 24D.

Figure 24A:
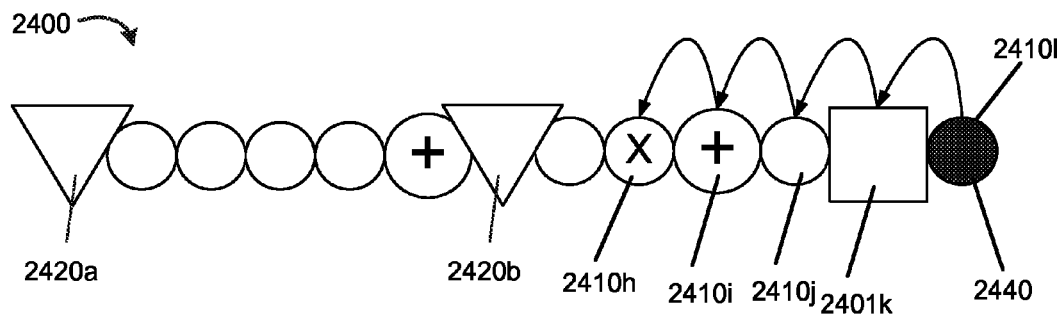
FIGS. 24A-24D show examples of a visual timeline in accordance with example embodiments of the present disclosure.

Because a user can view and edit from any state of the application, the current state of the application is shown within the visual timeline so that the user knows where he or she is within the visual timeline. With reference to FIG. 24A, the current state of the application is shown at the end of the visual timeline 2400 as indicated by the visual element 2410*l* using the color of the visual element 2410*l*. The current application state displayed in the editor user interface is shown using a state indicator which 2440 which identifies a visual element in the visual timeline 2400 corresponding to the current state of the application. This provides current position on the visual timeline 2400. In some embodiments, the state indicator may be provided by a unique color, such as red, applied to the visual element in the visual timeline corresponding to the current state of the application. In other embodiments, the state indicator could be a different visual attribute of a visual element corresponding to an action (such as the size or type). In yet other embodiments, the state indicator could be a distinct element such as a pointer or an avatar of the user whose session is being displayed in the tool 800.

An input to change the application to a different state can be received by the tool 800 when a user touches, taps, clicks on, or otherwise selects a visual element in the visual timeline, or possibly other input. The other input may be, for example, direction input via a slider in which case the direction and amount of travel of the slider button from its current position automatically selects a different application state which is before or after the current application state within the visual timeline (e.g., backwards for an application state before the current application state, forwards for an application state after the current application state). The other input may be other directional inputs or other means.

Figure 24B:
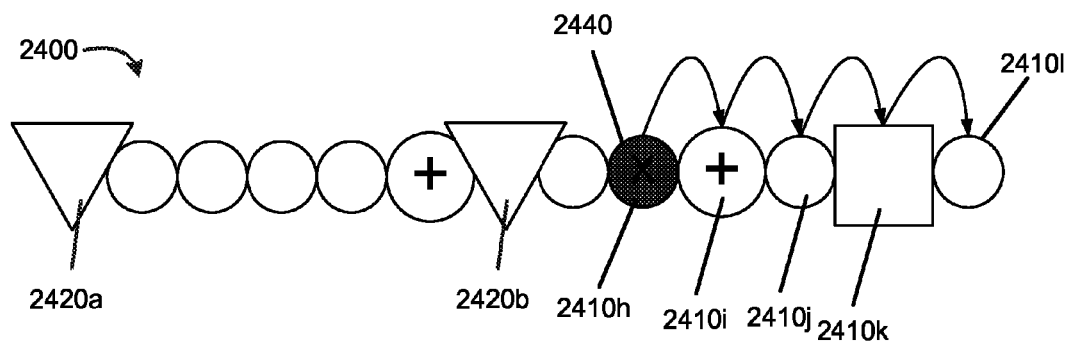

Referring again to FIG. 24A, if the visual element 2410h is selected, the application state is incrementally reversed to the state of the application as it appeared immediately after the incremental change(s) which corresponds to visual element 2410h. The reversal to the earlier state is performed by sequentially reversing the incremental changes corresponding to visual elements 2410k, 2410j, 2410i and 2410h in the reverse of the order in which the changes occurred. Conversely, if the current state of the application is at visual element 2410h as shown in FIG. 24B, and the visual element 2410l is selected, the application is incrementally advanced to the later state by sequentially performing the actions corresponding to visual elements 2410i, 2410j, 2410k and 2410l.

When the visual timeline is displayed concurrently with the editor user interface as in FIG. 22B, the tool 800 may determine each intermediate application in response to input to change from one application state to another (whether going forwards or backwards in time), and may render and display the changed page associated with the each intermediate application. This provides an animation of the changes will the visual effect of a fast-forward (in the case of change to a future application state) or rewind (in the case of change to a previous application state). This animation of the intermediate application states provides the user with visual feedback as to which actions were performed or reversed.

Figure 24C:
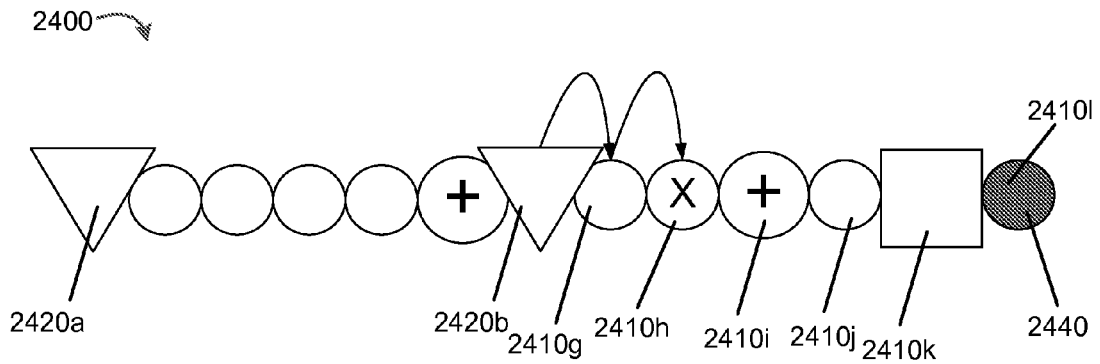

With reference to FIG. 24C, in addition to representing incremental changes identifying all the changes to the application since inception, the tool 800 stores save points corresponding to a state of the application when a request to save the application is received. The save points provide another point from a particular application state can be generated. For each save point, a complete copy of the application code in QML for the application is stored in memory by the ADS 110. The save points are also displayed in the visual timeline of actions. In the example visual timeline 2400 of FIG. 24a, the save points appear as triangular visual elements 2420a and 2420b. If the current application state displayed within the editor user interface corresponds to the visual element 2410*l* and input selecting visual element 2410h is received, the application state may be changed to the application state immediately after the action(s) corresponding to visual element 2410h are performed by applying the incremental changes represented by visual elements 2410g and 2410h in the order in which the changes occurred to the application state at the save point 2420b. Alternatively, the actions corresponding to visual elements 2410*l*, 2410k, 2410j and 2410i could be reversed as illustrated in FIG. 24A. This would require reversing the actions corresponding to four visual elements 2410 rather than restoring the application state to that corresponding to the save point at visual element 2410b and the actions represented by visual elements 2410g and 2410h.

Figure 24D:
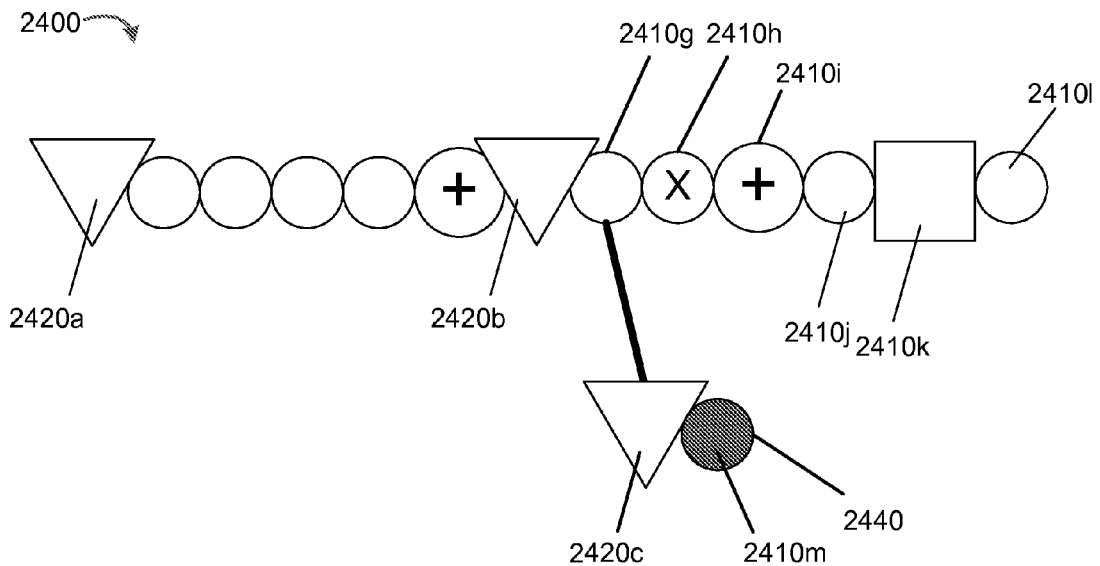

With reference to FIG. 24D, when an application has been reversed to a previous state, such as the state corresponding to visual element 2410h and the tool 800 receives input to perform an action to the application, a branch in the visual timeline 2400 is created. An incremental change corresponding to the action is created and stored, and the timeline 2400 is displayed having a branch originating from the visual element 2410*h* which corresponds to the previous state and terminating with a new visual element 2410*m* corresponding to the performed action. As illustrated in FIG. 24D, in at least some examples, creating a new branch causes a new save point to be automatically generated. The new save point 2420*c* is displayed within the visual timeline 2400 between the previous visual element 2410*h* at which the branch originates and the new visual element 2410*m* corresponding to the most recent action. Creating branches when changes are made to a previous state allows all previous states of the application to be maintained even when new parallel application states are created. While FIG. 24D illustrates an example visual timeline 2400 with a single branch, multiple branches can result when new actions are performed at multiple previous application states. It is possible for a visual timeline to have multiple levels of branching, multiple branches stemming from a single branch, or for multiple branches stemming from the same point on a branch.

It is contemplated that, when an application has been reversed to a previous state, such as the state corresponding to visual element 2410*h* and the tool 800 receives input to perform an action to the application, the tool 800 could provide an option to either create a branch as in FIG. 24D, or discard all states of the application subsequent to the selected visual element 2410*h*. The save points and incremental changes of the discarded application states may be kept in memory; however, the corresponding visual elements may be changed in appearance (e.g., greyed out or struck through) to indicate the status as discarded. In other embodiments branching may not be supported. In embodiments in which branching is not be supported, the visual timeline is a chronological timeline of actions without regard to the application state at which the change is made. Thus, if a change is made to a previous application state, a new visual element is added to the end of the visual timeline irrespective of the action which preceded it. Accordingly, it the visual timeline has 20 visual elements and a change is made to a previous application state represented by visual element 10, a new visual element 21 is added to the end of the visual timeline.

Figure 25:
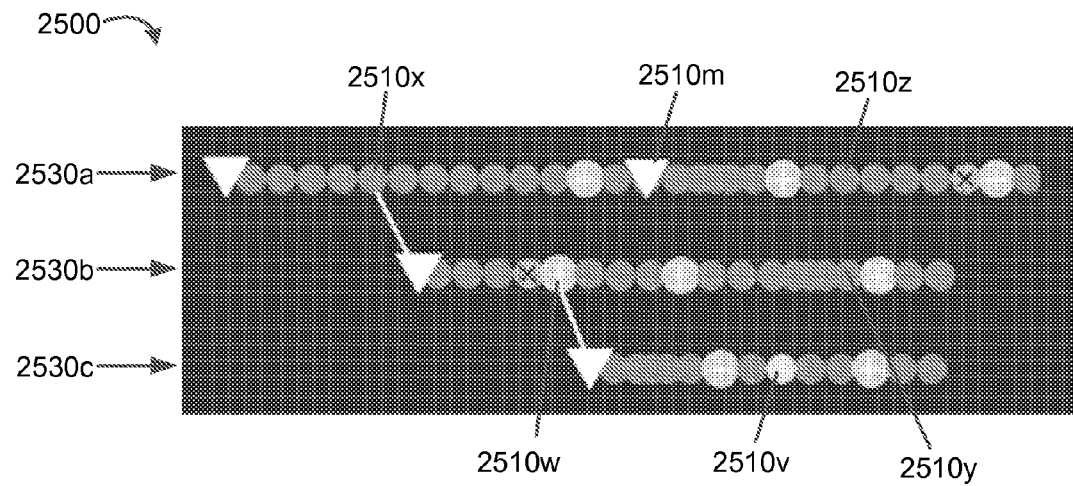
FIG. 25 is an example of a visual timeline having multiple branches in accordance with an example embodiment of the present disclosure.

Reference will now be made to FIG. 25 to illustrate one example of a method for changing application states by interacting with a visual timeline. FIG. 25 illustrates an example visual timeline 2500 having multiple levels of branching and including branches 2530*a*, 2530*b* and 2530*c*. When branches are involved, changing the application state from a first state to a second state may require a combination of reversing and applying actions (e.g., incremental changes). For example, if the current application state in the tool 800 corresponds to visual element 2510*v* on branch 2530*c*, and input to change the application state to the state corresponding to visual element 2510*y* on branch 2530*b*, the tool 800 reverses all the actions between 2510*v* and the start of the branch 2530*c* in the order in which actions (e.g., incremental changes) occurred. This results in generating the application state corresponding to visual element 2510*w* on branch 2530*b*. The tool 800 then performs all of the actions which occurred after the application state corresponding to visual element 2510*w* until the application state corresponding to visual element 2510*y* on branch 2530*b* is reached.

Similarly, if the current application state in the tool 800 corresponds to visual element 2510*v* on branch 2530*c*, and input to change the application state to the state corresponding to visual element 2510*z* on branch 2530*a*, the tool 800 reverses all the actions between 2510*v* and the start of the branch 2530*c* in the order in which actions (e.g., incremental changes) occurred. This results in generating the application state corresponding to visual element 2510*w* on branch 2530*b*. Next, the tool 800 reverses all the actions between 2510*w* and the start of the branch 2530*b* in the order in which actions occurred. This results in generating the application state corresponding to visual element 2510*x* on branch 2530*a*. The tool 800 then performs all of the actions which occurred after the application state corresponding to visual element 2510*x* in the order in which actions occurred until the application state corresponding to visual element 2510*z* on branch 2530*a* is reached.

The above-described example of a method for changing application states by interacting with a visual timeline applies a longest path approach (also known as tree traversal), which permits animation of previously application states. However, a shortest path approach may be used in other embodiments. In the shortest path approach, the application state is changed by starting from the most recent save point previous to the selected application state, and the actions (e.g., incremental changes) between this previous save point and the selected application state are applied in the order in which the changes occurred. For example, in the previous example in which the current application state in the tool 800 corresponds to visual element 2510*v* on branch 2530*c*, and input to change the application state to the state corresponding to visual element 2510*z* on branch 2530*a*, the tool 800 can restore the application state at save point corresponding to visual element 2510*m* and perform all the actions (e.g., incremental changes) which occurred after the application state corresponding to visual element 2510*m* in the order in which actions occurred until the application state corresponding to visual element 2510*z* on branch 2530*a* is reached. The shortest path approach to navigation, compared with the longest path approach (tree traversal), provides for faster switching between different application states.

Figure 26:
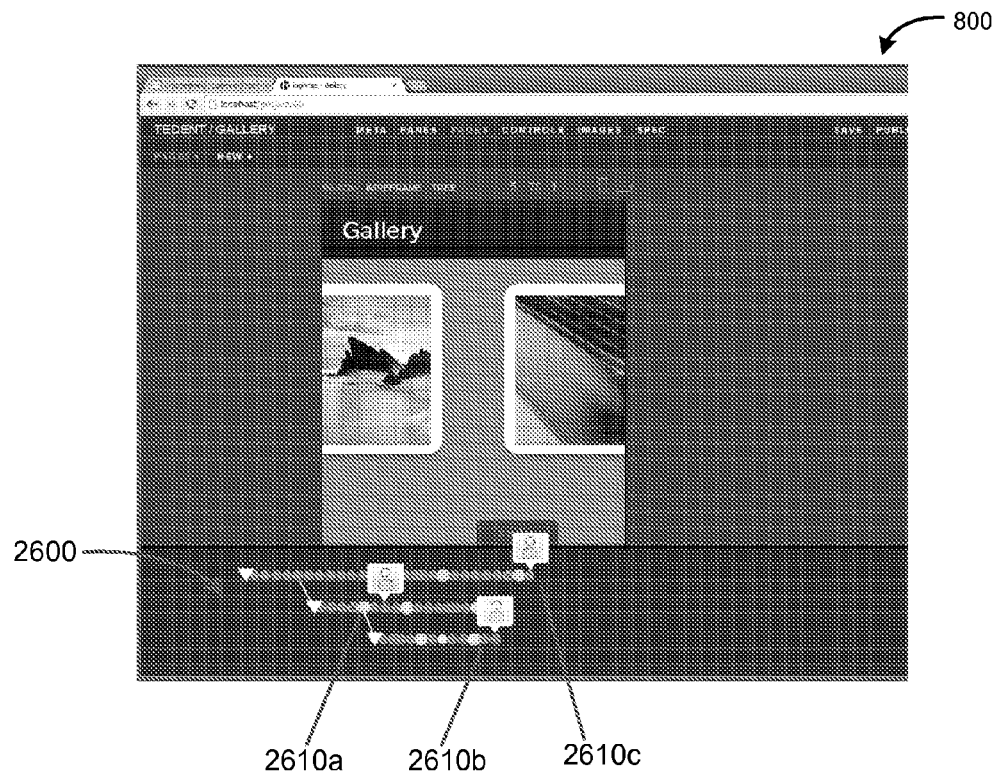
FIGS. 26 and 27 are example editor user interface screens having a visual timeline in accordance with example embodiments of the present disclosure.
Figure 27:
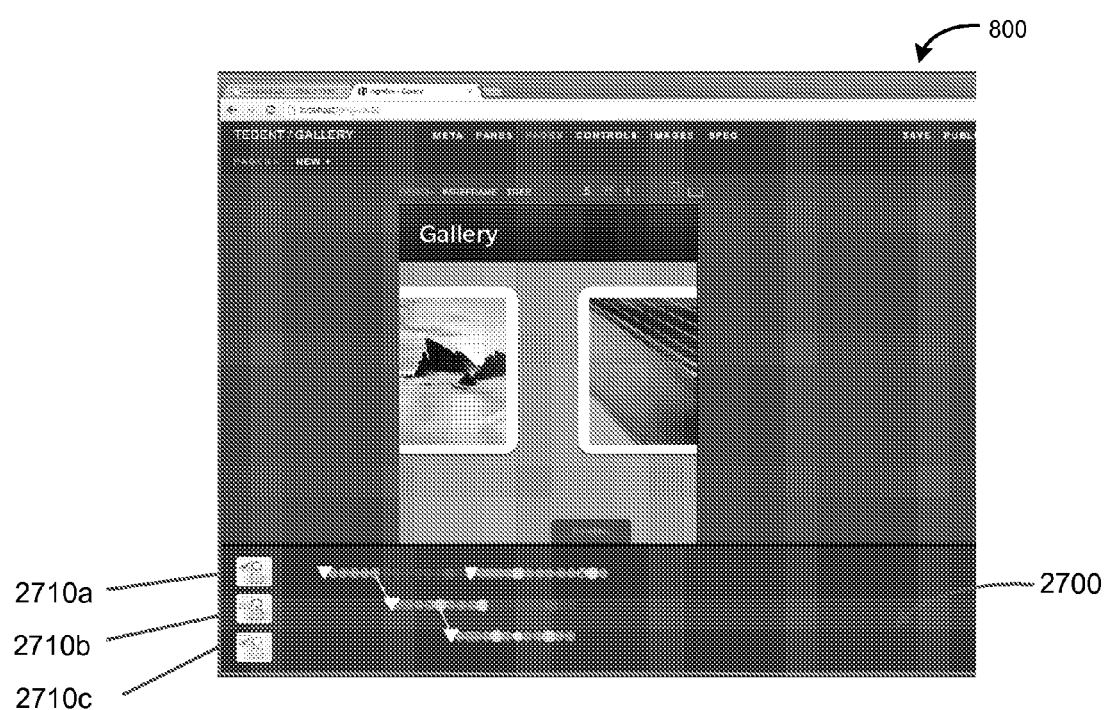

Referring now to FIGS. 26 and 27, examples of providing a visual representation of the users associated with actions (e.g., incremental changes) in a visual timeline will be described. When multiple users are collaborating on an application, the visual timeline can provide visual indicators for different users. In FIG. 26, the visual timeline 2600 provides visual indicators 2610*a*, 2610*b* and 2610*c* of which branch in the visual timeline 2600 each user is currently viewing or editing. In the shown example, each of the three users which are viewing or editing an application state on a different branch in the visual timeline 2600; however, multiple users could be viewing or editing an application state on the same branch in the visual timeline 2600, or possibly even the same application. The visual indicators can be icons, avatars, user pictures, user names, colors, or other suitable indicator which is unique to each user.

FIG. 27 shows another embodiment of a visual timeline 2700 in which a user (action) filter is provided. The user filter allows the actions of users collaborating on the application to be shown or hidden (partially or completely) in the visual timeline 2700. The user filter shown in FIG. 2700 includes a number of user tags which allow the actions of the users associated with the respective user tags to be toggled between a selected state and a deselected state. The user tags may comprise the visual indicators from FIG. 26, i.e. icons, avatars, user pictures, user names, colors, or other suitable indicator. In the shown example, of FIG. 27, the user tag includes a checkbox which is checked to select and therefore show the respective user's actions, and unchecked to deselected and hide the respective user's actions.

When a user tag is deselected, the visual elements in the visual timeline 2700 corresponding to the respective user are partially or completely hidden. The partial hiding of the visual elements may comprise dimming, greying-out or otherwise dehighlighting the visual elements relative to displayed visual elements. When a user tag is selected, the visual elements corresponding to that user are shown. When deselected visual elements are partially hidden as in FIG. 27, the shown visual elements are displayed, highlighted, or otherwise displayed more prominently than the dehighlighted visual elements. In the example visual timeline 2700 shown in FIG. 27, user tags 2710*a* and 2710*c* are selected whereas user tag 2710*b* is deselected. In the shown example, the visual elements corresponding to user tags 2710*a* and 2710*c* are displayed normally whereas the visual elements corresponding to user tag 2710*b* are displayed more dimly.

While not shown, in some embodiments the visual timeline of the present disclosure may display a visual indicator of the user who performed a particular action (e.g., incremental change) in response to the hovering of an onscreen selection indicator (e.g., pointer) over the particular action/change.

In some embodiments, deselecting a particular user's actions may act as input to reverse all actions performed by the particular user and thereby revert to a previous application state, and causing the rendering of that previous application state. When intervening actions were performed by other users, the intervening actions of the other users are reversed along with the actions of the particular user and in the order in which the actions occurred. The reversed actions of others may be reapplied from the previous application state at which no one of the particular user's actions are shown when there are no conflicts created by the absence of the particular user's actions. A notification may be displayed by the tool 800 indicating which users' actions have been reversed and/or which actions of other users could not be applied due to conflicts. For example, if user A adds a field, user B modifies that field, and the changes of user A are deselected, the change to the field made by user B cannot be re-applied since the relevant field no longer exists. In such instances, a notification may be displayed by the tool 800 that the change made by user B was not applied. The creation of this alternative application state caused by reversing all actions performed by the particular user, whether or not the actions of other users are re-applied, may create a new branch in the visual timeline. When the actions of other users are re-applied, a new series of visual elements corresponding to such actions may be created in the timeline. Other mechanisms for highlighting or resolving conflicts may be applied in other embodiments.

Figure 28:
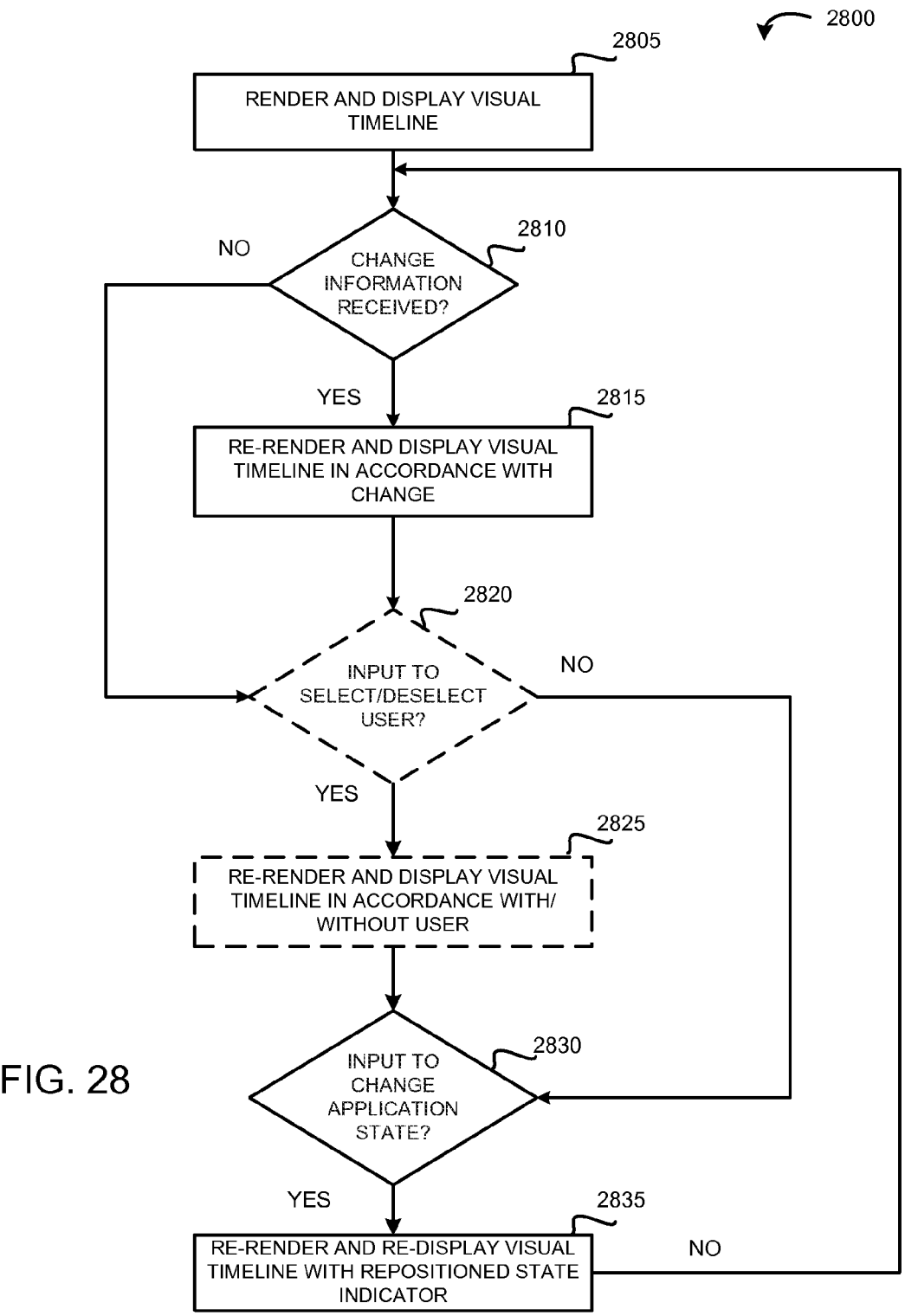
FIG. 28 is a flowchart illustrating method for interacting with a visual timeline of an application under development among two or more collaborating devices in accordance with one example embodiment of the present disclosure.

FIG. 28 is a flowchart illustrating an example method 2800 for interacting with a visual timeline of an application under development among two or more collaborating devices in accordance with one example embodiment of the present disclosure. The method 2800 may be carried out by software executed, for example, by a processor. Coding of software for carrying out such a method 2800 is within the scope of a person of ordinary skill in the art provided the present disclosure. The method 2800 may contain additional or fewer processes than shown and/or described, and may be performed in a different order. Computer-readable code executable by the processor 102 to perform the method 2800 may be stored in a computer-readable medium such as the memory of a server such as a memory of a host device. The method 2800 presumes that the tool 800 is running on a suitable computer 120 or the published application is running on the mobile device 130.

At event 2805, the tool 800 renders and displays a visual timeline comprising one or more visual elements each representing an action performed in respect of the application. Each action corresponds to a save point or an incremental change to the application. The visual elements are arranged in a chronological order in which the actions occurred in accordance with the timestamps of the actions (i.e., save point or incremental change) for the application. The visual timeline may be displayed in response to input received by the tool 800.

The visual timeline includes a state indicator indicating the current application state. The state indicator can be a visual element displayed within the visual timeline, or it can be displayed separately such as an arrow pointing to or otherwise highlighting a position in the visual timeline. Visual indicators of users who are currently viewing or editing the application, such as icons, avatars, user pictures, user names, colors, or other suitable indicator which is unique to each user, may be displayed to indicate the current state of the application that the respective user is viewing or editing (e.g., determined by the Active CML Document Switched change/action). The visual timeline may also include a user filter as described above.

At event 2810, the tool 800 detects change information received from the user and change information received from the ADS 110 from other collaborators. When change information is received, the visual timeline is re-rendered in accordance with the change and the re-rendered visual timeline is displayed (event 2815). The displayed application page within the editor user interface is also re-render and displayed when necessary (e.g., when the change information relates to the displayed application page) as described above.

At optional event 2820, the tool 800 detects input selecting and/or deselecting user actions to display in the visual timeline. When input selecting and/or deselecting user actions is received via the user filter, the visual timeline is re-rendered in accordance with the new set of user(s) and the re-rendered visual timeline is displayed (event 2825). As noted above, in some embodiments, this change may cause the application state to be change to reflect the application state without the changes made by a deselected user and/or with the changes made by a selected user who was previously unselected. The displayed application page within the editor user interface is also re-render and displayed when necessary (e.g., when the selected/deselected changes relate to the displayed application page) as described above.

At event 2830, the tool 800 detects input changing the current application state displayed with the editor user interface from a first state to a second state. As described, the input may be selecting a particular visual element from the visual timeline. When input changing the current application state is received, the visual timeline is re-rendered to reposition the state indicator in the visual timeline in association with the visual element representing the new application state (i.e., the second state). The re-rendered visual timeline is then displayed (event 2835). The displayed application page within the editor user interface is also re-rendered and displayed as described above.

The features of the visual timeline described above, while described separately in some instances, may be combined and performed together, and may be combined with the other methods and teachings of the present disclosure, including but not limited to the methods 1800, 1900, 2000 and 2100.

Figure 29A:
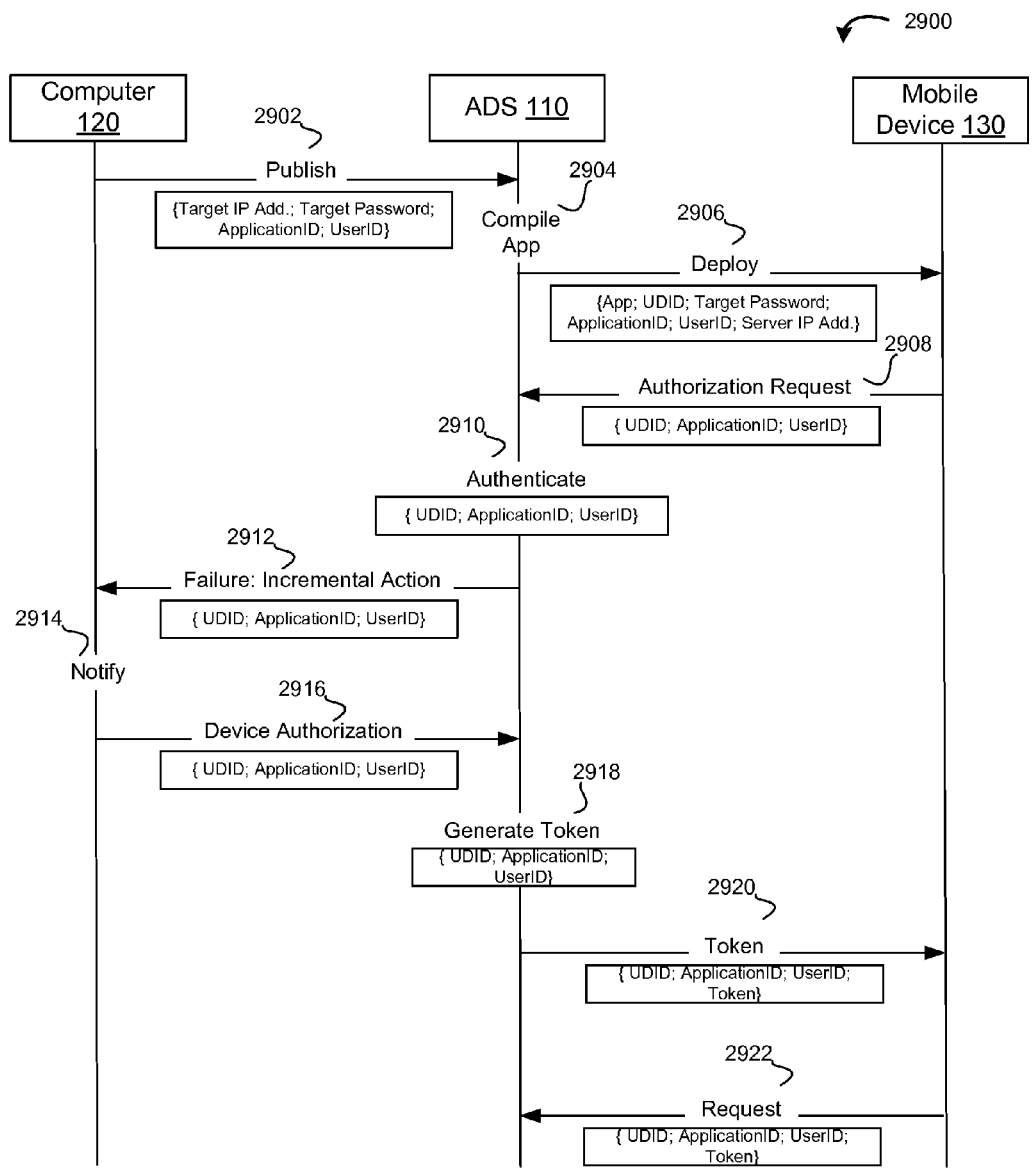
FIGS. 29A and 29B are flowcharts illustrating methods for connected device application deployment and authentication in accordance with example embodiments of the present disclosure.
Figure 29B:
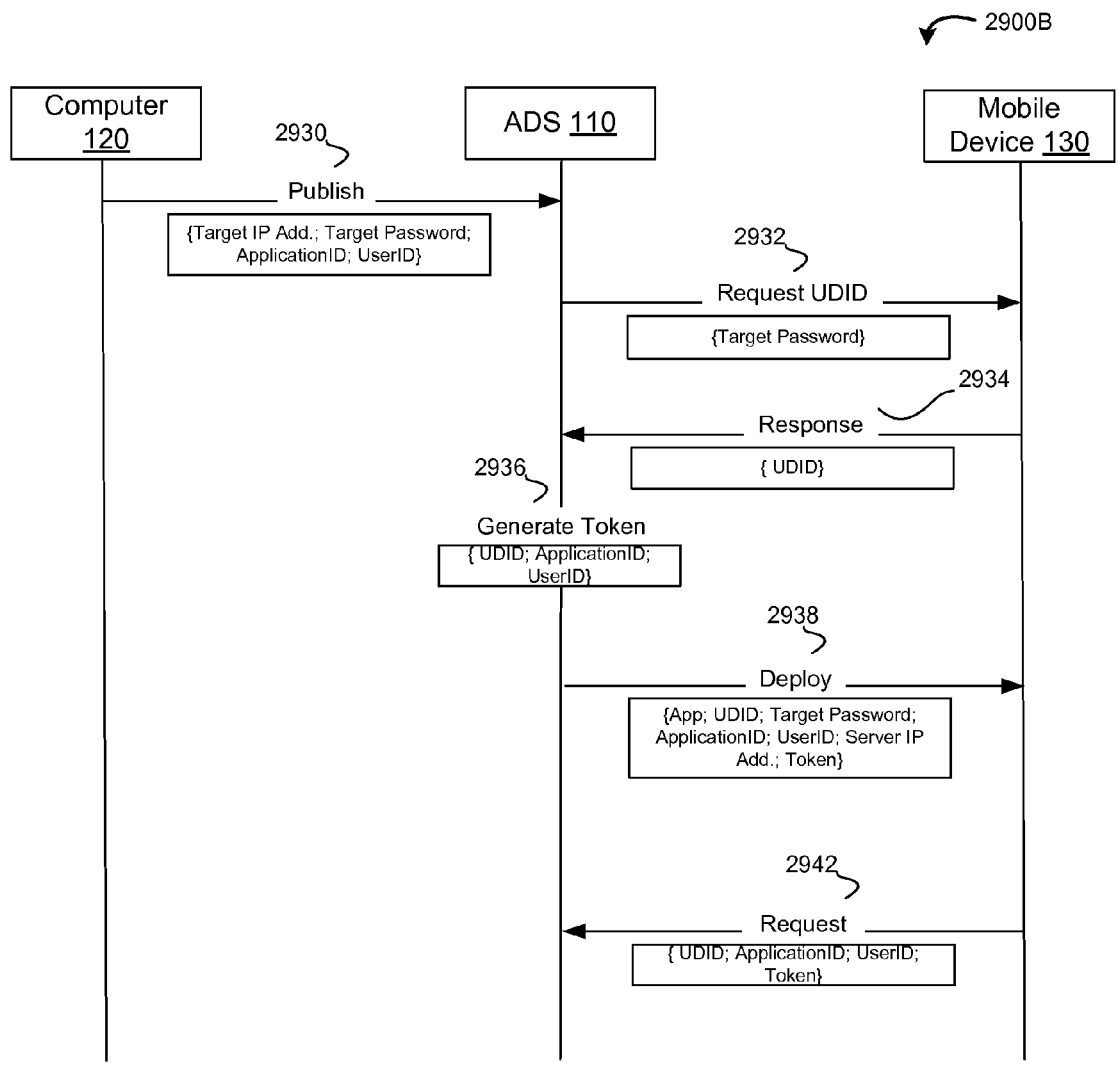
Figure 29C:
FIG. 29C is a user interface screen of a "Device Authorization Request" notification in accordance with one example embodiment of the present disclosure.

Deployment of an Application to a Mobile Device and Other Uses of a Connected Mobile Device The publication of an application under development to a mobile device 130 will now be described in more detail. When an application is published to a mobile device 130 from a computer 120 running the tool 800 and the mobile device 130 has a persistent connection (e.g., persistent HTTP or HTTPS connection) to the ADS 110, the mobile device 130 receives changes to the application from the ADS 110, and applies the changes to the application so that the current state of the application on the computer 120 is reflected. When the mobile device 130 does not have a persistent connection to the ADS 110, the mobile device 130 does not receives changes to the application from the ADS 110 but the user can still interact with the published application. As a preliminary step to publishing the application, the mobile device 130 may be authenticated by the ADS 110. Referring now to FIGS. 29A to 29C, the present disclosure provides a solution which provides improved device authentication compared with traditional approaches.

Reference is first made to FIG. 29A which illustrates a method 2900 for connected device application deployment and authentication in accordance with a first embodiment of the present disclosure. The method 2900 authorizes a mobile device 130, to which an application being viewed or edited using an instance of the tool 800 on a computer 120 is to be published, to communicate with the ADS 110. The mobile device 130 may communicate with the ADS 110 over a communication network such as the Internet using a short range wireless communication interface such as Wi-Fi.

The method 2900 may be carried out by software executed, for example, by a processor. Coding of software for carrying out such a method 2900 is within the scope of a person of ordinary skill in the art provided the present disclosure. The method 2900 may contain additional or fewer processes than shown and/or described, and may be performed in a different order. Computer-readable code executable by the processor 102 to perform the method 2900 may be stored in a computer-readable medium such as the memory of a server such as a memory of a host device. The method 2900 presumes that the tool 800 is running on a suitable computer 120.

At event 2902, the computer 120 generates a request to publish the application and sends the request to the ADS 110. The request may be generated in response in user input received by the computer 120 via the tool 800 such as, for example, clicking or otherwise selecting the publish button 872 (FIG. 8) in the editor user interface. In response to clicking or otherwise selecting the publish button 872, the user may be prompted for the IP address of the target device if this has not already been provided or is not otherwise known to the tool 800.

The publish request sent to the ADS 110 may include information identifying, including information identifying the application to be published (i.e., "ApplicationID"), the user associated with the instance of the tool 800 on the computer 120 "(i.e., UserID"), and the IP address of the target device—mobile device 130 (i.e., "TargetIPAddress"). Typically, the identifying information is provided in the form of identifiers such as those noted above. In some embodiments, for added security, the user may be prompted fora device password and a password matching the device password must be provided to allow the mobile device 130 and the ADS 110 to communicate with each other. Typically, the prompt occurs at the same time or is included in the prompt for the IP address described above.

At event 2904, in response to receiving the publish request the ADS 110 compiles the application in accordance with the QML stored by the ADS 110 as at the most recent save point of the application prior to the current state of the application displayed within the tool 800. The compiled application also includes C++ code for establishing the persistent connection between the mobile device 130 and the ADS 110, and for sending GET requests and receiving response to GET requests which include change information describing changes to the application.

At event 2906, the compiled application is deployed to the mobile device 130. When deploying the application, the ADS 110 will send the compiled application to the mobile device 130 along with an IP Address or URI associated with the ADS 110, along with the identifying information provided by the computer 120, including the "ApplicationID", the "UserID" and the "TargetIPAddress". Thus, the application is downloaded onto the mobile device 130. Typically, the application is automatically started or launched on the mobile device 13 and the persistent connection with the ADS 110 is established using the IP address of the ADS 110 and the IP address of the mobile device 130.

At event 2908, the mobile device 130 sends an authorization request to the ADS 110. The authorization request 2908 includes the "ApplicationID", the "UserID" and additionally a unique device ID (UDID) associated with the mobile device 130. The UDID, in some embodiment, is a hexadecimal 8 digit Personal Identification Number (PIN). The authorization request is intended to authorize the mobile device 130 associated with the UDID to access the application (identified by the "ApplicationID"). The UserID is used to confirm that the user associated with the mobile device 130 is authorized to access the application identified in the request. When authorized, access to the particular mobile device 130 is granted only to the particular application identified by the "ApplicationID".

At event 2910, the ADS 110 receives the authorization request and looks up the provided UserID in the memory 114 to check for an association matching between the UserID, ApplicationID and UDID. This may comprise, for example, checking for an authentication token associated with the parameters of the authorization request.

At event 2912, if there is no matching association, for example, because this is the first authentication for the parameters of the authorization request, no token is found and the authentication will fail. The ADS 110 blocks the incoming request from the mobile device 130 until authorization (or denial) is given. The ADS 110 also publishes a "Failure: Incremental Action" message addressed to the particular UserID.

At event 2914, the computer 120 receives the "Failure: Incremental Action" message which causes the computer 120 to display a "Device Authorization Request" notification 2966 to the user, as shown in FIG. 29C. The notification 2966 will identify the mobile device 130 to the user associated with the "UserID" using the UDID shown using the reference 2960 in FIG. 29C. The notification will prompt the user to Authorize 2962 or to Deny 2964 the authorization request.

At event 2916, a "Device Authorization" message is sent to the ADS 110 when user input to authorize the mobile device 130 is received. The "Device Authorization" message includes the "UserID", the "ApplicationID" and UDID for use in authentication. While not shown, a "Device Denial" message is sent to the ADS 110 when user input to deny the mobile device 130 is received in which case the method 2900 ends.

At event 2918, the ADS 110 uses the "UserID", the "ApplicationID" and UDID to generate a token for the mobile device 130 to access the application associated with the "ApplicationID". The token stores an association between the "UserID", the "ApplicationID" and UDID for use in authentication.

At event 2920, the token is sent to the mobile device 130. The token can be used by the mobile device 130 for future communications with the ADS 110 in association with the particular UserID and ApplicationID. The token can be stored in the memory 320 of the mobile device 130 and the memory 114 of the ADS 110 for future requests. The token can be used by the mobile device 130 for future communications with the ADS 110 in association with the particular UserID and ApplicationID. The token can be used by the mobile device 130 to send GET requests to the ADS 110 to obtain change information for the application as needed.

For added security, the token may expire after a predetermined period of time or after the user associated with the token logs out and closes the communication session between the computer 120 and the ADS 110. When the token is valid, the mobile device 130 can send GET requests to the ADS 110 to receive changes to the deployed (published) application.

At 2922, the mobile device 130 sends a request to the ADS 110 for any subsequent change made to the application made by the user associated with the user identifier UserID, the request includes the token comprising the association between the "UserID", the "ApplicationID" and the UDID. The request may be, for example, a GET request. When the ADS 110 receives the GET request, the ADS 110 will send the mobile device 130 the subsequent change to the application made by the user UserID. When the change information is received by the mobile device 130, the mobile device 130 applies the change(s) to the rendered application (e.g., using Cascades™ APIs) and client sends a new GET request to the ADS 110.

When the instance of the tool 800 is terminated on the computer 120, the user associated with the UserID ends their session (e.g., logs out) or the session expires, the ADS 110 deletes all tokens, thereby blocking any mobile devices 130 which were previously authorized from receiving changes to applications. It is believed that this may decrease the likelihood of brute force attacks against the ADS 110 by limiting the amount of time a given token will be valid.

In a second embodiment, distributed installation may be used. The distributed installation is similar to the method 2900 except that the user downloads the compiled application and an installation script from the ADS 110 on to the client computer 120. The installation script installs the application on to the mobile device 130 from the client computer 120. The IP address or URL of the ADS 110, ApplicationID, and UserID are provided with the downloaded application.

Reference is next made to FIG. 29B which illustrates a method 2900B for connected device application deployment and authentication in accordance with a third example embodiment of the present disclosure. The method 2900B authorizes a mobile device 130, to which an application being viewed or edited using an instance of the tool 800 on a computer 120 is to be published, to communicate with the ADS 110. The mobile device 130 may communicate with the ADS 110 over a communication network such as the Internet using a short range wireless communication interface such as Wi-Fi.

In the third example embodiment of FIG. 29B, the mobile device 130 is pre-authorized to communicate with the ADS 110 to further simply the application deployment and authentication process. The ADS 110 is authorized by the user to generate a token for the mobile device 130 without specifically requesting permission to do so from the user.

The method 2900B may be carried out by software executed, for example, by a processor. Coding of software for carrying out such a method 2900B is within the scope of a person of ordinary skill in the art provided the present disclosure. The method 2900B may contain additional or fewer processes than shown and/or described, and may be performed in a different order. Computer-readable code executable by the processor 102 to perform the method 2900B may be stored in a computer-readable medium such as a memory of a host device. The method 2900B presumes that the tool 800 is running on a suitable computer 120.

At 2930, the computer 120 generates a request to publish the application and sends the request to the ADS 110. The request may be generated in response in user input received by the computer 120 via the tool 800 such as, for example, clicking or otherwise selecting the publish button 872 (FIG. 8) in the editor user interface. The publish request include identifying information, including the "ApplicationID", the "UserID" and the "TargetIPAddress" and possibly Device Password as in event 2902 in the method 2900B.

At event 2932, the ADS 110 in response to receiving the publish request sends a request, and the device password if needed, to the mobile device 130 requesting the UDID associated with the mobile device 130. At event 2934, the mobile device 130 returns the UDID to the ADS 110. When the device password is provided, the mobile device 130 returns the UDID only when the provided device password matches the device target device password.

At event 2936, the ADS 110 generates a token for the mobile device 130 to access the application associated with the "ApplicationID". The token stores an association between the "UserID", the "ApplicationID" and UDID for use in authentication.

At event 2938, the ADS 110 compiles the application in accordance with the QML stored by the ADS 110 as at the most recent save point of the application prior to the current state of the application displayed within the tool 800, and sends the compiled application and the generated token to the mobile device 130. The token can be stored in the memory 320 of the mobile device 130 and the memory 114 of the ADS 110 for future requests. The token can be used by the mobile device 130 for future communications with the ADS 110 in association with the particular UserID and ApplicationID. The token can be used by the mobile device 130 to send GET requests to the ADS 110 to obtain change information for the application as needed.

For added security, the token may expire after a predetermined period of time or after the user associated with the token logs out and closes the communication session between the computer 120 and the ADS 110. When the token is valid, the mobile device 130 can send GET requests to the ADS 110 to receive changes to the deployed (published) application.

Typically, the application is automatically started or launched on the mobile device 13 and the persistent connection with the ADS 110 is established using the IP address of the ADS 110 and the IP address of the mobile device 130.

At 2942, the mobile device 130 sends a request to the ADS 110 to information associated with the application, the request including the token, the "UserID", the "ApplicationID" and the UDID. When the instance of the tool 800 is terminated on the computer 120, the user associated with the UserID ends their session (e.g., logs out) or the session expires, the ADS 110 deletes all tokens, thereby blocking any mobile devices 130 which were previously authorized from receiving changes to applications. It is believe that this may decrease the likelihood of brute force attacks against the ADS 110 by limiting the amount of time a given token will be valid.

In a further embodiment, the token could be generated on the computer 120 and sent to directly the mobile device 130 via wired (e.g., USB) or wireless connection.

The above-described methods allow a target device associated with a particular user running an instance of the tool 800 to be authenticated for receiving changes to the application being viewed or edited using the instance of the tool 800 on a computer. The application state can be synchronized between the target device and computer 120 even while it is held remotely, for example, when the target device not in direct communication with the computer 120. The target device can be synchronized indirectly via an intermediate communication network such as the Internet. Advantageously, the authentication process is performed only once for a particular communication session. Once authenticated, the target device is able to access changes to the application code until the communication session is terminated or expires.

As described elsewhere in the present disclosure, after the application is deployed, incremental changes which have occurred subsequent to the most recent save point of the application are sent to the mobile device 130 and applied by the mobile device 130, for example, using, for example, Cascades™ APIs on the mobile device 130. Once the incremental changes have been applied, the published application on the mobile device 130 should have the same or substantially similar appearance to the application currently displayed in the editor user interface of the tool 800. As further incremental changes occur, the changes are sent to the mobile device 130 and applied by the mobile device 130 to keep the version of the application on the mobile device 130 in sync with the version on the computer 120 in real-time or near real-time.

Figure 30:
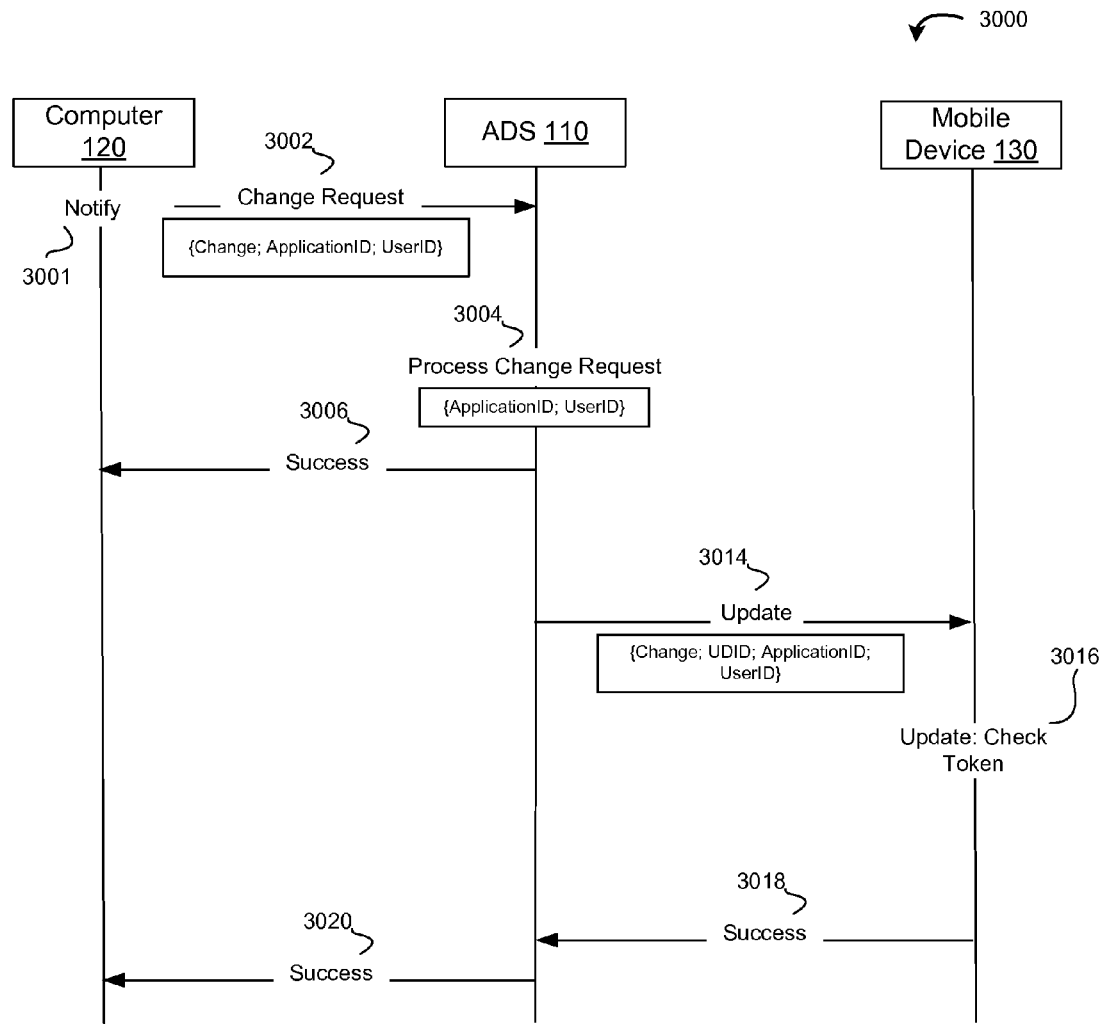
FIG. 30 is a flowchart illustrating a method for reverting to a previous application state on a mobile device on which the application has been published in accordance with one example embodiment of the present disclosure.

The tool 800 provides an interface for a (Web-based) server collaborative development environment which allows multiple users to collaborate on an application at the same time and also publish the application to a live device in real-time or near real-time. Any changes to the application are sent to the ADS 110 which distributes the changes amongst all connected users and/or devices. As noted above, it is sometimes desirable to revert to a previous application state, for example, to undo changes to the application. The present disclosure allows the application state to be reverted to a previous application state, i.e., to rewind/undo changes to the application, on the on the computer 120 as well as on a particular mobile device 130 on which the application has been published. However, in some instances it is desirable to hide undo actions and other actions which change the application state to a previous application state so that other users and devices do not see and are not affected by such actions. Reference is now made to FIG. 30 which illustrates a method 3000 for reverting to a previous application state on remote device, such as a mobile device 130, on which the application has been published in accordance with one example embodiment of the present disclosure.

The method 3000 authorizes a mobile device 130, to which an application being viewed or edited using an instance of the tool 800 on a computer 120 is to be published, to communicate with the ADS 110. The mobile device 130 may communicate with the ADS 110 over a communication network such as the Internet using a short range wireless communication interface such as Wi-Fi. In the second embodiment, the mobile device 130 is pre-authorized to communicate with the ADS 110 to further simply the application deployment and authentication process. The ADS 110 is authorized by the user to generate a token for the mobile device 130 without specifically requesting permission to do so from the user.

The method 3000 may be carried out by software executed, for example, by a processor. Coding of software for carrying out such a method 3000 is within the scope of a person of ordinary skill in the art provided the present disclosure. The method 3000 may contain additional or fewer processes than shown and/or described, and may be performed in a different order. Computer-readable code executable by the processor 102 to perform the method 3000 may be stored in a computer-readable medium such as a memory of a host device.

The method 3000 presumes that the tool 800 is running on a suitable computer 120. Following authentication of the mobile device 130 and connected device application deployment, for example in accordance with the method 2900 or 2900B described above, the ADS 110 is configured to communicate to the mobile device 130 having the particular UDID changes to the application state specified by the "ApplicationID" within the instance of the tool 800 on the computer 120 to which the user of the computer 120 having the particular "UserID is connected. This configuration remains so long as the user of the computer 120 having the particular "UserID" remains connected to the ADS 110.

The method 3000 presumes that the token which authorizes the mobile device 130 has already been generated and is present on the mobile device 130 and the ADS 110, the application is running on the mobile device 130, and the mobile device 130 has sent a GET request to the ADS 110 using the native code of the application.

At event 3001, the user identified by "UserID" makes a change to the application identified by "ApplicationID" which reverts the application to a previous application state, for example by selecting an earlier visual element on a visual timeline or selecting an undo action from a toolbar provided by editor user interface of the tool 800.

At event 3002, a change request along with the identifying information of the "UserID" and the UDID of the mobile device 130 to which the application has been published is sent to the ADS 110. If the application had not been published to a mobile device 130, a UDID would not be provided by the tool 800.

At event 3004, the ADS 110 receives the change request, associates the change with the identified application, user and device (i.e., by ApplicationID, UserID, and UDID), stores the change information associated with the change in memory 114, and sends a success message to the computer 120 at event 3006. It will be appreciated that multiple users are able to send change requests to the ADS 110. Each change is associated with a particular application and user, and device when the application has been published to a mobile device 130. Therefore, if a particular user wishes to reverse the changes associated with the changes that particular user made at a later time, they are able to.

At event 3014, the ADS 110 sends an "Update" request to the mobile device 130, including the change information describing the change. The UDID of the mobile device 130, the "ApplicationID" and the "UserID" are typically also provided.

At optional event 3016, a check may be performed to ensure that the identifying information associated with the "Update" request matches a token on the mobile device 130. When the identifying information matches a token on the mobile device 130, the change is applied to the published application on the mobile device 130 using, for example, Cascades™ APIs. When the identifying information does not match a token on the mobile device 130, the change is rejected. Optionally, in some examples the mobile device 130 will confirm that the token has not expired. The mobile device 130 may also check to confirm that the user identifier provided with the "Update" request matches the UserID associated with the client computer 120 from which the application was published or otherwise installed. If the UserID does not match (not shown), the change is not been applied by the mobile device 130 and a failure message is sent from the mobile device 130 to the ADS 110.

At event 3018, a success message is sent from the mobile device 130 to the ADS 110 when the change has been applied by the mobile device 130.

At event 3020, a success message is sent from the ADS 110 to the computer 120 when the success message is received by the ADS 110 from the mobile device 130.

In the described embodiment, messages are targeted towards the specific mobile device 130 associated with the UserID; however, in other embodiments the messages could be sent to all devices get all changes of this type and only devices having the matching identifying information apply the changes. The use of the UserID and UDID allows the ADS 110 to enforce restrictions on particular users and devices are allowed to see or do. For example, when an instance of the editor user interface on a computer 120 requests undo/rewind actions, the ADS 110 can send incremental changes to a specific user and mobile device 130. If the changes are sent to all users and devices, the changes will be ignored by other instances of the tool 800 and other devices which not have matching identifying information, and therefore will only be processed by a client computer 120 having the matching UserID and the mobile device 130 having the matching UserID and UDID association.

When developing an application, a target mobile device is often used for testing. Traditionally, developers write code, compile the code to generate an executable application, deploy the application, and test the deployed application. However, developers are sometimes limited to working on a laptop or desktop computer that has limited input capabilities compared to the target mobile device. For example, a laptop or desktop computer may not have a camera, or if a laptop or desktop computer has a camera, it is not as mobile as that of a phone or tablet computer. As another example, a laptop or desktop computer may not have a microphone or other sensor type input devices now commonly found on a phone or tablet computer. It would be desirable to be able to capture images, sounds and/or data and information using the sensors of the target mobile device 130 for use in the application being developed. The present disclosure improves on the process of switching, data capture, and data consumption from a connected mobile device 130.

Figure 31:
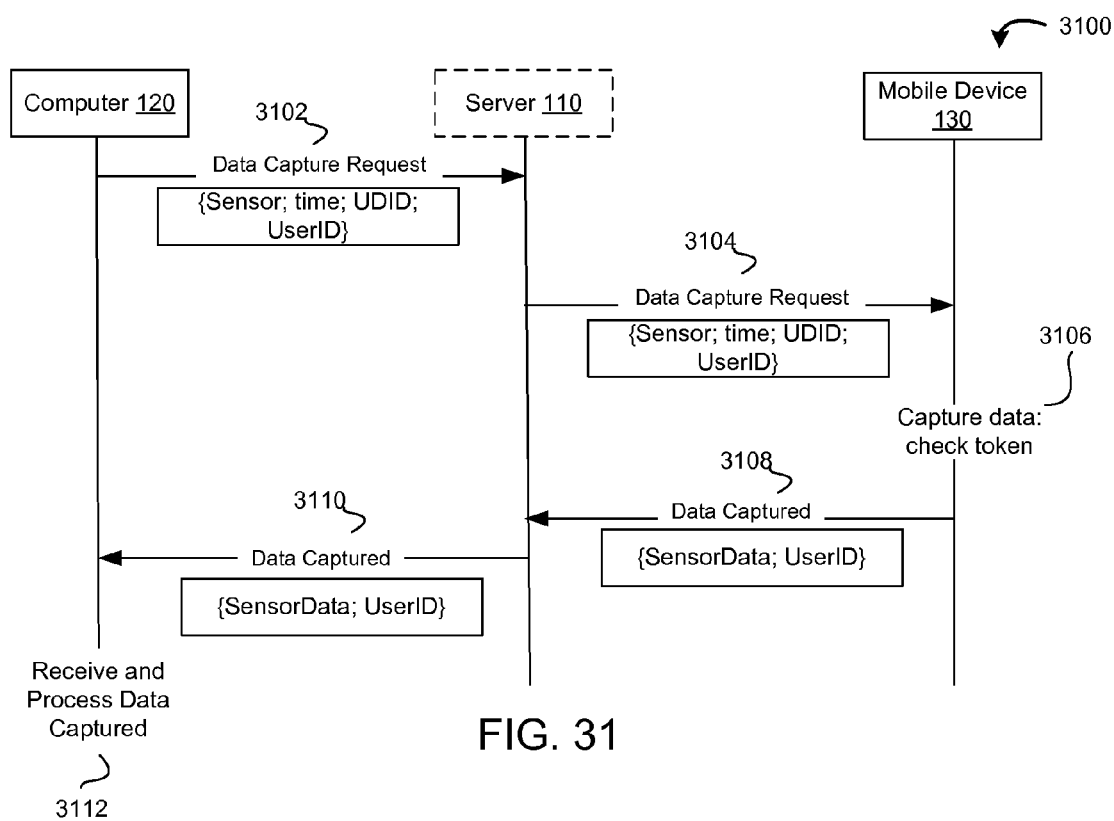
FIG. 31 is a flowchart illustrating a method using a mobile device as preview and input capture source in accordance with one example embodiment of the present disclosure.
Figure 32:
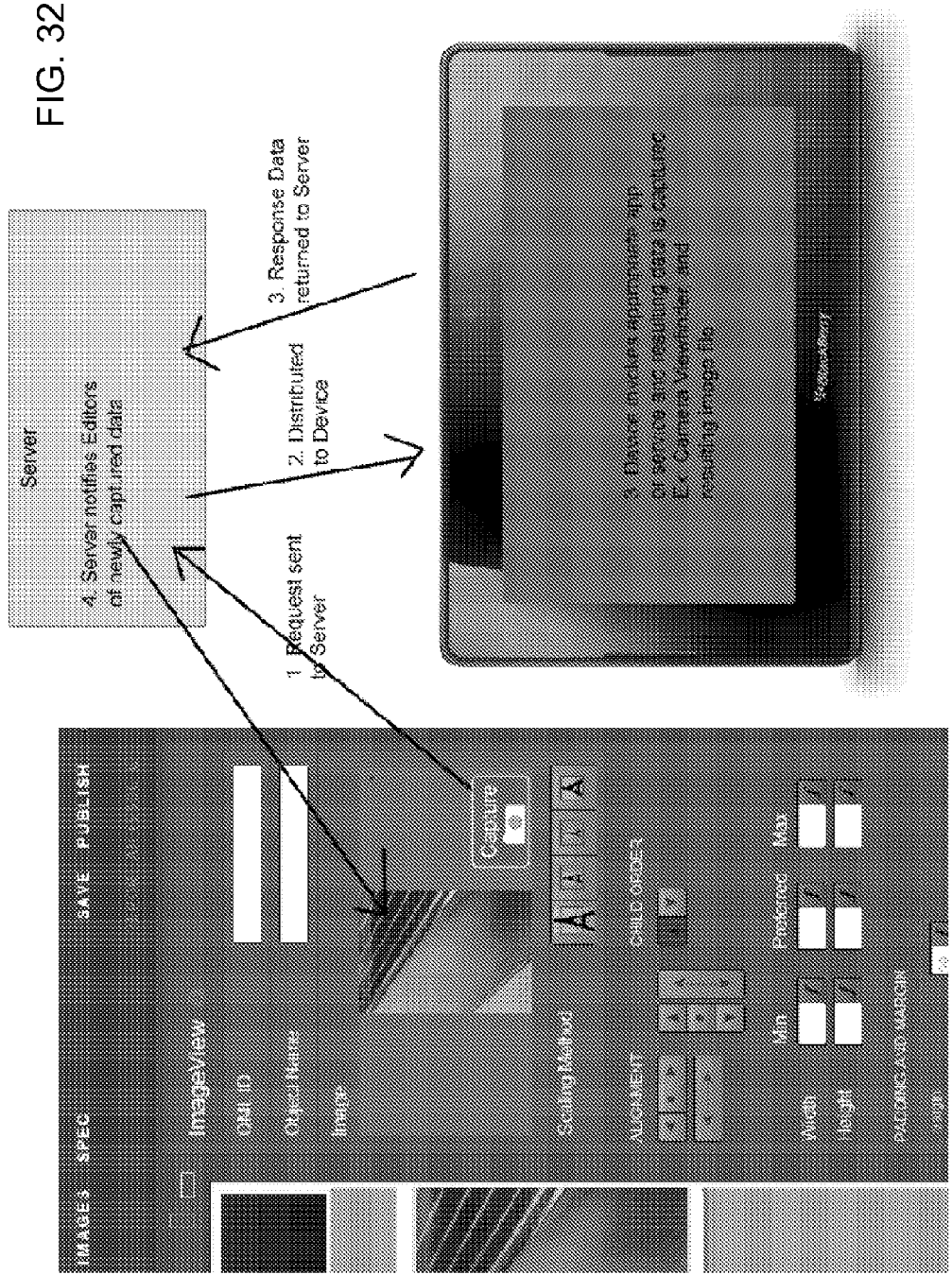
FIG. 32 is a schematic representation of a mobile device, server and computer communicating or the purpose of capturing data on the mobile device for use by an instance of the application development tool on the computer in accordance with one example embodiment of the present disclosure.

Reference is now made to FIGS. 31 and 32. FIG. 31 illustrates a method 3100 for using a remote device, such as a mobile device 130, as preview and input capture source in accordance with one example embodiment of the present disclosure. The method 3100 may be carried out by software executed, for example, by a processor. Coding of software for carrying out such a method 3100 is within the scope of a person of ordinary skill in the art provided the present disclosure. The method 3100 may contain additional or fewer processes than shown and/or described, and may be performed in a different order. Computer-readable code executable by the processor 102 to perform the method 3100 may be stored in a computer-readable medium such as a memory of a host device.

The method 3100 captures data from a target mobile device 130, for example, allowing an application developer using a computer 120 to capture data for use in the application using a sensor of the mobile device 130. The sensor may be a proximity sensor 374, GPS 372, orientation sensor 368, microphone 358, camper 354, or any other sensor. Because data is collected from mobile device 130, it can be customized for use in an application having the same device configuration as the connected mobile device 130, or for development purposes of an application targeted for mobile device 130. Traditionally, a computer 120 does not have such an array of sensors available to it. Furthermore, the mobile device 130 may be accessible to the computer 120 over a network via the ADS 110, such as the example network environment of FIG. 1, or may be directly accessible using a wired or wireless connection between the computer 120 and the mobile device 130.

The method 3100 presumes that the tool 800 is running on a suitable computer 120, a mobile device 130 has been authentication to communicate with the ADS 110, and that the application has been published to the mobile device 130. At event 3102, a user identified by "UserID" on the computer 120 accessing the tool 800 sends a "Data Capture Request" to the ADS 110 to capture data from a particular sensor of the mobile device 130 identified by UDID. The "Data Capture Request" is sent in response to use input received via the tool 800, such as clicking or otherwise selecting a corresponding button in tool 800, for example, in the Metadata user interface screen (FIGS. 9A-9D).

At event 3104, the "Data Capture Request" is sent from the ADS 110 to the mobile device 130. Alternatively, the "Data Capture Request" could be sent directly from the computer 120 to the mobile device 130 (not shown). The "Data Capture Request" may include the sensor name, the time period for collecting the data, the UDID associated with the mobile device 130 and the "UserID" associated with the user associated with the instance of the tool 800 which sent the "Data Capture Request".

At event 3106, a check is performed to ensure that the identifying information associated with the "Data Capture Request" matches a token on the mobile device 130. When the identifying information, i.e., if the UDID and the "UserID", matches a token on the mobile device 130, the mobile device 130 captures the sensor data requested using the identified sensor. When the identifying information does not match a token on the mobile device 130, the requested is rejected. Optionally, in some examples the mobile device 130 will confirm that the token has not expired. The mobile device 130 may also check to confirm that the user identifier matches the UserID associated with the client computer 120 from which the application was published or otherwise installed.

In some examples, capturing (or acquiring) the sensor data requested using the identified sensor comprises the mobile device 130 invoking (starting) an appropriate application or service (i.e., data capture application or other application). The mobile device 130 sends a GET request to the ADS 110 and invokes any appropriate sensor listeners and the waits or collects the requested data. The captured sensor data is stored at least temporality in the memory 320 of the mobile device 130. The type of data captured from the target device varies and may or may not involve user interaction.

At 3108, the captured sensor data is sent from the mobile device 130 to the ADS 110 as a change request. The sensor data may be stored by the ADS 110 in memory depending on the type of sensor data.

At 3110, the captured sensor data is sent from the ADS 110 to the computer 120 having the instance of the tool 800 associated with the user "UserID". The client computer 120 requests the sensor data using a GET request like other changes to the application. A request ID or the like may be used to allow the client computer 120 to match requests and responses.

In some embodiments, the sensor data may be captured for a period of time specified in the "Data Capture Request" and then sent to the computer 120 and the end of the period of time specified in the "Data Capture Request", or the sensor data may be captured for a smaller interval and sent to the computer 120 in batches over the period of time specified in the "Data Capture Request". The interval for sending data may also be specified in the "Data Capture Request".

At event 3112, the tool 800 and uses the captured sensor data. For example, the editor user interface of the tool 800 receives and applies the captured sensor data. For example, an image captured on the mobile device 130 is displayed on the display of the computer 120.

Alternatively, in other embodiments the ADS 110 stores the sensor data as an incremental change, and sends the sensor date to all collaborating devices currently accessing the application.

When deploying an application onto a target mobile device 130 using the collaborative application development environment of the present disclosure, changes in the application state in the editor user interface of the tool 800 are reflected in the published application deployed onto the target mobile device 130 so that the tool 800 and the mobile device 130 represent the same application state. However, in some instances a change to the application state in the editor user interface of the tool 800 may occur in a portion of the user interface (UI) of the published application which is not currently displayed on the mobile device 130. These user interface portions may be a page other than the displayed page on the mobile device 130 or a composite control.

As described elsewhere in the present disclosure, in some embodiments the mobile device 130 is configured to permit one or more types of changes to the application, such as changing the page of the application which is displayed. Changes made to the application within the tool 800 are propagated to the connected mobile device 130; however, the changes made to the application on the connected mobile device 130 may or may not be propagated to the connected mobile device 130 depending on the embodiment. For example, if the displayed page of the application is changed on the mobile device 130, in some embodiments the displayed page of the application is also changed on the computer 120 so that the displayed page of the application within the tool 800 reflects that the shown on the mobile device 130. This allows both the computer 120 and the mobile device 130 to show the same content (e.g., the same display page in this example) irrespective of which device requested the change. Alternatively, in other embodiments the displayed page of the application is not changed on the computer 120 so that the displayed page of the application within the tool 800 is different than that the shown on the mobile device 130. Whether the changes on the mobile device 130 are propagated to the computer 120 could depend on the type of change, an option within the tool 800, or both.

When an application is deployed to a mobile device 130 via the tool 800 and a change occurs to a portion of the user interface that is not visible, user interface has the ability to automatically retrieve the current application state from the ADS 110 when the changed UI portions is displayed on the mobile device 130. The portions of the UI which are not currently visible on the mobile device 130 are in some respects transient in nature. When the portions of the UI which were not previously visible become visible on the mobile device 130, for example, the changed page or composite control is shown on the mobile device 130, the mobile device 130 can request the current versions of these UI portions visible since UI portions are loadable by the mobile device 130 on-demand. An example of a suitable method is the method 1900 of FIG. 19 describe above.

Since UI portions are loadable, this allows the mobile device 130 to optimize memory use while there is a persistent connection between the ADS 110 and the mobile device 130 by reclaiming the memory required to load the UI portions not visible The present disclosure also provides a method for the automatic reflection of physical device properties in the editor user interface or other user interface of the tool 800. Traditionally, application development environments are tailor to simulate a target device as closely as possible. This is typically accomplished by including visual assets that match the physical dimensions and features of the target device as part of the development environment. The onus is usually on the software developer to manually select the device(s) being targeting when developing an application. The tool 800 provides the ability to retrieve information about the target device including the physical screen dimensions, keyboard (yes/no), screen resolution, screen dots-per-inch, device orientation, current and/or supported screen orientations, and application icon resolution. Advantageously, this information can be retrieved early in the deployment process.

The tool 800 automatically adapts the application state based on the target device in currently connected to the computer. For example, if the target device is switched from one type of device (e.g., phone) to another type of device (e.g., a tablet), the tool 800 has the ability to automatically detect the device switch and the properties of the new target device, and reflect the properties of the new device in the editor user interface. This obviates the need for the developer to perform any manual selections to switch target devices.

The tool 800 may also automatically adapt its interface to accurately display aspects of the target device, for example within the editor user interface and metadata user interface screen, such as the physical screen dimensions, using the information retrieved about the target device. For example, the tool 800 can calculate the dots-per-inch ratio between the target device 130 and the display of the computer 120 on which the tool 800 is running, and use this ratio to provide a rendering of the application with the editor user interface which accurately reflects how the visual content will appear on the target device. The tool 800 can also use the physical screen dimensions to automatically adapt the aspect ratio of the application pages in real-time or near real-time based on the target device so that the application displayed in the editor user interface accurately reflects how the visual content will appear on the target device.

Furthermore, the tool 800 can listen for target device rotations and update the orientation of the application displayed in the editor user interface in real-time or near real-time based on the state of the target device. Page switches within the application on the target device are also reflected in real-time or near real-time within the editor user interface.

Figure 33:
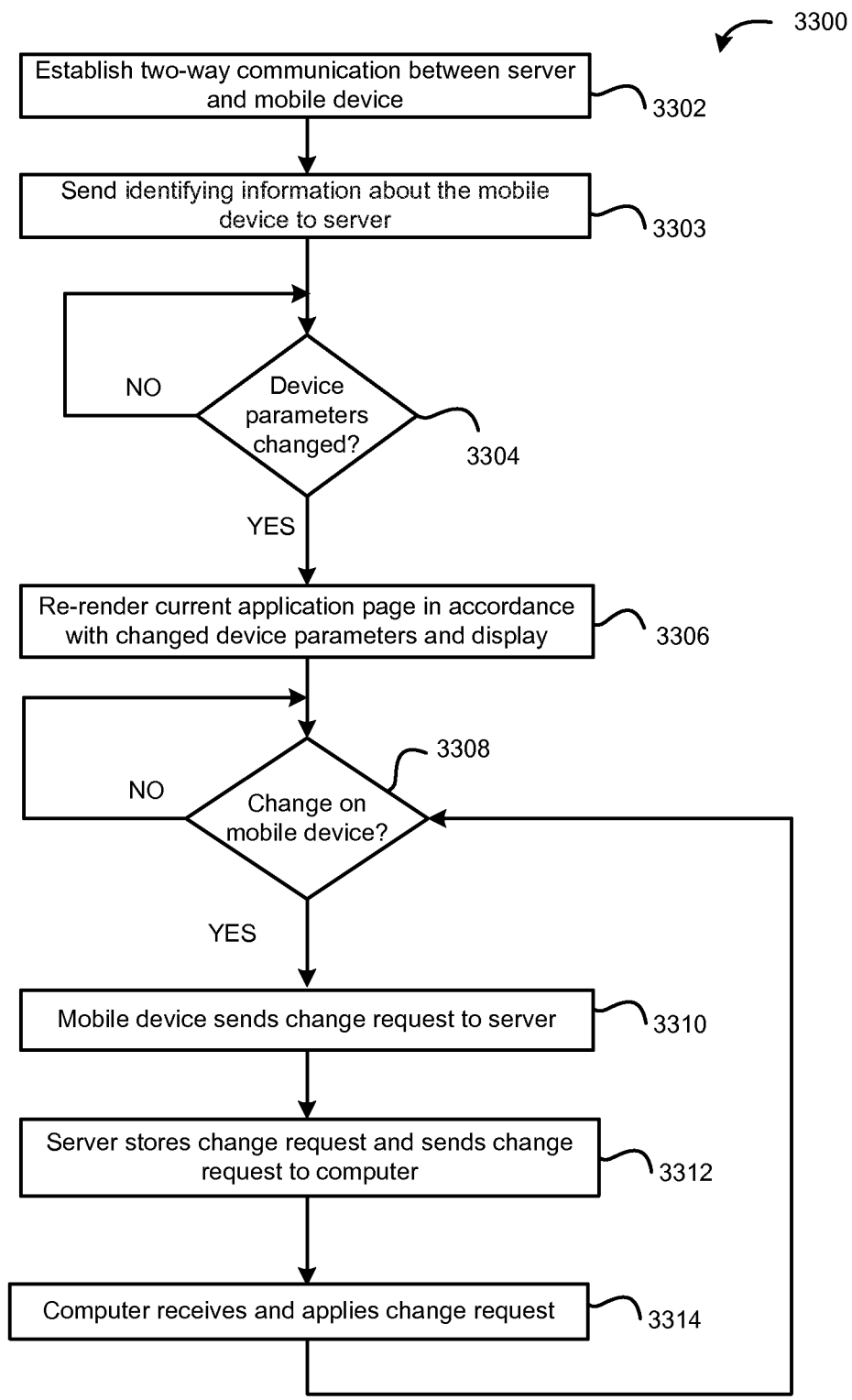
FIG. 33 is a flowchart illustrating a method for the automatic reflection of physical device properties of a mobile device in a user interface of the application development tool in accordance with one example embodiment of the present disclosure.

FIG. 33 illustrates a method 3300 for the automatic reflection of physical device properties of a remote device, such as a mobile device 130, in a user interface of an application development tool, such as the tool 800, executed on a computer 120 in accordance with one example embodiment of the present disclosure. The method 3300 may be carried out by software executed, for example, by a processor. Coding of software for carrying out such a method 3300 is within the scope of a person of ordinary skill in the art provided the present disclosure. The method 3300 may contain additional or fewer processes than shown and/or described, and may be performed in a different order. Computer-readable code executable by the processor 102 to perform the method 3300 may be stored in a computer-readable medium such as a memory of a host device.

The mobile device 130 may be accessible to the computer 120 over a network via the ADS 110, such as the example network environment of FIG. 1, or may be directly accessible using a wired or wireless connection between computer 120 and mobile device 130. It is assumed that a first persistent connection (e.g., persistent HTTP or HTTPS connection) between the computer 120 and the ADS 110 exists. The first persistent connection is a two-way communication channel between the computer 120 and the ADS 110.

At event 3302, a second persistent connection (e.g., persistent HTTP or HTTPS connection) is established between the ADS 110 and the mobile device 130, for example, in response to a request on the client computer 120 to publish the application in an instance of the tool 800 on the client computer 120 to a mobile device 130. The second persistent connection is a two-way communication channel between the ADS 110 and the mobile device 130.

While not shown, after the second persistent connection is between the ADS 110 and the mobile device 130 is established, the mobile device 130 sends identifying information about itself to the ADS 110. The ADS 110 then sends the identifying information about the mobile device 130 to the computer 120. Alternatively, the client computer 120 could request the identifying information about the mobile device 130 from the ADS 110. The identifying information could be the UDID, device model or other identifying information from which the ADS 110 can determine the device parameters, such as technical capabilities, which may include one or any combination of such as the physical screen dimensions, keyboard (yes/no), screen resolution, screen dots-per-inch, device orientation, supported screen orientations, and/or application icon resolution, using a database stored in memory. Alternatively, the identifying information provided by the mobile device 130 may directly specify the device parameters rather than indirectly specifying the device parameters using identifying information about the connected mobile device 130.

At event 3303, the ADS 110 sends the identifying information about the mobile device 130, such as the UDID, to the computer 120 associated with the user UserID.

At event 3304, the computer 120 uses the identifying information about the mobile device 130 to determine the device parameters of the connected mobile device 130, and determines whether the device parameters currently applied by the editor user interface match the device parameters of the connected mobile device 130.

At event 3306, the tool 800 automatically adapts the application displayed in the editor user interface to the device parameters of the connected mobile device 130 if the current device parameters used by the editor user interface do not match the device parameters of the connected mobile device 130.

That is, when the mobile device 130 is first connected in an editing session, the tool 800 automatically adapts the application displayed in the editor user interface if the device parameters of the connected mobile device 130 differ from the device parameters used by the tool 800 before the mobile device 130 was connected. For example, if the mobile device 130 has a different size/shape screen, the size/shape of the page displayed within the editor user interface of the tool 800 will be changed accordingly. The adaptation of the displayed application is caused by the UI rendering engine of the tool 800.

At event 3308, the mobile device 130 monitors for and detects one more types of changes on the mobile device 130. The types of changes for which the mobile device 130 monitors may vary. It will be appreciated that not all types of changes are repotable to the ADS 110. In some examples, the types of changes include one or more types of changes in the device state of the connected mobile device 130 or one or more types of changes in the application state. The one or more types of changes in the device state may include device orientation of the connected mobile device 130 or current screen orientations (which may or may not always correspond to the device orientation of the connected mobile device 130).

The deployed application may be informed of changes in device orientation by a device orientation subsystem on the mobile device 130 which provides device orientation notifications, which identify changes in device orientation, to any active application on the mobile device 130 which is configured to listen for device orientation notifications.

The deployed application may include an invokable menu having options to change the application state. A change in the application state may include one or more of a change in the displayed page of the application displayed on the mobile device 130, a change to an object in the displayed page of the application, a change which affects the entire displayed page of the application, or a change to the entire application. The changes may include a change of color or other UI properties of an object, page, or the entire application. For example, the menu may include options one or more of an option to change a color of individual UI elements within the displayed page, an option to a change a color scheme/palette applied to the page of the application, or an option to change a color scheme/palette applied to the entire application.

In some embodiments, the full range or a subset of the full range of the changes which can be made to the application described above, such as object creation, object deletion, object modification, page creation, page deletion, page modification, and application modification, could be performed on the mobile device 130 and detected. In such embodiments, an editor user interface may be provided on the mobile device 130 although provided the editor user interface for the mobile device 130 need not be as advanced as that described above for use within the tool 800.

At event 3310, the mobile device 130 sends a change request to the ADS 110 when a change on the mobile device 130 is detected.

At event 3312, the ADS 110 stores the change in memory and sends the change to the computer 120 having the instance of the tool 800 associated with the published application.

At event 3314, the computer 120 receives the change and applies the change to the displayed application within instance of the tool 800 automatically. For example if a change in the device orientation is detected, the page displayed within the editor user interface of the tool 800 may be rotated accordingly. It should be noted that the change is not sent to other devices accessing the application which are associated with other users. Alternatively, the change may include or be associated with the particular UserID and other devices which not match the particular UserID ignore the change. Thus, the change only appears on the computer 120 of the user who publishes or otherwise deployed the application to the mobile device 130. The operations then return to event 3308 in which the mobile device 130 listens for local changes.

Figure 34:
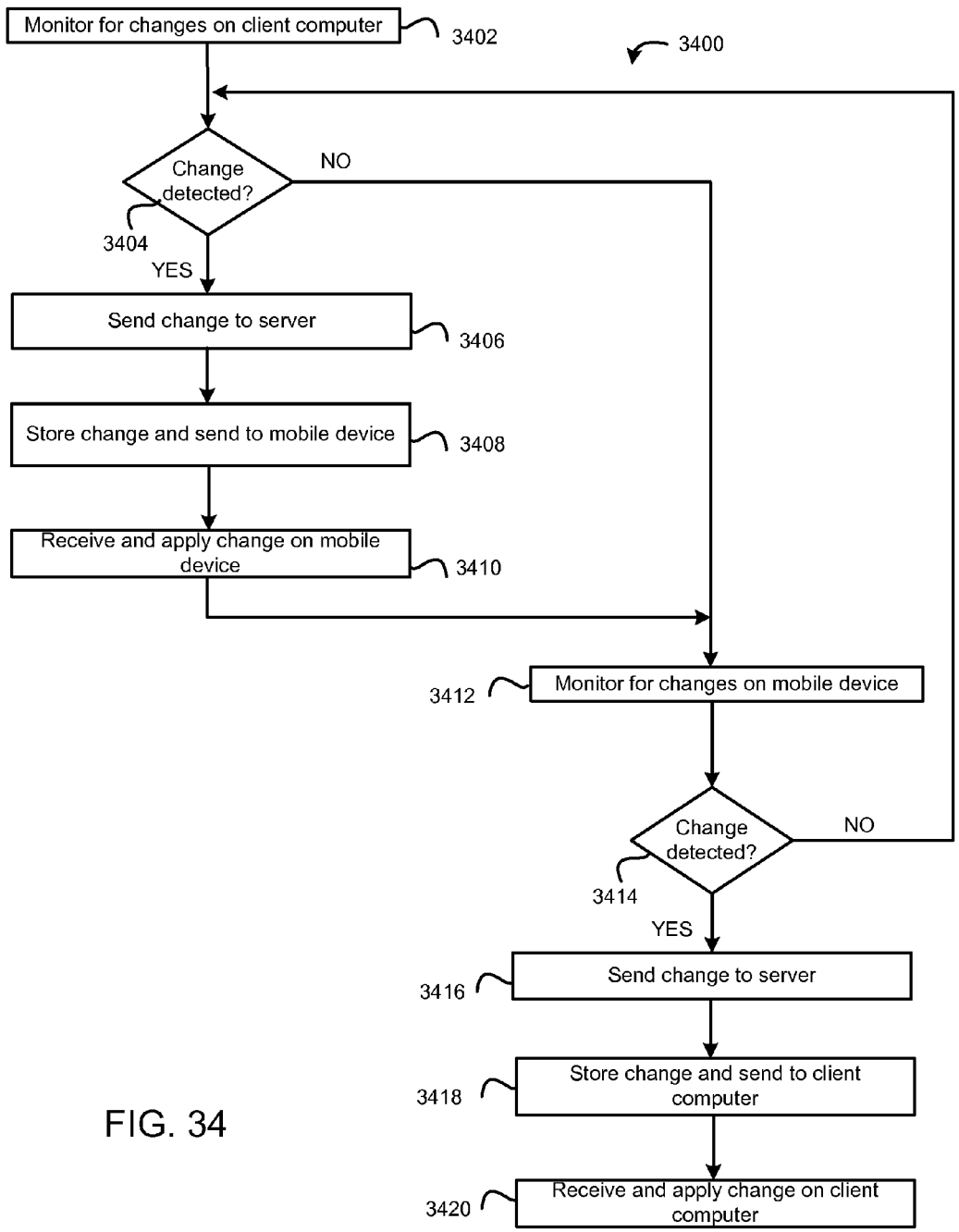
FIG. 34 is a flowchart illustrating a method for real-time or near real-time application of changes made within the application development tool to a connected mobile device in accordance with one example embodiment of the present disclosure.

FIG. 34 is a flowchart illustrating a method 3400 for real-time or near real-time application of changes made within the application development tool to a connected mobile device in accordance with one example embodiment of the present disclosure. The method 3400 may be carried out by software executed, for example, by a processor. Coding of software for carrying out such a method 3400 is within the scope of a person of ordinary skill in the art provided the present disclosure. The method 3400 may contain additional or fewer processes than shown and/or described, and may be performed in a different order. Computer-readable code executable by the processor 102 to perform the method 3400 may be stored in a computer-readable medium such as a memory of a host device.

The method 3400 presumes that the tool 800 is running on a suitable computer 120 with an application in a first state being viewed in the editor user interface, the application has been deployed (e.g., published or exported) to a mobile device 130 and is operating thereon and current reflects the first state of the application with the tool 800, a first persistent connection is established between the computer 120 and the ADS 110, and a second persistent connection is established between the ADS 110 and the mobile device 130.

At event 3402, the computer 120 monitors for and detects changes to the application within the local instance of the tool 800. When a change is detected (decision block 3404), change information describing the change is sent to the server (3406). As noted, the change information may include application code (e.g., in QML) when change relates to an object or page which is added to the application.

At event 3408, the server receives the change information, and stores the change information in memory, and sends the change information to the mobile device 130.

At event 3410, the mobile device 130 receives the change information and applies the change to the application, for example, using Cascades™ APIs. As noted, the change information may include application code (e.g., in QML) when change relates to an object or page which is added to the application.

At event 3412, the mobile device 130 monitors for and detects changes to the deployed application (e.g., published or exported, downloaded and installed on the mobile device 130) as well as changes to the device state, such as a change in device orientation of the connected mobile device 130 or a change in the application state (e.g., such as a change in the displayed page) or setting (e.g., color or other UI properties) When a change is detected (decision block 3414), change information describing the change is sent to the server (3416).

At event 3418, the server receives the change information, and stores the change information in memory, and sends the change information to the computer 120 associated with the UserID and UDID associated with the mobile device 130. In this way, the change is not sent to other computers 120 or target devices accessing the application which are associated with other users. Thus, the change is only sent and only appears on the computer 120 of the user who publishes or otherwise deployed the application to the mobile device 130. Alternatively, the change includes the particular UserID and other devices which not match the particular UserID ignore the change. Alternatively, certain types of changes may be propagated to all devices.

At event 3420, the computer 120 receives the change information and applies the change to the application in the editor user interface of the tool 800.

The method 3400 provides a solution which reduces or eliminates the software development step of building and deploying software code to a target device in order to evaluate the behaviour of the code. Traditionally, each time software code changes the software typically needs to be re-built and re-deployed to the target device. The method 3400 also provides a solution which enables the target device to act as a software development console in scenarios where it is easier to analyze and achieve the desired behaviour by manipulating the user interface on the target device, compared to changing the software code, then re-building and re-deploying the application.

In accordance with the methods described herein, once the application has been deployed to a mobile device, any subsequent changes made in the tool 800 are automatically reflected on the target device application in real-time or near real-time without the need to explicitly re-build and re-deploy the newly changed software. The tool 800 allows software developers to start a new application, publish the new application to the target device, proceed to make changes to the application via the tool 800, and at any given time pick up the target device to evaluate the behaviour of the application since the code changes are always available in real-time or near real-time.

The ability to apply code changes to the target device in real-time or near real-time is achieved through the use of the two-way communication channel between the ADS 110 and the target device. The act of performing the first (and only) explicit request to publish the application includes all the logic required to inform the target device of where to listen for changes from the ADS 110. Similarly, this information can be provided by exporting, downloading and install the application the target device. Once code changes are received by the target device, the target device determines the elements of the running application which the code change needs to be applied to and then proceeds to make the change.

The two-way communication channel between the ADS 110 (i.e., the server component of the tool 800) and the target device allows changes from a client device to be send to the server and the send and applied to the target device, as well as sending at least some types of changes from the target device to the ADS 110. It may be easier to manipulate the application on the target device or may be better to appreciate the effective of a UI change on the target device rather than within an editor user interface of a computer (i.e., the client component of the tool 800). For example, consider a scenario where the background color of the application can be changed by manipulating three color sliders labeled Red, Green, and Blue, each with a range from 0 to 255. In this case, the traditional code development process would involve either selecting a desired background color in advance or making changes to the background color, and then run and deploy the new code. However, it may be easier to manipulate the slider values in the application running on the target device because it allows for granular fine tuning and immediate visualization of the background color. The selected color slider values could be detected on the target device and sent to the tool 800 to as the desired default values. Furthermore, the value changes from the target device would be reflected in real-time or near real-time within the editor user interfaces.

Another aspect of applying real-time or near real-time changes from the tool 800 to the target device is that the target device has the ability to synchronize at any point in time. For example, if the developer is making changes to the application using the tool 800 but the application is not running on the target device, running the application on the target device will automatically sync up the state of the application and inform the tool 800 that there is now a live connection to the target device. All of this occurs without the developer having to re-build and re-deploy the application to the target device. Likewise, if there are any changes from the target device that need to be communicated back to the tool 800 when the target device was not in close proximity to the computer 120 or when the tool 800 did not have the application open, the act of opening the tool 800 on the computer 120 will enable the changes from the target device to be synched.

It will be appreciated that the present disclosure provides two general approaches to distributing changes to computers and mobile devices. In the first approach, the server determines which computers or mobile devices should receive the changes based on the UserID and only sends the changes to the determined client devices. The first approach is a lightweight for the clients but creates additional processing for the server. In the second approach, the server sends the changes to all collaborating client devices and each client determines whether to apply the changes based on the UserID. The second approach is a lightweight for the server but creates additional processing for the clients.

While the described embodiments relate to a Web-based integrated development environment and tool, the teachings of the present disclosure could be applied to a private network, such as a corporate or other enterprise network, to provide similar benefits within a private network environment. Additionally, while the described embodiments refer to the Web and persistent connections using HTTP or HTTPS as example communication protocols for communications between a client computer and server and for communications between a mobile device and server, it will be understood that other communication protocols could be used in other embodiments.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

In accordance with one aspect of the present disclosure, there is provided a method implemented by a server device for collaboration on an application, the method comprising: receiving from a first client device a request for a first state of the application at a first time; identifying application code defining the application at a save point prior to the first time and any incremental changes to the application code which occurred between the save point and the first time; and sending the application code and any incremental changes to the first client device.

In some example embodiments of the first aspect of the present disclosure, the method further comprises: receiving from a second client device change information describing an incremental change to the application; storing the change information received from the second client device in a memory; and sending the change information received from to the first client device. The change information may be stored in association with a user which caused the incremental change and a timestamp describing a time of the incremental change. The change information may identify a new image to be associated with a dynamic link to an image, wherein the dynamic link is included in a page of the application. When the new image file is selected from a memory of the first client device, the new image file may be provided with the change information.

In some example embodiments of the first aspect of the present disclosure, the application code and any incremental changes are separately stored in a memory of the server.

In some example embodiments of the first aspect of the present disclosure, the application code at one or more save points and incremental changes between the one or more save points are each stored individually in the memory of the server. The application code at each of the one or more save points and each of the incremental changes may be stored in association with a timestamp.

Each of the one or more save points and each of the incremental changes may be stored in association with a user associated with the respective save or change.

In some example embodiments of the first aspect of the present disclosure, the method further comprises: receiving a request to save a current application state, the request including the application code of the application at the current application state; storing the current application code of the application at the current application state in a memory of the server.

In some example embodiments of the first aspect of the present disclosure, the save point is the most recent save point.

In accordance with a second aspect of the present disclosure, there is provided a server, comprising: a processor configured for: receiving from a first client device a request for a first state of the application at a first time; identifying application code defining the application at a save point prior to the first time and any incremental changes to the application code which occurred between the save point and the first time; and sending the application code and any incremental changes to the first client device.

In accordance with a third aspect of the present disclosure, there is provided a method implemented by a client device for collaboration on an application, the method comprising: sending to a server a request for a first state of the application at a first time; receiving from the server application code defining the application at a save point prior to the first time and any incremental changes to the application code which occurred between the save point and the first time; rendering a first page of the application in accordance with the application code defining the application at the save point and any incremental changes to the application code which occurred between the save point and the first time; and displaying the rendered first page on a display of the client device.

In some example embodiments of the third aspect of the present disclosure, rendering the first page comprises: rendering the first page of the application in accordance with the application code defining the application at the save point; applying any incremental changes to the rendered first page which occurred between the save point and the first time in an order in which the incremental changes occurred.

In some example embodiments of the third aspect of the present disclosure, rendering the first page comprises: generating the first state of the application, the generating including applying incremental changes to the application code which occurred between the save point and the first time in an order in which the incremental changes occurred; and rendering the first page of the application in accordance with the first state of the application.

In some example embodiments of the third aspect of the present disclosure, the application code comprises one or more pages each defined by Qt Modeling Language (QML), wherein each page comprises one or more QML objects. In some example embodiments of the third aspect of the present disclosure, the rendering comprises: transcoding the one or more QML objects into one or more JavaScript objects; transcoding the one or more JavaScript objects into one or more HTML objects; and styling the one or more HTML objects using Cascading Style Sheets (CSS) to emulate the one or more QML objects. In some example embodiments of the third aspect of the present disclosure, the method further comprises: transcoding one or more JavaScript objects which define the current state of the application into one or more QML objects in response to a request to save, export or publish the application; and outputting the one or more QML objects to save, export or publish the application.

In some example embodiments of the third aspect of the present disclosure, the method further comprises: establishing a persistent connection between with the server; sending a request to the server which requests that the server send any incremental changes to the application subsequent to the first state of the application; receiving from the server change information describing an incremental change to the application at a time indicated by a first timestamp; applying the incremental change to the application to the rendering first page of the application; and sending a further request to the server, wherein the request requests that the server send any incremental changes to the application subsequent to the time indicated by the first timestamp.

In some example embodiments of the third aspect of the present disclosure, the method further comprises: receiving a request to change the application to a previous state; reversing the incremental changes which occurred between the current state of the application and the previous state of the application in reverse order of an order in which the incremental changes occurred. In some example embodiments of the third aspect of the present disclosure, the method further comprises: when the previous state is prior to the save point, requesting from the sever the incremental changes which occurred between the save point and the previous state; and receiving from the server the incremental changes which occurred between the save point and the previous state. The request to change the application to a previous state may be an undo request or a selection of a previous state on a visual timeline.

In some example embodiments of the third aspect of the present disclosure, the save point is the most recent save point.

In accordance with a fourth aspect of the present disclosure, there is provided a method implemented by a client device for collaboration on an application, the method comprising: sending to a server a request to display a Showcase page including one or more applications which a user associated with the client device has access to; receiving from the server application code defining the one or more applications at a save point prior to a time of the request and any incremental changes to the application code which occurred between the save point and the time of the request; rendering one or more pages of the one or more applications in accordance with the application code defining the application at the save point and any incremental changes to the application code which occurred between the save point and the time of the request; and displaying the Showcase page including the one or more rendered pages of the one or more applications on a display of the client device.

In some example embodiments of the fourth aspect of the present disclosure, the one or more pages of the one or more applications are presented in an array.

In some example embodiments of the fourth aspect of the present disclosure, an indication of a most recently modified application is provided.

In some example embodiments of the fourth aspect of the present disclosure, rendering the one or more pages comprises: rendering the one or more pages of the one or more applications in accordance with the application code defining the application at the save point; applying any incremental changes to the one or more pages of the one or more applications which occurred between the save point and the time of the request in an order in which the incremental changes occurred.

In some example embodiments of the fourth aspect of the present disclosure, rendering the one or more pages comprises: generating a current state of the application, the generating including applying incremental changes to the application code which occurred between the save point and the time of the request in an order in which the incremental changes occurred; and rendering the one or more pages of the one or more applications in accordance with the current state of the application.

In some example embodiments of the fourth aspect of the present disclosure, the application code of the one or more applications each comprises one or more pages each defined by QML, wherein each page comprises one or more QML objects. In some example embodiments of the fourth aspect of the present disclosure, the rendering comprises: for each of the one or more pages of the one or more applications, transcoding the one or more QML objects into one or more JavaScript objects; transcoding the one or more JavaScript objects into one or more HTML objects; and styling the one or more HTML objects using CSS to emulate the one or more QML objects.

In some example embodiments of the fourth aspect of the present disclosure, the method further comprises: establishing a persistent HTTP connection between with the server; sending a request to the server for each of the one or more applications which requests that the server send any incremental changes to a respective application subsequent to the time of the request; receiving from the server change information describing an incremental change to one application in the one or more applications at a time indicated by a first timestamp; applying the incremental change to the one application to the one or more rendered pages of the one application; and sending a further request to the server which requests that the server send any incremental changes to the one application subsequent to the time indicated by the first timestamp.

In some example embodiments of the fourth aspect of the present disclosure, the save point is the most recent save point.

In accordance with a further aspect of the present disclosure, there is provided a method implemented by a server device for collaboration on an application, the method comprising: receiving from a first client device a request for application code defining the application at a first state of the application at a first time; sending the application code defining the application at a save point prior to the first time to the first client device; receiving from the first client device a request for any incremental changes to the application code which occurred between the save point and the first time; and sending any incremental changes to the application code which occurred between the save point and the first time.

In accordance with a fifth aspect of the present disclosure, there is provided a method implemented by a client device for collaboration on an application, the method comprising: sending to a server a request for application code defining the application at a first state of the application at a first time; receiving from the server application code defining the application at a save point prior to the first time to the first client device; sending to the server a request for any incremental changes to the application code which occurred between the save point and the first time; receiving from the server any incremental changes to the application code which occurred between the save point and the first time; rendering a first page of the application in accordance with the application code defining the application at the save point and any incremental changes to the application code which occurred between the save point and the first time; and displaying the rendered first page on a display of the client device.

In some example embodiments of the fifth aspect of the present disclosure, rendering the first page comprises: rendering the first page of the application in accordance with the application code defining the application at the save point; applying any incremental changes to the rendered first page which occurred between the save point and the first time in an order in which the incremental changes occurred.

In accordance with a sixth aspect of the present disclosure, there is provided a method of interacting with a visual timeline of an application, the method comprising: displaying on a display a visual timeline having one or more visual elements each representing an action performed in respect of the application, each action corresponding to a save point or an incremental change to the application, wherein the visual elements are arranged in a chronological order in which the actions occurred.

In accordance with other aspects of the present disclosure, there is provided an electronic device including a communication interface and a processor configured to perform methods described herein.

In accordance with other aspects of the present disclosure, there is provided a server including a communication interface and a processor configured to perform methods described herein.

In accordance with other aspects of the present disclosure, there is provided a computer readable medium having stored thereon computer program instructions for causing an electronic device or a server to perform methods described herein.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the described embodiments set forth in the examples, but should be given the broadest interpretation consistent with the description as a whole.

The invention claimed is:

1. A method for a development server of synchronizing an application between a client computer to a mobile device, the method comprising:
receiving a request from a client computer to publish to a mobile device an application as at a first application state subsequent to a save point, wherein the request includes an application identifier ApplicationID associated with the application, a user identifier UserID associated with a current user of the client computer and an IP address of the mobile device TargetIPAddress;
receiving an authorization request from the mobile device, the authorization request including identifying information comprising a device identifier DeviceID associated with the mobile device;
generating a token defining an association between the application identifier ApplicationID, the user identifier UserID and the device identifier DeviceID;
sending the token to the mobile device associated with the device identifier DeviceID at the IP address TargetIPAddress;
compiling the application in accordance with application code defining the application at the save point;
sending the compiled application over a communications network to the mobile device at the IP address TargetIPAddress along with identifying information comprising an IP address of the development server, wherein the compiled application is sent to the mobile device in a format which automatically executes when downloaded on the mobile device; and
sending incremental changes to the application code which occurred between the save point and the first application state over the communications network, wherein the incremental changes are sent to the mobile device in a format which automatically applies the incremental changes to the application while being executed on the mobile device so that the executed application reflects the application code at the first application state.

2. The method of claim 1, further comprising:
denying the authorization request in response to receiving a device denial message from the client computer.

3. The method of claim 1, wherein the token is generated in response to receiving the authorization request.

4. The method of claim 3, further comprising:
sending identifying information about the mobile device associated with the device identifier DeviceID to the client computer.

5. The method of claim 1, further comprising:
receiving a request from the mobile device associated with the device identifier DeviceID, wherein the request requests any subsequent change to the application made to the application by the user associated with the user identifier UserID, wherein the request is associated with the token.

6. The method of claim 5, further comprising:
receiving from the client computer a change request including change information describing one or more change(s) to the application, wherein the change request is associated with the user identifier UserID; and
sending the change request to the mobile device associated with the device identifier DeviceID at the IP address TargetIPAddress when an open request requesting any subsequent change to the application made to the application by the user associated with the user identifier UserID exists for the mobile device.

7. The method of claim 6, wherein the change request changes a current state of the application on the client computer associated with the user identifier UserID from the first application state to another application state.

8. The method of claim 6, wherein the change request changes an active page of the application displayed on the client computer associated with the user identifier UserID.

9. The method of claim 6, wherein the change request adds, deletes or modifies an object in the active page of the application displayed on the client computer associated with the user identifier UserID.

10. The method of claim 5, further comprising:
receiving from the mobile device associated with the device identifier DeviceID a change request including change information describing one or more change(s), wherein the change request is associated with the user identifier UserID;
sending the change request to the client computer associated with the user identifier UserID.

11. The method of claim 10, wherein the change request is sent to the client computer at an IP address UserIPAddress.

12. The method of claim 11, wherein the one or more change(s) information comprises one or more of a change in device state or a change to the application.

13. The method of claim 1, further comprising:
receiving a request from the mobile device associated with the device identifier DeviceID requesting any subsequent change to the application made to the application by the user associated with the user identifier UserID;
rejecting the request when not associated with the valid token;
accepting the request when associated with the token.

14. The method of claim 1, further comprising:
receiving a request from the client computer associated with the user identifier UserID to acquire sensor data from the mobile device associated with the device identifier DeviceID;
sending an instruction to acquire the sensor data to the mobile device associated with the device identifier DeviceID at the IP address TargetIPAddress;
receiving the sensor data from the mobile device associated with the device identifier DeviceID; and
sending the sensor data to the client computer associated with the user identifier UserID.

15. The method of claim 14, further comprising storing the sensor data in memory.

16. The method of claim 15, wherein the sensor data is stored as an incremental change, wherein the method further comprises sending the sensor data to all collaborating devices currently accessing the application associated with the application identifier ApplicationID.

17. The method of claim 14, wherein the sensor data comprises an image captured by a camera of the mobile device associated with the device identifier DeviceID.

18. The method of claim 1, wherein the save point is the most recent save point.

19. The method of claim 1, further comprising:
sending a device authorization request to the client computer when the combination of the application identifier ApplicationID, user identifier UserID and device identifier DeviceID do not correspond to any previously authorized mobile devices;
wherein the token is generated in response to receiving a device authorization message from the client computer.

20. A development server, comprising:
a processor configured for:
receiving a request from a client computer to publish to a mobile device an application as at a first application state subsequent to a save point, wherein the request includes an application identifier ApplicationID associated with the application, a user identifier UserID associated with a current user of the client computer and an IP address of the mobile device TargetIPAddress;
receiving an authorization request from the mobile device, the authorization request including identifying information comprising a device identifier DeviceID associated with the mobile device;
generating a token defining an association between the application identifier ApplicationID, the user identifier UserID and the device identifier DeviceID;
sending the token to the mobile device associated with the device identifier DeviceID at the IP address TargetIPAddress;
compiling the application in accordance with application code defining the application at the save point;
sending the compiled application over a communications network to the mobile device at the IP address TargetIPAddress along with identifying information comprising an IP address of the development server, wherein the compiled application is sent to the mobile device in a format which automatically executes when downloaded on the mobile device; and
sending incremental changes to the application code which occurred between the save point and the first application state over the communications network, wherein the incremental changes are sent to the mobile device in a format which automatically applies the incremental changes to the application while being executed on the mobile device so that the executed application reflects the application code at the first application state.

21. A non-transitory machine readable medium having tangibly stored thereon executable instructions that, when executed by a processor of a development server, cause the processor to perform a method, the method comprising:
receiving a request from a client computer to publish to a mobile device an application as at a first application state subsequent to a save point, wherein the request includes an application identifier ApplicationID associated with the application, a user identifier UserID associated with a current user of the client computer and an IP address of the mobile device TargetIPAddress;
receiving an authorization request from the mobile device, the authorization request including identifying information comprising a device identifier DeviceID associated with the mobile device;
generating a token defining an association between the application identifier ApplicationID, the user identifier UserID and the device identifier DeviceID;
sending the token to the mobile device associated with the device identifier DeviceID at the IP address TargetIPAddress;
compiling the application in accordance with application code defining the application at the save point;
sending the compiled application over a communications network to the mobile device at the IP address TargetIPAddress along with identifying information comprising an IP address of the development server, wherein the compiled application is sent to the mobile device in a format which automatically executes when downloaded on the mobile device; and
sending incremental changes to the application code which occurred between the save point and the first application state over the communications network, wherein the incremental changes are sent to the mobile device in a format which automatically applies the incremental changes to the application while being executed on the mobile device so that the executed application reflects the application code at the first application state.

* * * * *